(12) United States Patent
Acharya et al.

(10) Patent No.: US 11,885,999 B2
(45) Date of Patent: Jan. 30, 2024

(54) OPTICAL CONSTRUCTION AND DISPLAY SYSTEM

(71) Applicant: 3M INNOVATIVE PROPERTIES COMPANY, St. Paul, MN (US)

(72) Inventors: Bharat R. Acharya, Woodbury, MN (US); Robert D. Taylor, Stacy, MN (US); Joseph P. Attard, Woodbury, MN (US); Benjamin J. Forsythe, Stillwater, MN (US); David T. Yust, Woodbury, MN (US); Matthew E. Sousa, Rosemount, MN (US); Jason S. Petaja, Hudson, WI (US); Anthony M. Renstrom, Forest Lake, MN (US); William Blake Kolb, Stillwater, MN (US); Matthew S. Cole, Woodbury, MN (US); Matthew S. Stay, Bloomington, MN (US); Matthew R.D. Smith, Woodbury, MN (US); Jeremy O. Swanson, Woodbury, MN (US); Tri D. Pham, Woodbury, MN (US); David A. Rosen, North St. Paul, MN (US); Qunyi Chen, St. Paul, MN (US); Lisa A. DeNicola, St. Paul, MN (US); Quinn D. Sanford, Mosinee, WI (US); Carl A. Stover, St. Paul, MN (US); Lin Zhao, Woodbury, MN (US); Gilles J. Benoit, Minneapolis, MN (US)

(73) Assignee: 3M INNOVATION PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/996,676

(22) PCT Filed: May 4, 2021

(86) PCT No.: PCT/IB2021/053718

§ 371 (c)(1),
(2) Date: Oct. 20, 2022

(87) PCT Pub. No.: WO2021/224782
PCT Pub. Date: Nov. 11, 2021

(65) Prior Publication Data
US 2023/0341615 A1    Oct. 26, 2023

Related U.S. Application Data

(60) Provisional application No. 63/021,739, filed on May 8, 2020.

(51) Int. Cl.
*F21V 8/00* (2006.01)
*G06V 40/13* (2022.01)

(52) U.S. Cl.
CPC .......... *G02B 6/0056* (2013.01); *G02B 6/0051* (2013.01); *G06V 40/1318* (2022.01)

(58) Field of Classification Search
CPC .... G02B 5/305; G02B 5/3025; G02B 5/3041; G02B 27/28; G02B 27/286; G02B 5/0825;
(Continued)

(56) References Cited

U.S. PATENT DOCUMENTS

| | | | |
|---|---|---|---|
| 5,882,774 A | 3/1999 | Jonza et al. | |
| 6,025,897 A * | 2/2000 | Weber | G02B 5/305 362/19 |

(Continued)

FOREIGN PATENT DOCUMENTS

| | | |
|---|---|---|
| CN | 109716352 A | 5/2019 |
| JP | 2004252383 A | 9/2004 |

(Continued)

OTHER PUBLICATIONS

International Search Report for PCT International Application No. PCT/IB2021/053718, dated Jul. 20, 2021, 4 pages.

*Primary Examiner* — William J Carter
(74) *Attorney, Agent, or Firm* — Clifton F. Richardson

(57) ABSTRACT

An optical construction includes a reflective polarizer and an optically diffusive film disposed on the reflective polarizer. The reflective polarizer includes an outer layer including a plurality of first particles partially protruding from a first major surface thereof to form a structured major surface. A first optically diffusive layer is conformably disposed on the structured major surface. The optically diffusive film includes a second optically diffusive layer including a plurality of nanoparticles dispersed therein, and a structured layer including a structured major surface. For a substantially normally incident light and a visible wavelength range from about 450 nm to about 650 nm and an infrared wavelength range from about 930 nm to about 970 nm, the second optically diffusive layer has an average specular transmittance Vs in the visible wavelength range and an average specular transmittance Is in the infrared wavelength range, where Is/Vs≥2.5.

15 Claims, 41 Drawing Sheets

(58) Field of Classification Search
CPC .. G02B 27/145; G02B 27/142; G02B 5/0841; G02B 5/281; G02B 5/30; G02B 5/3008; G02B 5/3033; G02B 6/0031; G02B 6/0055

See application file for complete search history.

(56) References Cited

U.S. PATENT DOCUMENTS

| | | | |
|---|---|---|---|
| 6,179,948 B1 | 1/2001 | Merrill et al. | |
| 6,783,349 B2 | 8/2004 | Neavin et al. | |
| 6,967,778 B1 | 11/2005 | Wheatley et al. | |
| 8,469,575 B2 * | 6/2013 | Weber | G02B 27/286 362/624 |
| 8,703,252 B2 * | 4/2014 | Oya | B32B 27/08 359/485.01 |
| 9,162,406 B2 | 10/2015 | Neavin et al. | |
| 9,441,809 B2 | 9/2016 | Nevitt et al. | |
| 9,551,818 B2 | 1/2017 | Weber et al. | |
| 2020/0117877 A1 | 4/2020 | Xie | |
| 2020/0409218 A1 | 12/2020 | Tsai et al. | |

FOREIGN PATENT DOCUMENTS

| | | | | |
|---|---|---|---|---|
| JP | 2007178792 A | 7/2007 | | |
| JP | 2016148869 A | 8/2016 | | |
| JP | 2021004911 A | 1/2021 | | |
| WO | 2001022130 A1 | 3/2001 | | |
| WO | 2015102961 A1 | 7/2015 | | |
| WO | WO-2018163009 A1 * | 9/2018 | | G02B 27/283 |
| WO | 2021224703 A1 | 11/2021 | | |
| WO | 2021224715 A1 | 11/2021 | | |
| WO | 2021224735 A1 | 11/2021 | | |
| WO | 2021224760 A1 | 11/2021 | | |
| WO | 2021224798 A1 | 11/2021 | | |
| WO | 2021224799 A1 | 11/2021 | | |

* cited by examiner

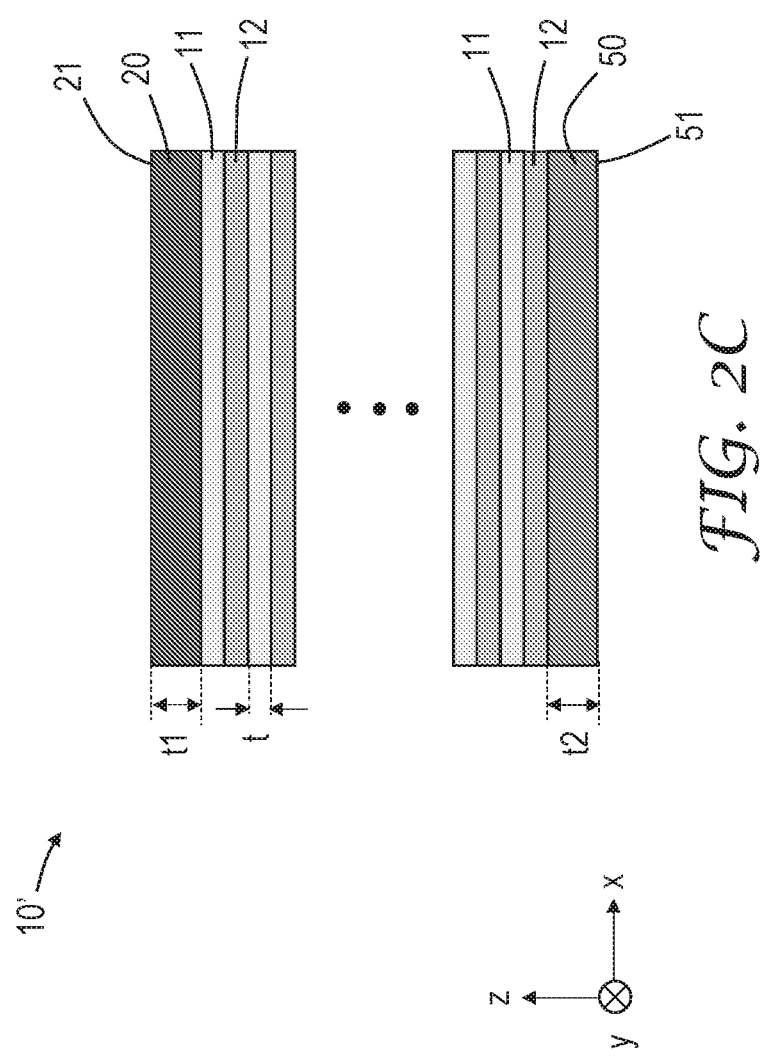

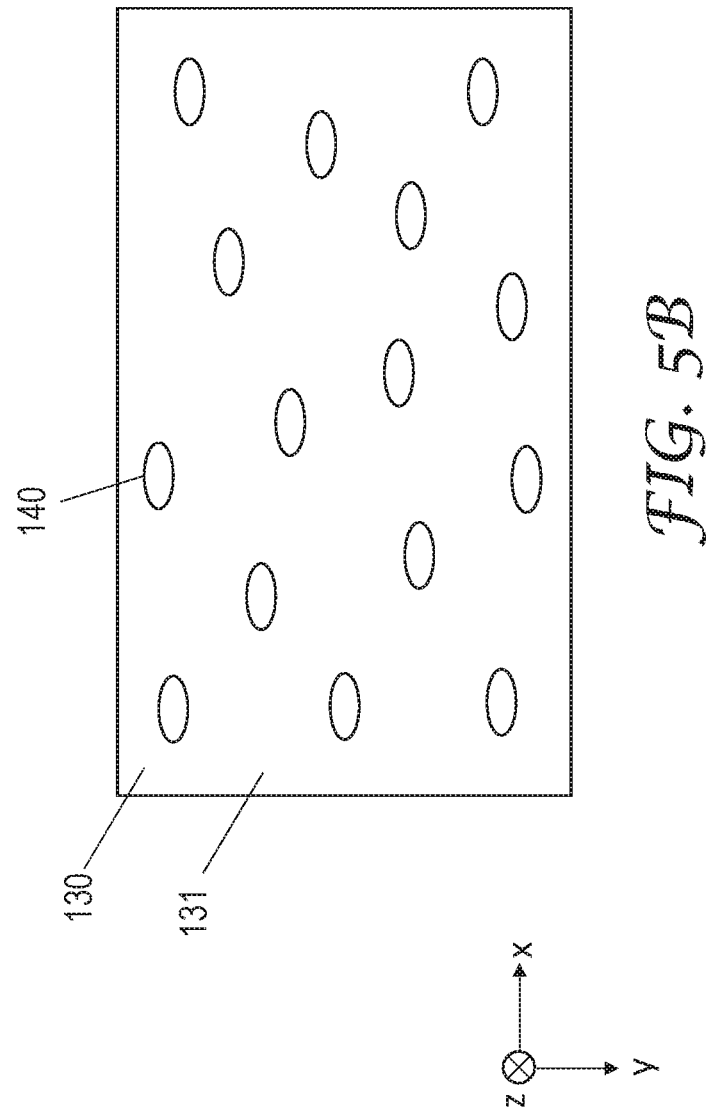

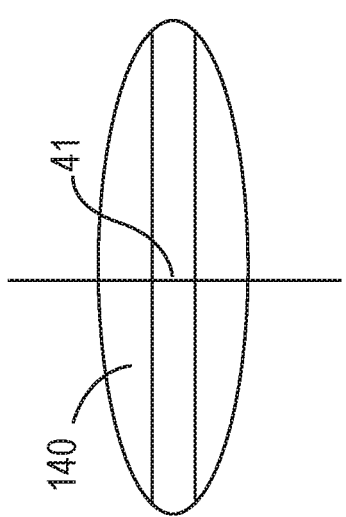
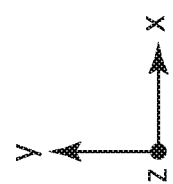
FIG. 6A

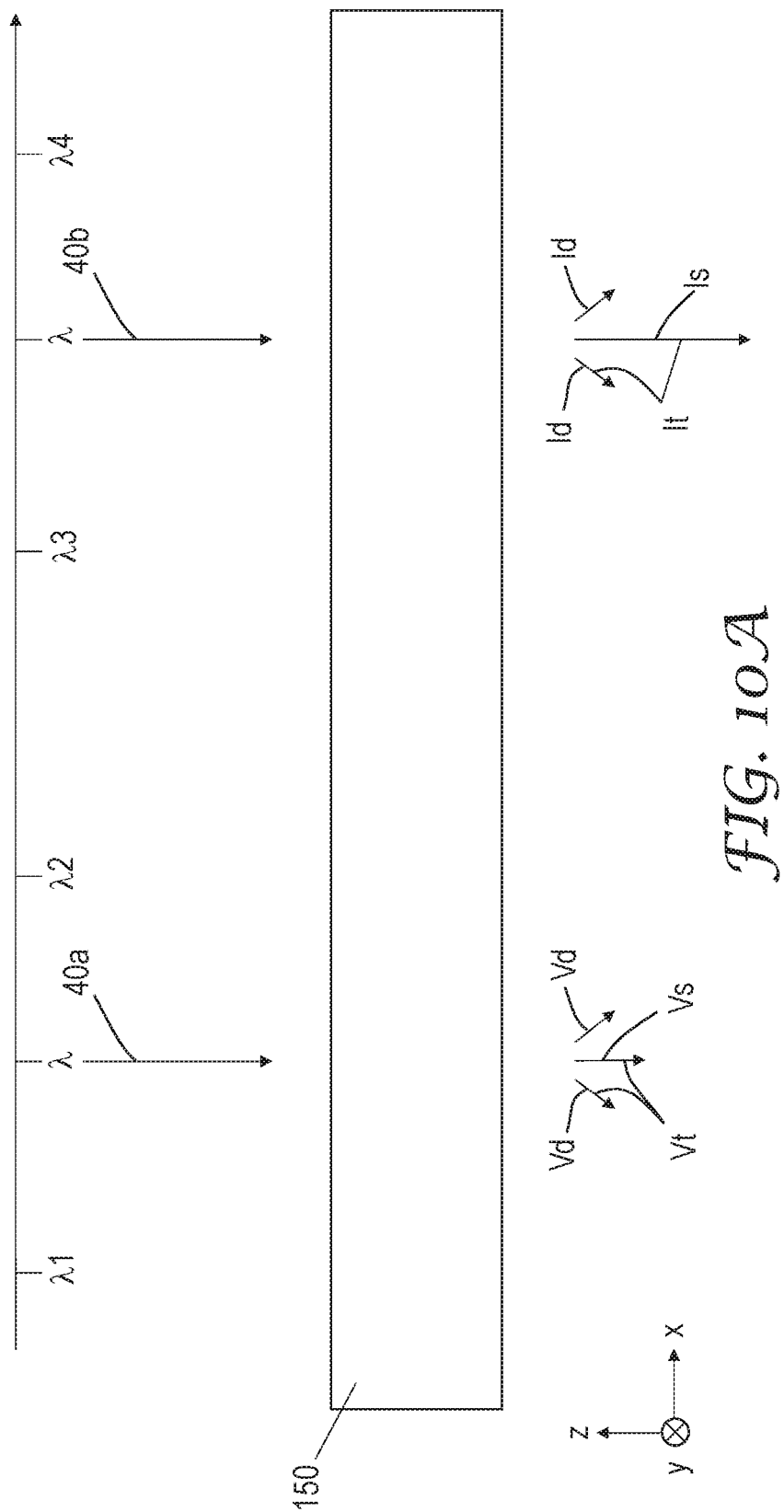

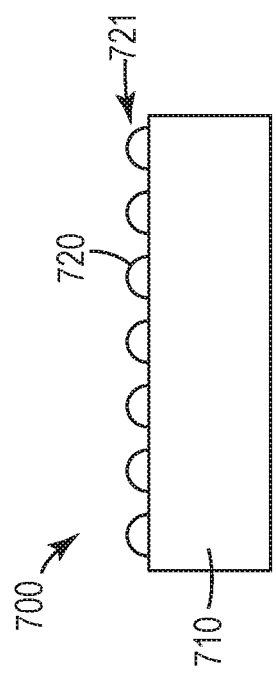
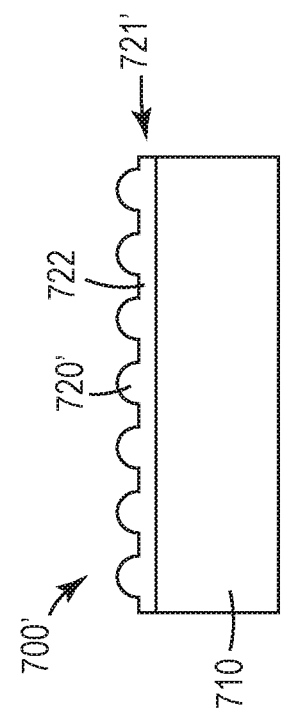

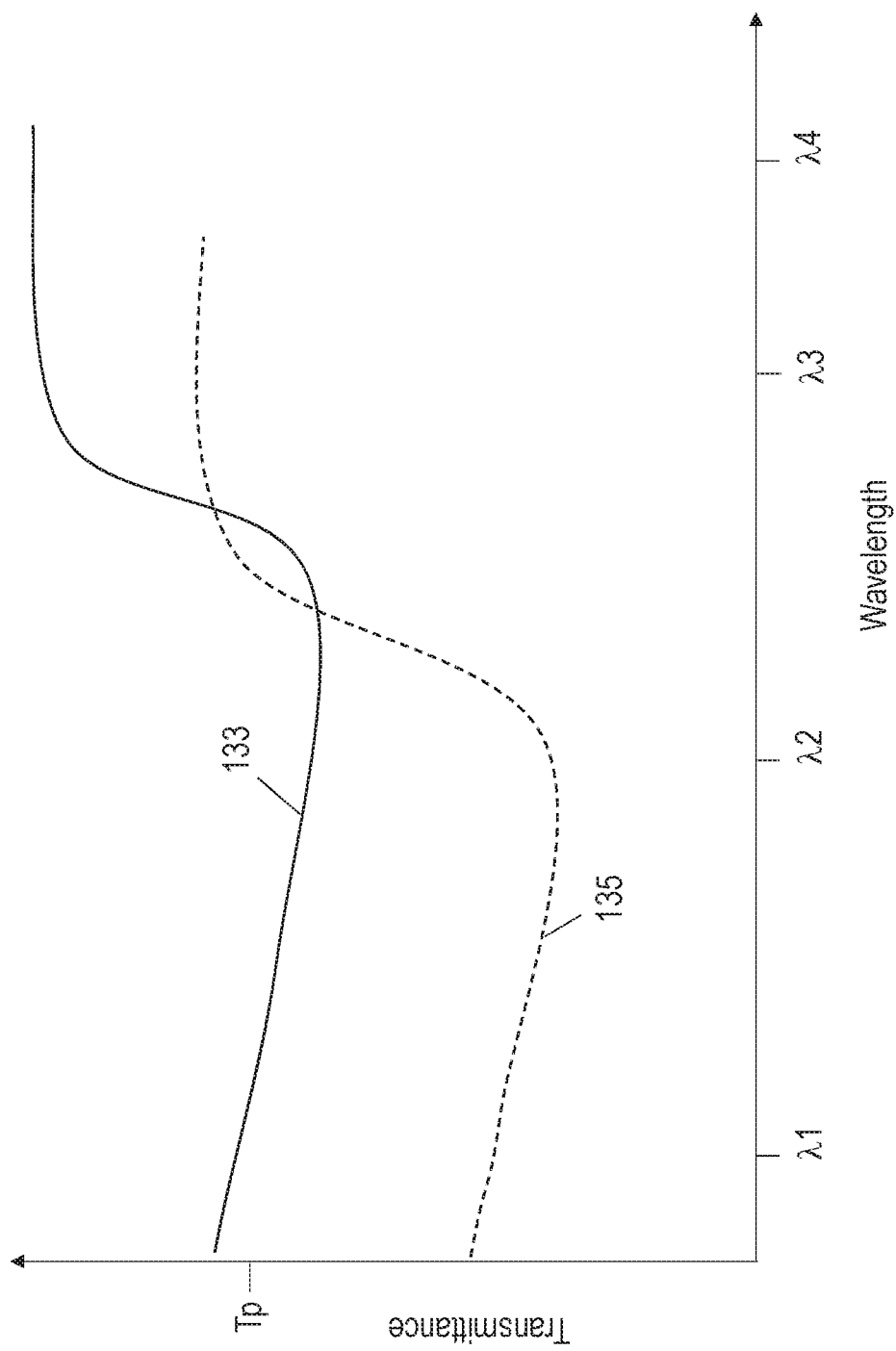

OPTICAL CONSTRUCTION AND DISPLAY SYSTEM

CROSS REFERENCE TO RELATED APPLICATIONS

This application is a national stage filing under 35 U.S.C. 371 of PCT/IB2021/053718, filed May 4, 2021, which claims the benefit of U.S. Application No. 63/021,739, filed May 8, 2020, the disclosures of which are incorporated by reference in their entirety herein.

BACKGROUND

A liquid crystal display (LCD) can include a reflective polarizer between an LCD panel and a lightguide.

SUMMARY

The present disclosure relates generally to optical constructions including a reflective polarizer and an optically diffusive film, and to display systems including the optical construction.

In some aspects of the present description, an optical construction includes a reflective polarizer and an optically diffusive film disposed on the reflective polarizer. The reflective polarizer includes a plurality of polymeric layers and a first outer layer. The plurality of polymeric layers can number at least 50 in total and can be co-extruded with the first outer layer. The first outer layer includes a plurality of first particles having an average size of from about 7 to about 9 microns and partially protruding from a first major surface thereof to form a first structured major surface. The reflective polarizer further includes a first optically diffusive layer conformably disposed on the first structured major surface so that opposing first and second major surfaces of the first optically diffusive layer substantially conform to the first structured major surface. The first optically diffusive layer includes a plurality of nanoparticles dispersed therein where the nanoparticles define a plurality of voids therebetween. The optically diffusive film includes an optical substrate layer; a second optically diffusive layer disposed on the optical substrate layer and facing the reflective polarizer and including a plurality of nanoparticles dispersed therein; and a structured optical layer disposed on the optical substrate layer and facing away from the reflective polarizer and including a structured major surface facing away from the optical substrate layer and including a plurality of spaced apart elongated structures elongated along a same first direction. The plurality of spaced apart elongated structures can be arranged at a substantially uniform density across the structured major surface of the structured optical layer. For a substantially normally incident light and a visible wavelength range from about 450 nm to about 650 nm and an infrared wavelength range from about 930 nm to about 970 nm, the second optically diffusive layer has an average specular transmittance Vs in the visible wavelength range and an average specular transmittance Is in the infrared wavelength range, where Is/Vs≥2.5.

In some aspects of the present description, an optical construction includes a reflective polarizer and an optically diffusive film disposed on the reflective polarizer. The reflective polarizer includes a plurality of polymeric layers and a first outer layer. The plurality of polymeric layers can number at least 50 in total and can be co-extruded with the first outer layer. The first outer layer includes a plurality of first particles which can have an average size of from about 7 to about 9 microns and partially protruding from a first major surface thereof to form a first structured major surface. The reflective polarizer further includes a first optically diffusive layer conformably disposed on the first structured major surface so that opposing first and second major surfaces of the first optically diffusive layer substantially conform to the first structured major surface. The first optically diffusive layer includes a plurality of nanoparticles dispersed therein where the nanoparticles define a plurality of voids therebetween. In some embodiments, the reflective polarizer also includes a second outer layer opposite the first outer layer, where the second outer layer can be co-extruded with the plurality of polymeric layers and the first outer layer, and where the second outer layer includes a plurality of second particles partially protruding from a second major surface thereof to form a second structured major surface.

In some aspects of the present description, a display system for sensing a finger of a user applied to the display system is provided. The display system includes a display panel configured to generate an image for viewing by the user; a lightguide for providing illumination to the display panel; an optical construction of the present description disposed between the display panel and the lightguide where the optical construction includes a reflective polarizer including a plurality of polymeric layers and having a first structured major surface disposed between the display panel and the plurality of polymeric layers; a sensor for sensing the finger of the user disposed proximate the lightguide opposite the reflective polarizer; and an infrared light source configured to emit an infrared light toward the finger of the user where the sensor is configured to receive at least a portion of the infrared light reflected by the finger. In some embodiments, the display system further includes a structured mirror disposed between the lightguide and the sensor and including an optical mirror, and an array of discrete spaced apart optical bumps formed on the optical mirror and facing the lightguide. In some embodiments, for a substantially normally incident light, the optical mirror has an average optical reflectance of greater than about 30% in a visible wavelength range for at least a first polarization state, and a specular transmittance of greater than about 20% for at least one wavelength in an infrared wavelength range for each of the first polarization state and an orthogonal second polarization state.

These and other aspects will be apparent from the following detailed description. In no event, however, should this brief summary be construed to limit the claimable subject matter.

BRIEF DESCRIPTION OF THE DRAWINGS

FIG. 2C is a schematic cross-sectional views of an optical film.

FIG. 5B is a schematic plan view of an illustrative structured major surface.

FIGS. 6A-6C schematically illustrate the shape and configuration of illustrative elongated structures.

FIGS. 10A-10B are schematic cross-sectional views of layers or films illustrating substantially normally incident light and diffusely and specularly transmitted light.

FIGS. 12A-12B are schematic cross-sectional views of illustrative structured mirrors.

FIGS. 13A, 13B and 14 are schematic plots of transmittance versus wavelength.

DETAILED DESCRIPTION

Figure 1:
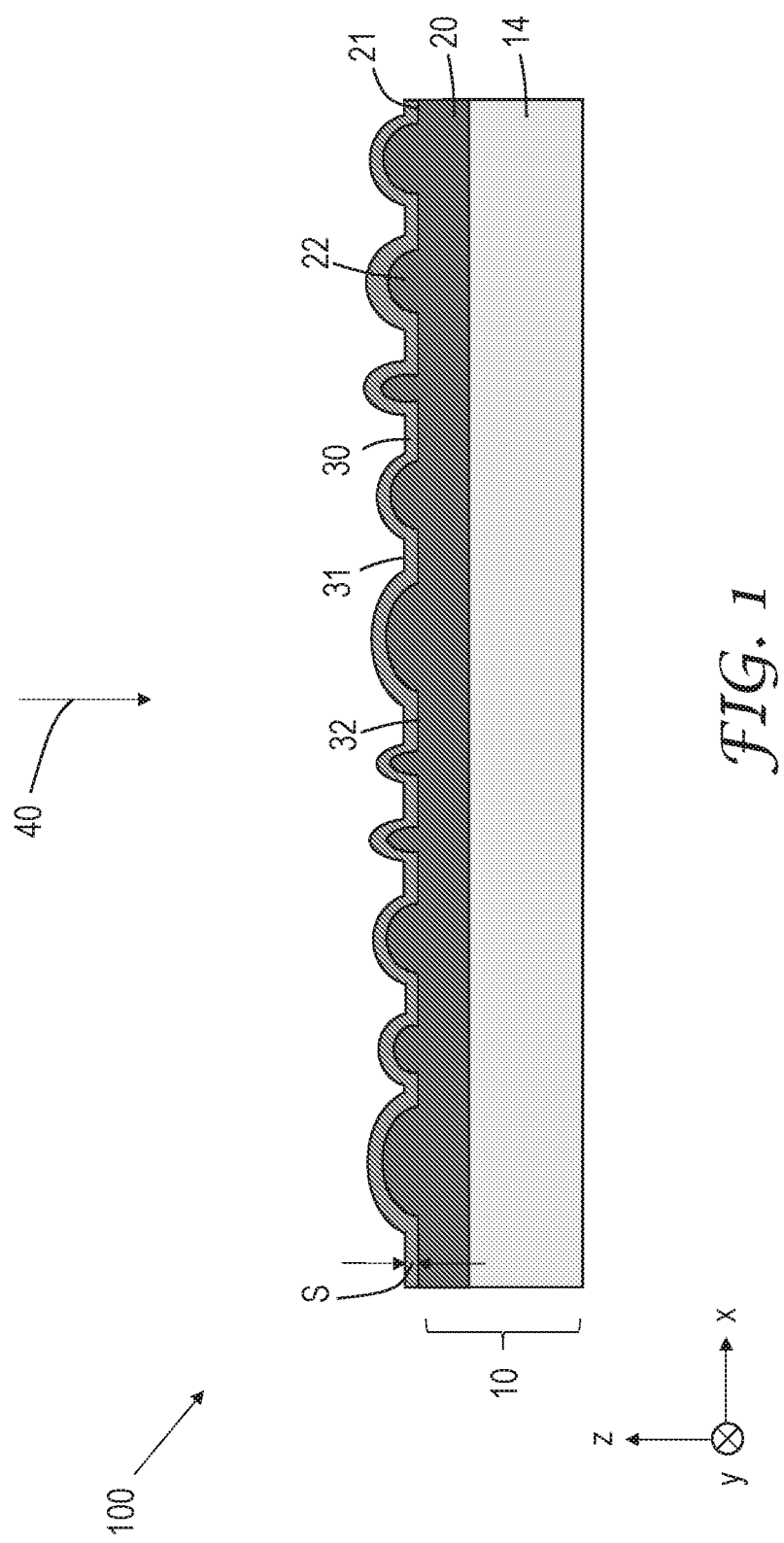
FIG. 1 is a schematic cross-sectional view of an illustrative reflective polarizer.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments, an optical construction includes a reflective polarizer and at least one optically diffusive layer. For example, the optical construction can include a reflective polarizer having a structured outer surface and a first optically diffusive layer disposed on and conforming to the structured outer surface and can further include an optically diffusive film including a second optically diffusive layer. An optically diffusive layer (e.g., at least one of the first and second optically diffusive layers) can include particles dispersed so as to form aggregates of the particles with voids (air space) between the aggregates. In some embodiments, the optically diffusive layer provides a substantially higher degree of specular transmittance in an infrared range than in a visible range. Alternatively, or in addition, the optically diffusive layer can provide a substantially higher degree of diffuse transmittance in a visible range than in an infrared range, according to some embodiments. In some embodiments, the particles are nanoparticles and the aggregates have an average size of less than about 1 micron. In other embodiments, the aggregates can be larger (e.g., up to about 10 microns, or from about 1 micron to about 10 microns, or from about 5 microns to about 10 microns).

According to embodiments, a plurality of spaced-apart, elongated structures are disposed on an optical layer (e.g., on a side of an optically diffusive film opposite a reflective polarizer) and may impart a surface roughness that lowers the coefficient of friction and eliminates or reduces damage to adjacent films, and which may prevent optical defects (e.g., wet-out, moiré patterns, Newton's rings and similar effects) between adjacent films. The elongated structures may be referred to as anti-wet out (AWO) structures. In some cases, these elongated structures may be printed onto an optical film, or may be created and placed by another process (e.g., microreplication).

According to some embodiments, the optical constructions are useful in display applications or other applications where it is desired to provide scattering of visible light (e.g., substantially optically diffuse transmission) with minimum scattering of light in an infrared range (e.g., substantially optically specular transmission). For example, in liquid crystal displays (LCDs) that include a fingerprint detection system with an infrared light source and with an infrared sensor behind a backlight, it is typically desired that the infrared light from the infrared light source is transmitted to an outer surface of the display and then, if a finger is present, reflected from the finger and transmitted through the display and through the backlight to the infrared sensor with minimal scattering. LCD backlights also often include optical diffuser(s) for defect hiding, for example. Traditional optical diffusers typically scatter both visible light and light in the wavelength range of the infrared light (e.g., in a wavelength range from about 930 nm to about 970 nm) source making them unsuitable or undesirable for use in the backlight when fingerprint detection using infrared light is desired. According to some embodiments, the optical constructions provide a desired optical diffusion of visible light without substantially scattering the infrared light.

According to some embodiments, a display system includes the optical construction. In some embodiments, the display system further includes a structured mirror including a discontinuous coating on a surface of an optical mirror. The discontinuous coating may impart a surface roughness that lowers the coefficient of friction and eliminates or reduces damage to adjacent films. In some embodiments, the discontinuous coating may be substantially transparent to near infrared wavelengths, enabling infrared sensor functionality behind an LCD panel. In some embodiments, the discontinuous coating may include discrete raised features, such as rounded bumps. In some embodiments, the discrete features may be added to an optical mirror using a technique such as flexographic printing (or similar printing process). In some embodiments, other techniques or processes may be used to add the discrete features to the optical mirror.

FIG. 1 is a schematic cross-sectional view of a reflective polarizer 100 including a reflective polarizer 10 and an optically diffusive layer 30, according to some embodiments. The reflective polarizer 10 has a first outer layer 20 which may include a first structured major surface 21 and may include a plurality of spaced apart first structures 22 arranged across the first structured major surface 21. The first structures 22 may be included to reduce or prevent wet-out with an adjacent film (wet-out in this context generally refers to the unintended integration of two surfaces in contact, leading to unwanted optical effects) and/or to reduce friction with an adjacent film to reduce damage to the reflective polarizer 100 or to the adjacent film, for example. The first structures 22 may be formed using particles as described further elsewhere herein. The reflective polarizer 10 includes a plurality of polymeric layers 14 (individual layers are not shown in the schematic illustration of FIG. 1; see, e.g., FIGS. 2A-2C). The first structured major surface 21 faces away from the plurality of polymeric layers 14. The optically diffusive layer 30 is conformably disposed on the first structured major surface 21 of the outer layer 20 so that opposing first and second major surfaces 31 and 32 of the optically diffusive layer 30 substantially conform to the first structured major surface 21. For example, the first and second major surfaces 31 and 32 can conform to the first structured major surface 21, or nominally conform to the first structured major surface 21, or conform to the first structured major surface 21 up to variations small compared to the heights of the first structures 22 (e.g., less than about 30%, or less than about 20%, or less than about 10% of the heights of the first structures 22). In some embodiments, the first and second major surfaces 31 and 32 define an average spacing S of from about 200 to about 5000 nm therebetween. In some embodiments, the average spacing S is from about 200 nm to about 2000 nm, or from about 200 nm to about 1500 nm, or from about 300 nm to about 1200 nm. Reflection and transmission properties of the reflective polarizer 100 can be described for substantially normally incident (e.g., nominally normally incident or within 30 degrees, or within 20 degrees, or 10 degrees of a normal (z-direction) to the x-y plane when the optical construction extends in the x-y plane and has a thickness in the z-direction) light 40 as described further elsewhere. The light 40 can be incident on either side of the reflective polarizer 100 (e.g., along the −z direction as schematically illustrated in FIG. 1 so that the light is first incident on the optically diffusive layer 30 or along the +z direction as schematically illustrated in FIG. 3A so that the light is first incident on the reflective polarizer 10). Similarly, incident light depicted in other figures can be incident from either side of the depicted optical element.

In some embodiments, the reflective polarizer 10 is a multilayer optical film reflective polarizer. As is known in the art, multilayer optical films including alternating polymeric layers can be used to provide desired reflection and transmission in desired wavelength ranges by suitable selection of layer thicknesses. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example.

Figure 2A:
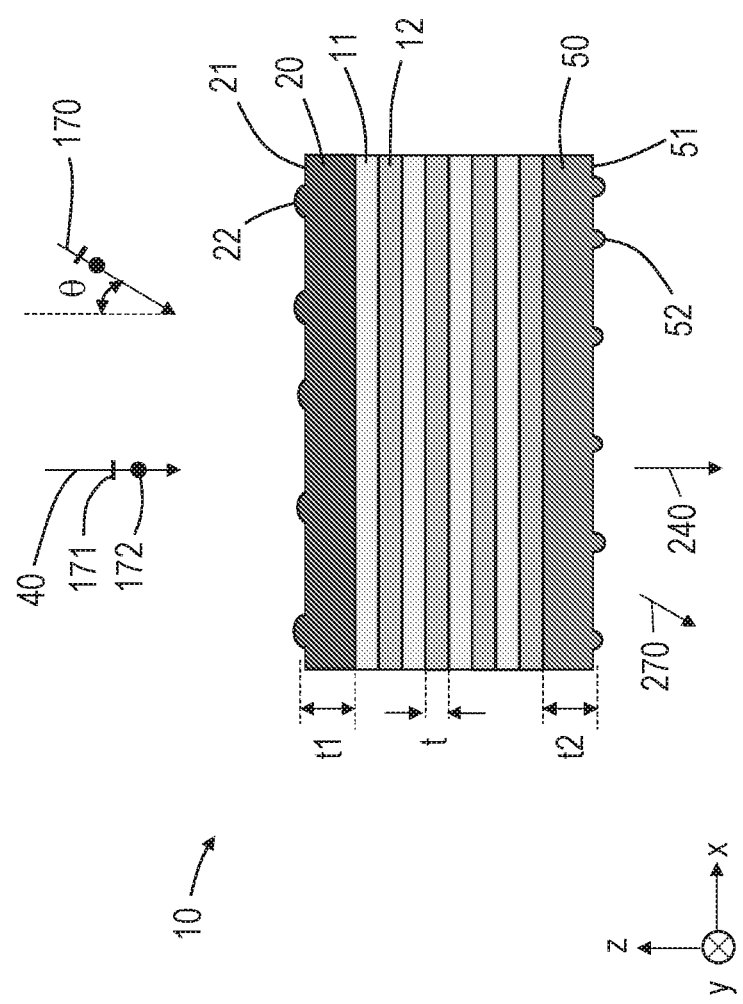
FIGS. 2A-2B are schematic cross-sectional views of illustrative reflective polarizers.
Figure 2B:
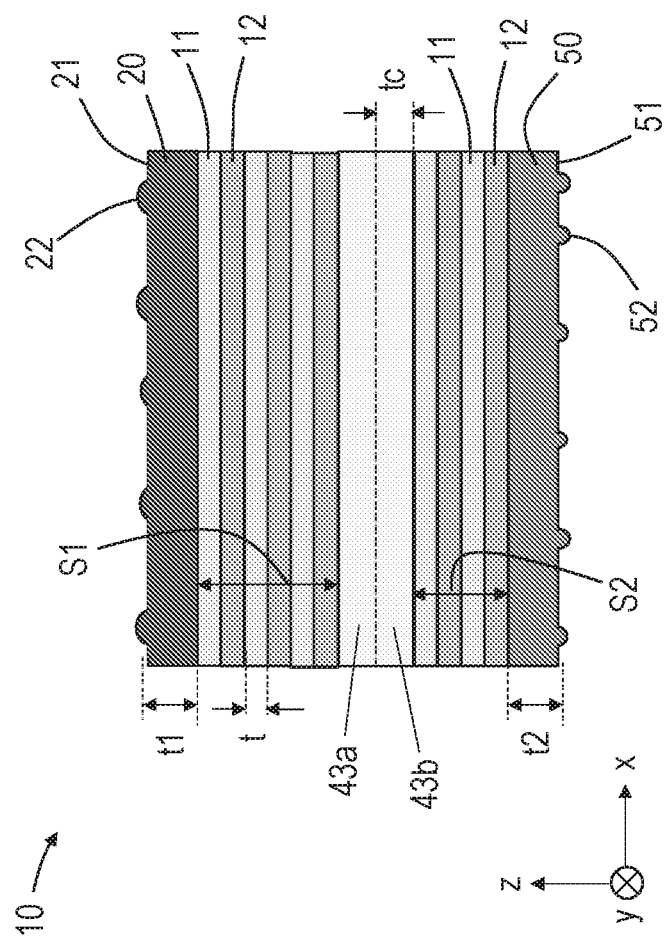
Figure 3A:
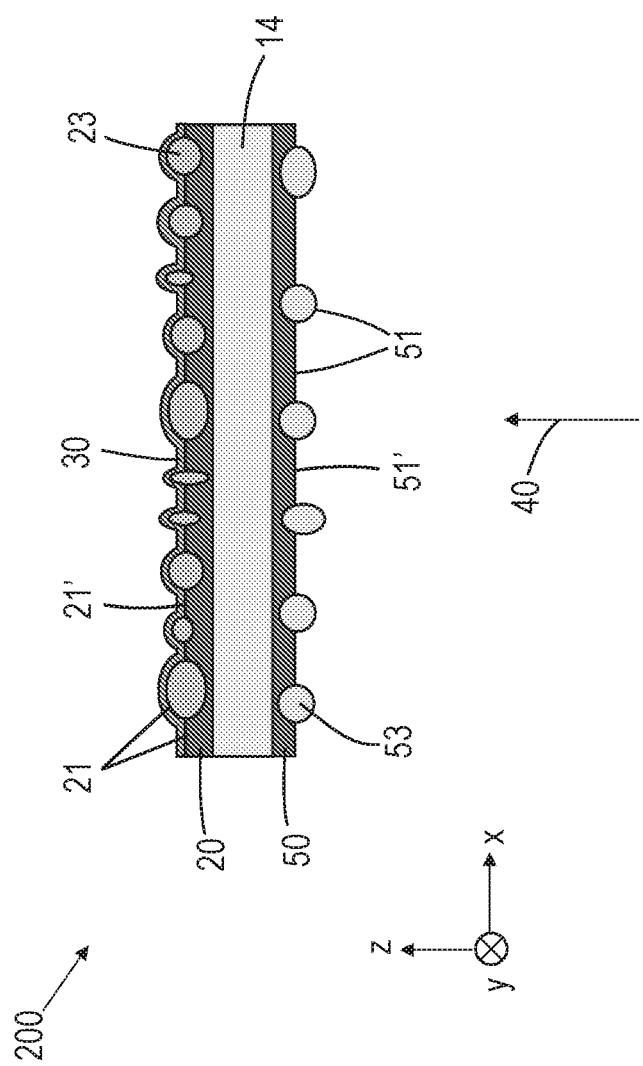
FIG. 3A is a schematic cross-sectional view of an illustrative reflective polarizer having an outer layer including particles partially protruding from a major surface thereof.

FIGS. 2A-2B are schematic cross-sectional views of reflective polarizers, according to some embodiments. The reflective polarizer 10, in the embodiments of FIGS. 2A-2B, includes a plurality of polymeric layers 11, 12 (e.g., with layers 11 and 12 alternating with one another). The number of layers can be substantially larger than shown in the schematic illustrations of FIGS. 2A-2B. In some embodiments, the plurality of polymeric layers 11, 12 number at least 20 in total (e.g., 20 to 1000, or 30 to 500, or 40 to 400). Each of the polymeric layers 11, 12 can have an average thickness t of less than about 500 nm, or less than about 350 nm, or less than about 300 nm. The polymeric layers 11, 12 may be referred to as interference layers or microlayers. The reflective polarizer 10 further includes a first outer layer 20 which may be co-extruded and/or co-stretched with the plurality of polymeric layers 11, 12 (e.g., first outer layer 20 can be an outermost layer that is co-extruded with the polymeric layers 11, 12). The first outer layer 20 can have an average thickness t1 greater than about 0.5 microns, or greater than about one micron, or greater than about 2 microns, or greater than about 3 microns, or greater than about 5 microns. The first outer layer 20 includes a first structured major surface 21 facing away from the first and second polymeric layers and including a plurality of spaced apart first structures 22 arranged across the first structured major surface 21.

In some embodiments, the reflective polarizer 10 further includes a second outer layer 50, opposite the first outer layer 20 which may be co-extruded and/or co-stretched with the polymeric layers 11, 12 (e.g., second outer layer 50 can be an outermost layer that is co-extruded with the polymeric layers 11, 12) and which has an average thickness t2 greater than about 0.5 microns. In some embodiments, the second outer layer 50 includes a second structured major surface 51 facing away from the polymeric layers 11, 12 and including a plurality of spaced apart second structures 52 arranged across the second structured major surface 51. The second structures 52 may be included to reduce wet-out with an adjacent film and/or to reduce friction with an adjacent film to reduce damage to the reflective polarizer 10 or to the adjacent film, for example. In other embodiments, the second structures 52 may be omitted. In some embodiments, the reflective polarizer 10 includes protective boundary layers on each side of a packet of the polymeric layers 11, 12 to protect the polymeric layers 11, 12 during processing as is known in the art. In some embodiments, as schematically illustrated in FIG. 2B, the reflective polarizer 10 includes two packets of polymeric layers 11, 12 so that the plurality polymeric layers 11, 12 includes a plurality of first polymeric layers (the upper set of layers 11, 12 in FIG. 2B, which may be referred to as a first packet) spaced apart along a thickness direction (z-direction) of the reflective polarizer from a plurality of second polymeric layers (the lower set of layers 11, 12 in FIG. 2B, which may be referred to as a second packet) by one or more middle layers 43a, 43b. The one or more middle layers 43a, 43b can be two protective boundary layers, or a single layer formed from two protective boundary layers, for example. In some embodiments, each of the first and second polymeric layer 11, 12 have an average thickness of less than about 350 nm or less than about 300 nm, and each of the one or more middle layers 43a, 43b has an average thickness tc of greater than about 500 nm, or greater than 1 microns, or greater than 3 microns, or greater than about 5 microns. In some embodiments, a smallest separation between the first outer layer 20 and the one or more middle layers 43a, 43b is S1, and a smallest separation between the second outer layer 50 and the one or more middle layers 43a, 43b is S2, where S1>S2. In some embodiments, S1>1.1 S2 or S1>1.2 S2. When the reflective polarizer 10 is used in a display, the first outer layer 20 can face the display panel and the second outer layer 50 can face the backlight (see, e.g., FIGS. 19-21). The first packet (the plurality of first polymeric layers having total thickness S1) may be used to reflect primarily in a red-infrared range, while the second packet (the plurality of first polymeric layers having total thickness S1) may be used to primarily reflect in a visible range. According to some embodiments, having the second packet face the backlight and the first packet face the display panel results in visible light from the backlight being reflected sooner since the layers reflecting the light face the backlight, and results in a reduced color shift of the display output.

Substantially normally incident light 40 and light 170 incident at an incident angle θ are schematically illustrated in FIG. 2A. First and second polarization states 171 (polarized in x-z plane) and 172 (polarized along y-axis) are schematically illustrated. In some embodiments, the first polarization state 171 is a pass polarization state and the second polarization state 172 is a block polarization state. Block and pass polarization states may alternatively be labeled first and second polarization states, respectively. Portions of the incident lights 40 and 170 are transmitted as lights 240 and 270, respectively. Lights 240 and 270 typically are primarily polarized in the first polarization state when this is the pass state for the reflective polarizer. In some embodiments, the reflective polarizer 10 is a collimating reflective polarizer. Collimating reflective polarizers are known in the art and are described in U.S. Pat. No. 9,441,809 (Nevitt et al.) and U.S. Pat. No. 9,551,818 (Weber et al.), for example. In some embodiments, for the first polarization state 171 and a visible wavelength range (e.g., 450 nm to 650 nm), the reflective polarizer 10 has a greater average optical transmittance (e.g., light 240) for light (e.g., light 40) incident at a smaller incident angle and a smaller average optical transmittance (e.g., light 270) for light (e.g., light 170) incident at a greater incident angle (e.g., θ). In some embodiments, the first polarizations state is a p-polarization state (polarized in the plane of incidence) and the greater incident angle is less than about 50 degrees, or less than about 40 degrees. In some embodiments, the reflective polarizer has a greater average optical transmittance for light incident at a smaller incident angle and a smaller average optical transmittance for light incident at a greater incident angle for light in a pass polarization state for each of a p-pol and an s-pol light. In some embodiments, a difference between the greater average optical transmittance and the smaller average optical transmittance is at least about 10%, or at least about 20%, or at least about 30%.

A mirror film or optical mirror may also appear as schematically illustrated in FIG. 2A-2B. In some embodiments, the outer layers 20, 50 are unstructured. FIG. 2C is a cross-sectional view of a multilayer optical film 10', which may be a reflective polarizer or an optical mirror, for example. In some embodiments, the optical film 10' is an optical mirror including a plurality of alternating first and second polymeric layers 11 and 12 where each first and second polymeric layer is less than about 500 nm thick, or less than about 350 nm thick, or less than about 300 nm. In some embodiments, the optical film 10' includes a single packet (e.g., as in FIG. 2A) between first and second outer layers 20 and 50 so that each layer between the outer layers 20 and 50 has an average thickness less than 350 nm or less than 300 nm, for example. In some embodiments, the plurality of polymeric layers 11, 12 include a plurality of first polymeric layers spaced apart along a thickness direction of the reflective polarizer from a plurality of second polymeric layers by one or more middle layers (see, e.g., FIG. 2B), where each of the pluralities of first and second polymeric layers have an average thickness of less than about 350 nm, and each of the one or more middle layers have an average thickness of greater than about 500 nm.

Other suitable reflective polarizers and optical mirrors are described in U.S. provisional co-pending applications 63/021,743 titled OPTICAL FILM and 62/704,400 titled OPTICAL FILM, both filed on May 8, 2020 and hereby incorporated herein by reference to the extent that they do not contradict the present description.

FIG. 3A is a schematic cross-sectional view of a reflective polarizer 200, according to some embodiments. The reflective polarizer 200 may generally correspond to the reflective polarizer 100, except that the reflective polarizer 200 includes the second outer layer 50 opposite the first outer layer 20 and the first outer layer 20 includes particles 23. In some embodiments, the first outer layer 20 includes a plurality of first particles 23 partially protruding from a first major surface 21' thereof to form a first structured major surface 21. The plurality of polymeric layers 14 can be co-extruded with the first outer layer 20. In some embodiments, the second outer layer 50 is co-extruded with the plurality of polymeric layers 14 and the first outer layer 20. In some embodiments, the second outer layer 50 includes a plurality of second particles 53 partially protruding from a second major surface 51' thereof to form a second structured major surface 51. In some embodiments, the first particles 23 have an average size of from about 7 to about 9 microns. It has been found that undesired optical effects (e.g., interference fringes) can result when a reflective or partially reflective film (e.g., another reflective polarizer) is disposed on a reflective polarizer with a structured surface. Choosing the average size of the first particles to be in a range from about 7 to about 9 microns has been found to substantially reduce or eliminate these undesired optical effects. In some embodiments, the second particles may also have an average size from about 7 to 9 microns. In other embodiments, the average size is in a different range for the second particles 53 than the first particles 23 since the second structured surface 51 is typically disposed to face a diffuser (see, e.g., FIG. 11) rather than a more reflective film, for example. In some embodiments, the second particles 53 have an average size less than the average size of the first particles 23. In some embodiments, the second particles 53 have an average size of less than about 6 microns or the average size can be in a range of about 1 micron or about 2 microns to about 6 microns, for example. In some embodiments, the second particles 53 have an average size about the same as (e.g., within 10% or within 5%) the average size of the first particles 23. In some embodiments, the second particles 53 have an average size greater than the average size of the first particles 23. In some embodiments, the second particles 53 have an average size greater than about 3 microns, or greater than about 5 microns, or greater than about 10 microns, or greater than about 15 microns. In some embodiments, the second particles have an average size in a range of about 3 microns to about 20 microns, for example.

In some embodiments, the second outer layer 50 includes a plurality of particles 53 partially sunk therein and forming the second structured major surface 51. In some embodiments, the first outer layer 20 includes a plurality of particles 23 partially sunk therein and forming the first structured major surface 21. Related reflective polarizers with structured outer major surfaces are described in U.S. provisional co-pending application 63/021,765 titled REFLECTIVE POLARIZER WITH IMPROVED OPTICAL CHARACTERISTICS and filed on May 8, 2020, and hereby incorporated herein by reference to the extent that it does not contradict the present description.

Figure 3B:
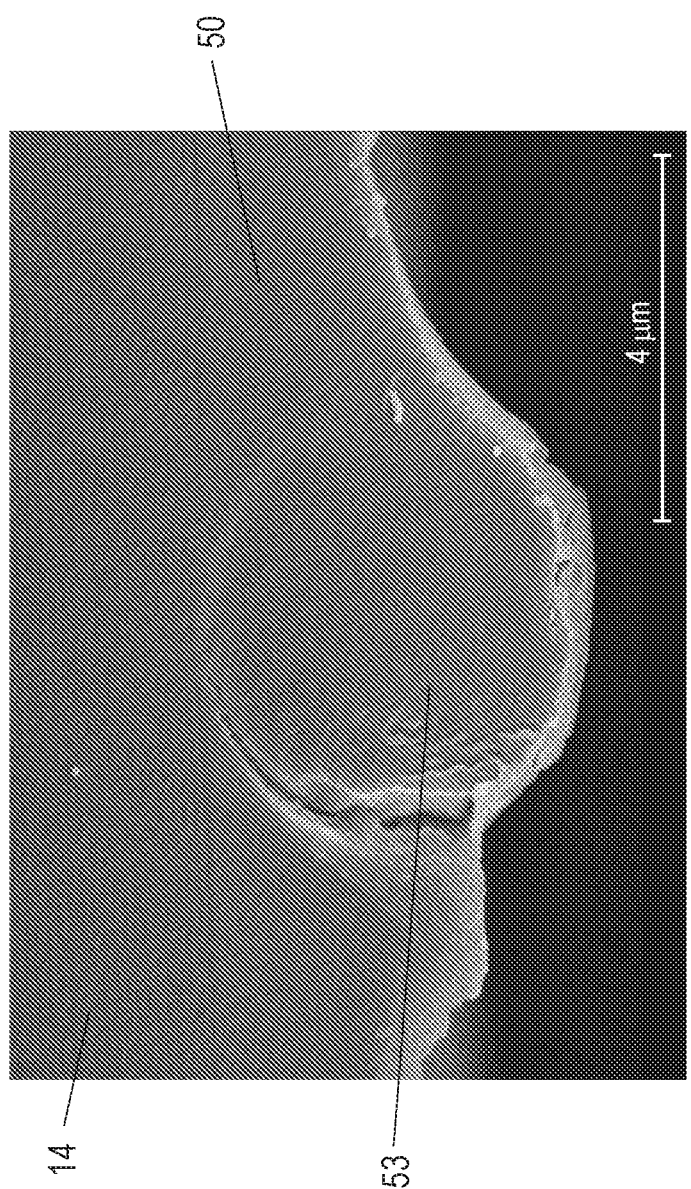
FIGS. 3B-3C are images of cross-sections of portions of an illustrative reflective polarizer where each image shows a particle partially protruding from an outer layer of the reflective polarizer.
Figure 3C:
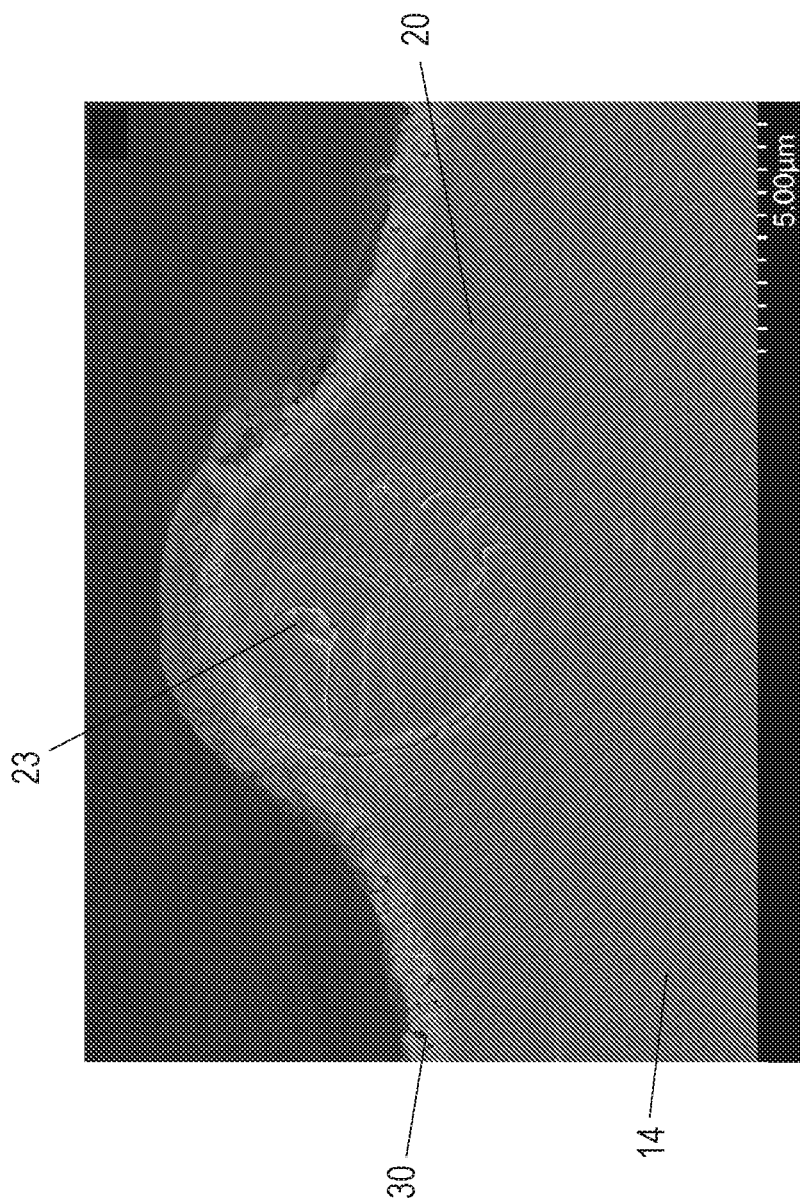

The particles can be applied in a coating to an outermost major surface of a cast web, the coating dried and the cast web stretched (e.g., uniaxially or biaxially to orient the film) to form an optical film. This can result in the particles partially sinking into an outer layer of the film so that the particle partially protrudes from a major surface of the outer layer. The coating may optionally be applied between sequential stretching in a sequential stretching process to change the modulus/thickness of the outermost layer which may affect the particles partially sinking into the outermost layer. FIG. 3B is a scanning electron microscope (SEM) image of a cross-section of a portion of a multilayer optical film reflective polarizer showing a particle 53 partially protruding from a major surface of an outer layer 50 of the reflective polarizer to form a structured major surface. FIG. 3C is an SEM image of a cross-section of a portion of a multilayer optical film reflective polarizer showing a particle 23 partially protruding from a major surface of an outer layer 20 of the reflective polarizer to form a structured major surface. The reflective polarizer includes an optically diffusive layer 30 substantially conforming to the structured major surface. An outer layer of a film can be described as co-extruded with a plurality of polymeric layers of the film if a continuous portion (e.g., a continuous polymeric phase) of the outer layer is co-extruded with the plurality of polymeric layers, even when particles or other components (e.g., polymer from particle coating) are subsequently (after co-extrusion) added to the outer layer, as the layer will exhibit the properties of a co-extruded layer (e.g., bonding to an adjacent layer without an adhesive). For example, an outer layer that is co-extruded with the polymeric layers 11, 12 may be described as including the particles partially sunk into the outer layer and may be described as being co-extruded with the polymeric layers 11, 12 even if the particles are partially sunk into the layer after it is first formed by co-extrusion with the polymeric layers 11, 12. The particles can be surface coated particles where the surface coating on the particle is formed from a polymer from the mixture used to coat the particles onto the outer layer. In some embodiments, the mixture containing the particles includes a polyester (e.g., the mixture can be an aqueous mixture containing a water soluble polyester), and in some embodiments, the co-extruded outer layer includes a polyester. In some such embodiments, this provides close refractive index matching between the polyester of the coating and the co-extruder layer and the coated polyester can be stretched under similar conditions as the coextruded web. Also, the coated polyester can be compatible with a coated optically diffusive layer.

Alternatively, instead of describing a co-extruded outer layer as including the particles added after co-extrusion, the reflective polarizer can be described as including the particles partially protruding from a major surface of the co-extruded layer.

In other embodiments, particles are included in one, but not the other, of the first and second outer layers to form the respective major surface. For example, a structured surface can be formed by embossing, casting and curing, or other technique that does not utilize the particles to for the structures.

Figure 4A:
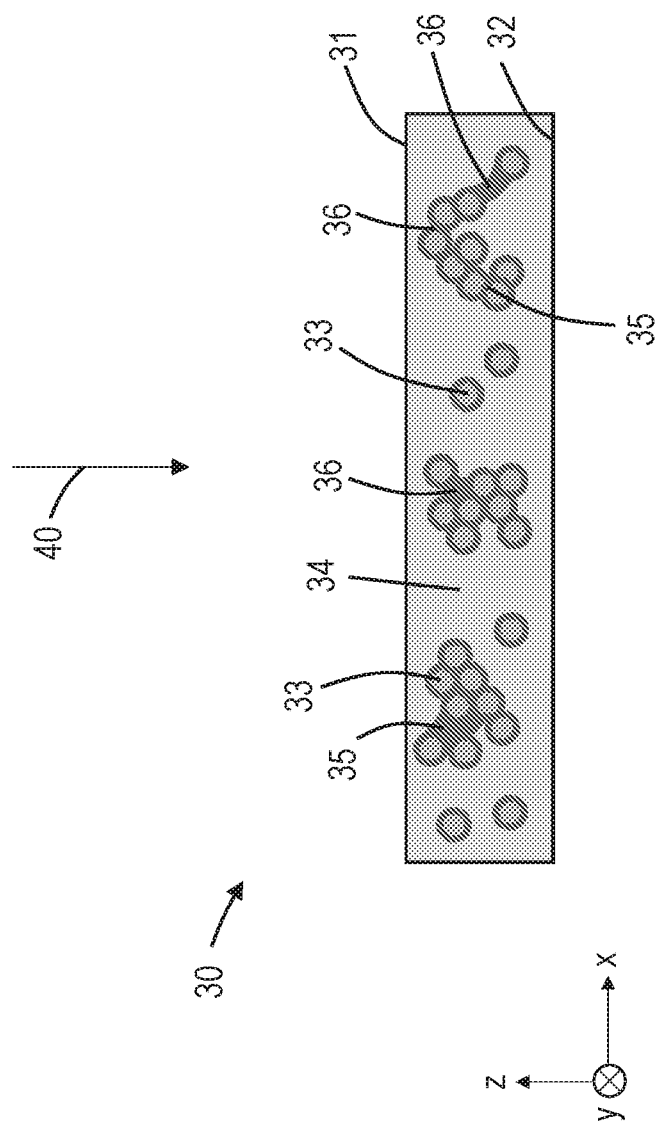
FIG. 4A is a schematic cross-sectional view of an illustrative optically diffusive layer.
Figure 4B:
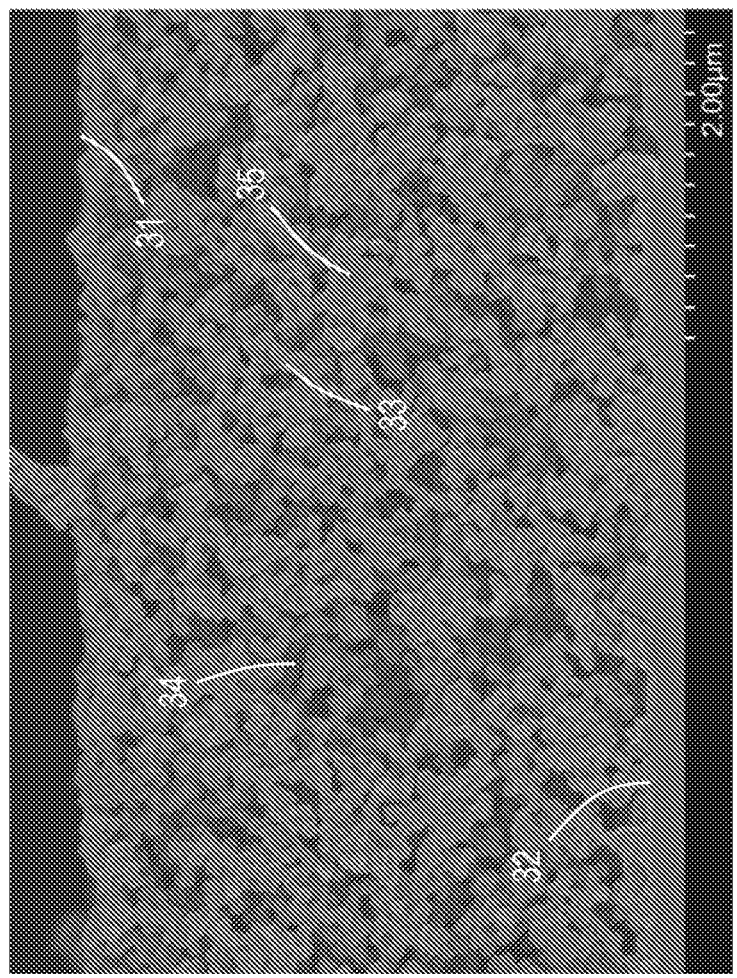
FIG. 4B is a scanning electron microscope (SEM) image of an exemplary optically diffusive layer.

FIG. 4A is a schematic cross-sectional view of an optically diffusive layer 30, according to some embodiments. The optically diffusive layer 30 schematically shown in FIG. 4A can be a portion of the optically diffuse layer 30 schematically shown in FIG. 1, for example and/or can be a portion of the optically diffusive layer 120 of FIG. 5A, for example. FIG. 4B is a scanning electron microscope (SEM) image of an exemplary optically diffusive layer 30. The optically diffusive layer 30 includes a plurality of nanoparticles 33 dispersed between and across the first and second major surfaces 31 and 32 of the optically diffusive layer 30. The nanoparticles can have an average size of from about 10 nm to about 150 nm, or from about 20 nm to about 150 nm and define a plurality of voids 34 therebetween. In some embodiments, the nanoparticles 33 in the optically diffusive layer 30 aggregate to form a plurality of nanoparticle aggregates 35 having an average size of between about 100 nm and about 10 microns or between about 100 nm and about 1000 nm. In other embodiments, the aggregates can be larger (e.g., up to about 10 microns, or from about 1 micron to about 10 microns, or from about 5 microns to about 10 microns). In some embodiments, a polymeric material 36 bonds the nanoparticles 33 to each other to form the plurality of nanoparticle aggregates 35 which may define the voids 34 therebetween. In some embodiments, in a plane (e.g., x-z plane) of a cross-section of the optically diffusive layer 30 in a thickness direction (e.g., z-direction) of the optically diffusive layer 30, the voids 34 occupy from about 5% to about 50% of an area of the plane of the cross-section. In some embodiments, the voids 34 occupy from about 5% to about 45% or to about 40% of an area of the plane of the cross-section. In some embodiments, the voids 34 occupy from about 10% or about 15% to about 50%, or to about 45%, or to about 40% of an area of the plane of the cross-section.

In some embodiments, the optically diffusive layer 30 is formed by coating a mixture of the particles, monomer and a solvent, and then curing and drying the mixture. The monomer cures into a polymeric binder (polymeric material 36) bonding aggregates of the particles together and the solvent evaporates forming voids between the aggregates. The solvent can evaporate at least partially during curing and/or a subsequent drying step can be used to complete evaporation of the solvent. In some embodiments, the curing and drying includes a pre-cure step, then a drying step, and then a post-cure step. In some embodiments, the monomer is ultraviolet (UV) curable and a photoinitiator is included in the mixture. The size of the aggregates can be adjusted by changing the UV power used to cure the monomer with a higher power generally resulting in smaller aggregate size. It has been found that a relatively low amount of photoinitiator with a relative high UV power results in small aggregate size and a non-fragile layer while a higher amount of photoinitiator can result in a more fragile layer. The void fraction can be adjusted by changing the amount of solvent used in the mixture with a higher solvent loading generally resulting in a higher void fraction. In some embodiments, the mixture includes about 20 to about 60 weight percent solids.

In some embodiments, the polymeric material 36 is or includes a radiation cured (e.g., UV cured) polymer. In some embodiments, the polymeric material 36 is or includes an acrylate. In some embodiments, the polymeric material 36 is or includes pentaerythritol triacrylate.

The average particle size of the nanoparticles 33, or other particles described herein, can be the be the mean or median size. For example, the average size can be the Dv50 size (median size in a volume distribution or, equivalently, particle size where 50 percent of the total volume of the particles is provided by particles having a size no more than the Dv50 size). In some embodiments, the nanoparticles 33 have an average size in a range from about 20 nm to about 150 nm, or from about 30 nm, to about 120 nm, or from about 30 nm to about 100 nm, or from about 50 nm to about 90 nm, or from about 60 nm to about 90 nm. In some embodiments, the nanoparticles 33 are or include silica.

The percent of the area of the cross-section occupied by the voids 34 can be determined using image analysis techniques. For example, the optically diffusive layer can be cut by micro-tome and then a scanning electron microscope (SEM) image of the cross-section can be taken and then analyzed using image analysis software to determine the percent area occupied by the voids. The average size of the aggregates can also be determined from an analysis of the image. The size of an aggregate in a cross-section can be the equivalent circular diameter of the agglomerate (i.e., the diameter of a circle having the same area in the cross-section as the agglomerate).

The particles 23 or the structures 22 can have an average particle size (e.g., diameter) of at least about 2, 3, 5, 10 20, or 50 times the average size of the particle aggregates 35.

Related optically diffusive layers are described in U.S. provisional co-pending application 63/021,751 titled OPTICAL FILMS AND STACKS INCLUDING OPTICALLY DIFFUSIVE LAYER and filed on May 8, 2020, and hereby incorporated herein by reference to the extent that it does not contradict the present description.

Figure 5A:
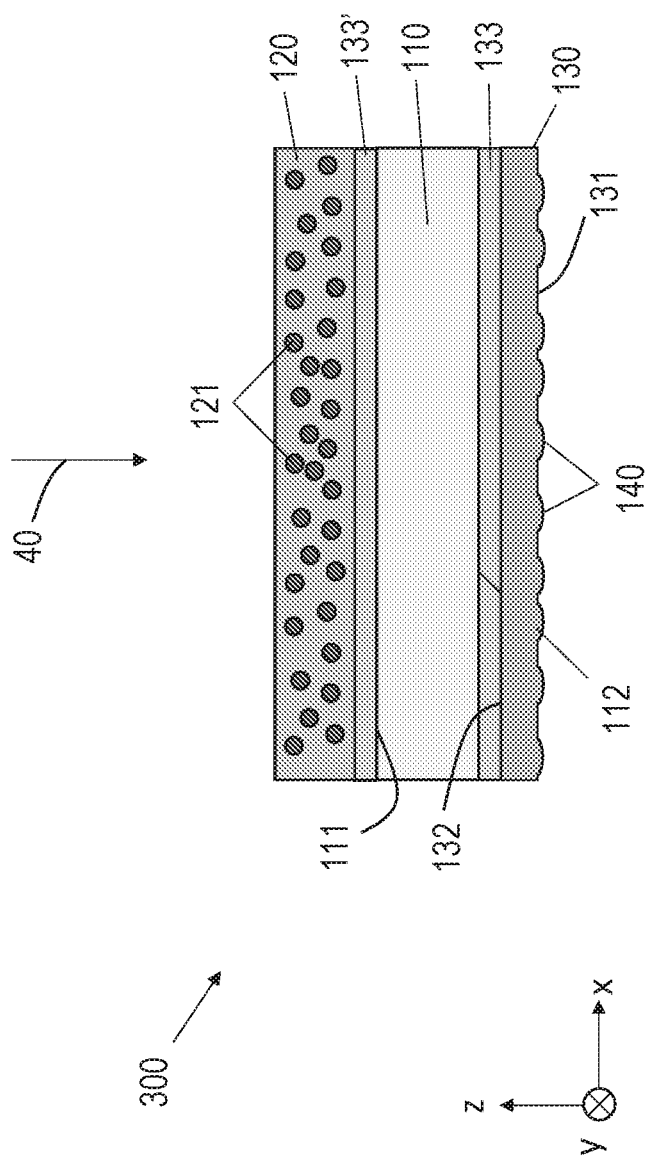
FIG. 5A is a schematic cross-sectional view of an illustrative optically diffusive film.

FIG. 5A is a schematic cross-sectional view of an optically diffusive film 300, according to some embodiments. FIG. 5B is schematic plan view of a major surface 131 of the optically diffusive film 300 according to some embodiments. The optically diffusive film 300 includes an optical substrate layer 110 with a first major surface 111 and a second major surface 112, and an optical layer 130 disposed on the second major surface 112 of the optical substrate layer 110. In some embodiments, an adhesive layer 133 may be disposed between the optical layer 130 and optical substrate layer 110. Alternatively, the optical layer 130 may be formed directly on the optical substrate layer 110 and the adhesive layer 133 may be omitted. In some embodiments, the optical layer 130 has a structured major surface 131 and an unstructured major surface 132. In some embodiments, the structured major surface 131 faces away from the optical substrate layer 110 and includes a plurality of spaced-apart elongated structures 140.

Figure 7A:
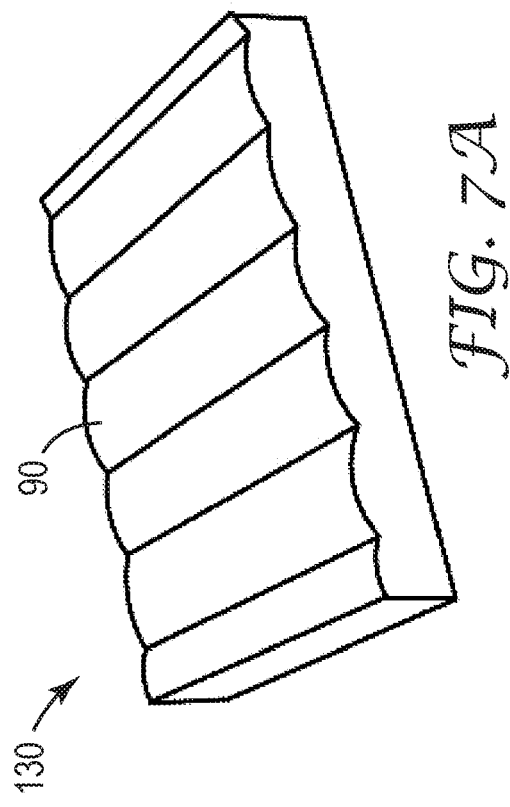
FIGS. 7A-7B schematically illustrate surface features of an illustrative optical layer.
Figure 7B:
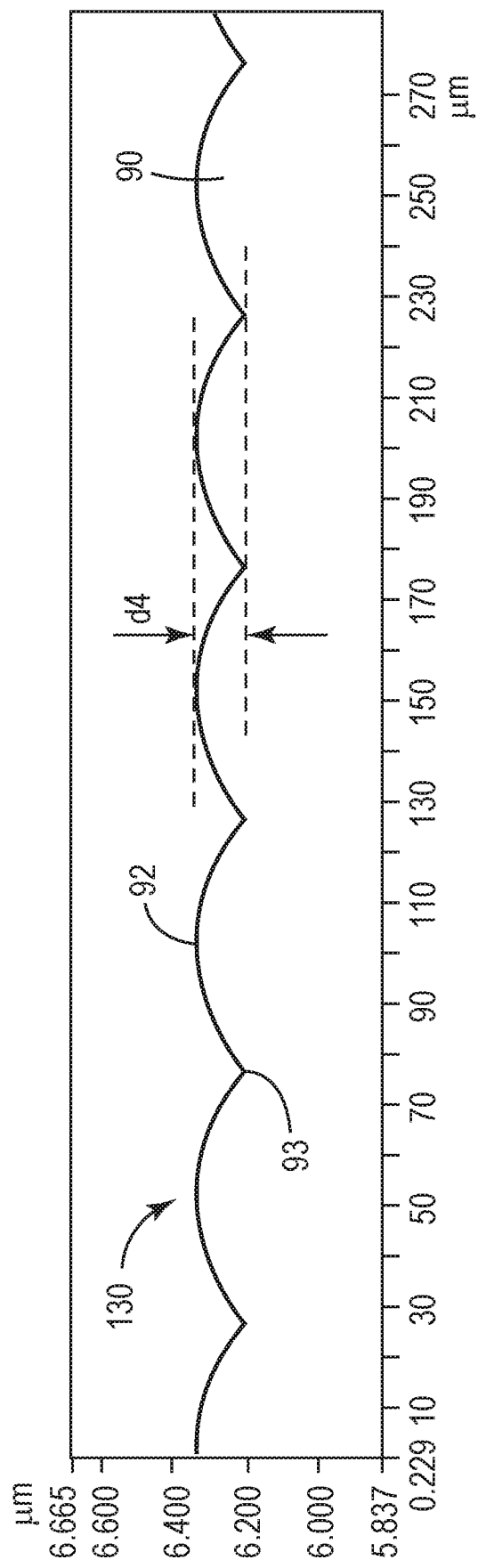
Figure 7C:
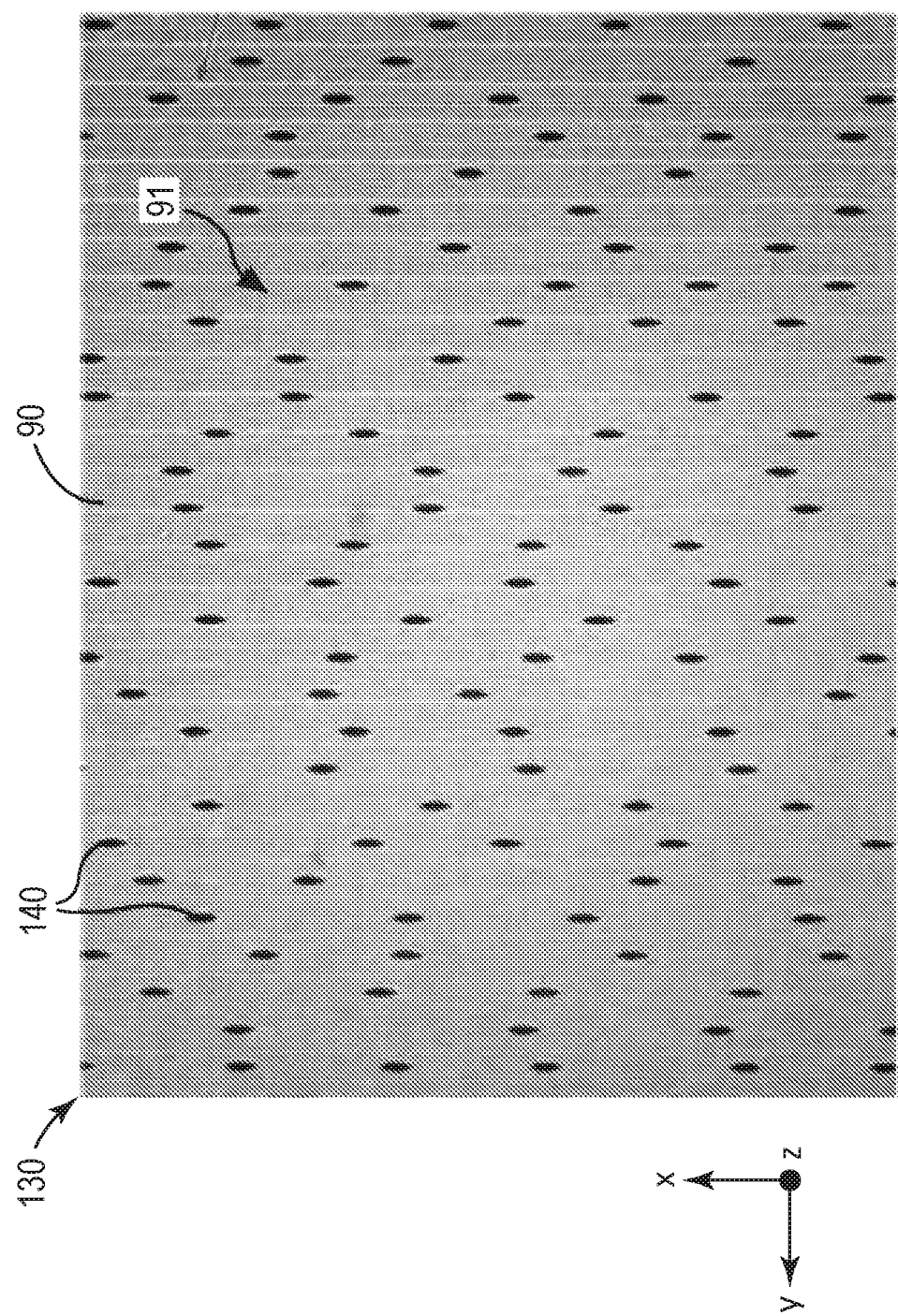
FIG. 7C is an image of an optical layer.

In some embodiments, the elongated structures 140 are elongated along a same first direction (e.g., the x-direction, as shown in FIG. 5A) and may be arranged at a substantially uniform density (e.g., as illustrated in FIGS. 5B and 7C) across the structured major surface 131. In some embodiments, the optically diffusive film 300 further includes an optically diffusive layer 120 disposed on the first major surface 111 of the optical substrate layer 110. In some embodiments, an adhesive layer 133' is disposed between the optically diffusive layer 120 and optical substrate layer 110. Alternatively, the optically diffusive layer 120 may be formed directly on the optical substrate layer 110 and the adhesive layer 133' may be omitted.

In some embodiments, the optically diffusive layer 120 includes a plurality of nanoparticles 121 dispersed therein. In some embodiments, the nanoparticles 121 have an average size of between about 10 nm to about 300 nm. In some embodiments, nanoparticles 121 include silica (e.g., the nanoparticles 121 can be silica nanoparticles), and may provide a diffusing (scattering effect) to at least some wavelengths of light. The optically diffusive layer 120 may be as described for optically diffusive layer 30. For example, in some embodiments, the optically diffusive layer 120 includes a polymeric material (e.g., corresponding to polymeric material 36) bonding the nanoparticles of the optically diffusive layer 120 to each other to form a plurality of nanoparticle aggregates (e.g., corresponding to aggregates 35) defining a plurality of voids (e.g., corresponding to voids 34) therebetween. In some embodiments, in a plane of a cross-section of the optically diffusive layer 120 in a thickness direction of the second optically diffusive layer: the nanoparticles 121 of the optically diffusive layer 120 have an average size between about 20 nm and about 150 nm; an average size of the nanoparticle aggregates is in a range from about 100 nm to about 10 microns; and the voids occupy from about 5% to about 50% or about 15% to about 45% of an area of the plane of the cross-section, or any range described elsewhere.

The elongated structures 140 may be disposed with an irregular, random pattern, or optionally in a regular array or pattern. In some embodiments, the elongated structures 140 are elongated (i.e., they have their longest dimension) along a first direction, such as the x-axis as shown in FIGS. 5A-5B, and are arranged along an orthogonal, second direction, such as the y-axis as shown in FIGS. 5A-5B. The assignment of the coordinate/reference system (i.e., the x, y, and z directions) depicted in FIGS. 5A-5B is an example only for discussion purposes, and other reference systems and arrangements may be used while still being consistent with the present disclosure.

Figure 6B:
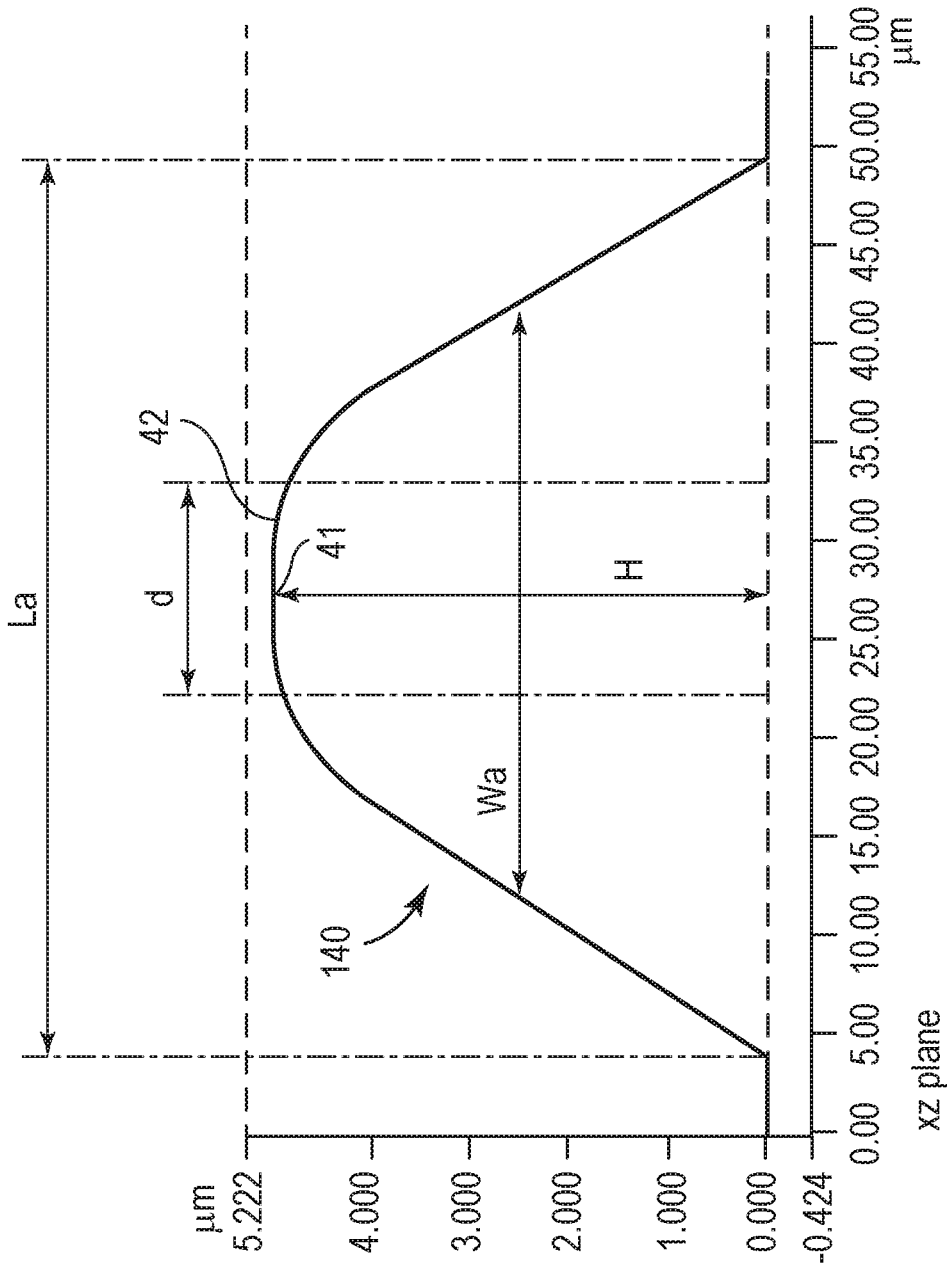
Figure 6C:
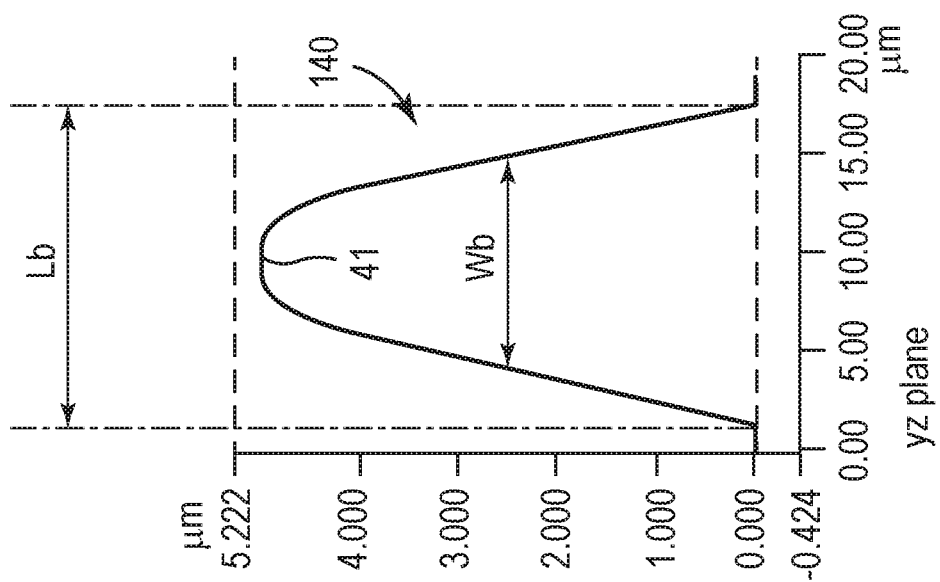

FIGS. 6A-6C provide detailed graphs of the shape and configuration of the elongated structures according to some embodiments, and should be examined together for the following description. FIG. 6A is a top view of one embodiment of an elongated structure 140, including a peak 41 (a highest point of the curve). FIG. 6B shows a plot of the profile view as taken through the x-z plane (e.g., as shown by the reference system of FIGS. 5A-5B), showing a side view of the "canoe" shape (along the length dimension). FIG. 6C shows a plot of the profile view as taken through the y-z plane, showing a front view of the "canoe" shape (along the width dimension). Looking at FIG. 6B, in some embodiments, the elongated structure 140 has a length La and a full width at half maximum (FWHM, or the width seen at half height of the elongated structure 140) Wa. In some embodiments, the elongated structure 140 may have a substantially flat top region 42 with a length d, such that the height variation across the length of d is less than about 5%, or less than about 2.5%, or less than about 1%. In some embodiments, the ratio of d/La is greater than or equal to about 0.15, or greater than or equal to about 0.10, or greater than or equal to about 0.05. Turning to FIG. 6C, in some embodiments, the elongated structure 140 may have a total length Lb (length in the y-z plane) and an FWHM Wb, such that the ratio of Wb/Wa is less than or equal to about 0.6, or less than or equal to about 0.5, or less than or equal to about 0.4. In some embodiments, the elongated structures 140 have an average length (e.g., La) along the first direction and an average width (e.g., Lb) along an orthogonal second direction, where the average length is at least about 2 or at least about 2.5 times the average width. In some embodiments, the elongated structures 140 have an average peak height H between about 2 microns and about 7 microns or between about 3 microns and about 6.5 microns. FIGS. 6A-6C show one possible embodiment of shape, size, and configuration for an elongated structure 140, but are not meant to be limiting. The values on the plots of FIGS. 6B-6C are in microns (μm), and the curves shown in the figures do not necessarily represent an aspect ratio of an actual elongated structure 140 (i.e., the figures provide actual measured data of one embodiment but the plot lines are not necessarily meant to be realistic depictions of an elongated structure 140; for example, the x-axis has been compressed to be able to present the graph on a single page and maintain legibility).

FIGS. 7A-7C illustrate surface features of an (e.g., unitary) optical layer prepared using a microreplication process (a process used to produce microstructures), according to some embodiments the present description. FIG. 7A depicts a portion of an optical layer 130 featuring a plurality of substantially parallel linear structures 90 created by a microreplication process. In some embodiments, creating a film with a microreplication process involves creating a template or master tool, which may take the form of a roll material with periodic surface features (e.g., shaped depressions, cuts, or concave areas, or shaped protrusions or convex structures). A soft material may then be passed between the roll material and a second roller or surface, and the periodic surface features on the roll material create corresponding features on the material passing through which are essentially the negative of the features on the roll material surface. For example, a canoe-shaped depression on the roll material will create a corresponding canoe-shaped structure or projection on the surface of the material. As the material passes through the system, it may be cured (e.g., cured with ultraviolet light or heat) to create a structured film.

Before the periodic surface features can be cut into the surface of the roll material, the outer surface of the roll material must often be prepared using a process where the initial rough outer surface of the roll material is taken off by pressing a hardened tool into the surface of the roll material to cut away the surface in a sequence of passes. Although the outer surface of the roll material is much smoother after this process, the tool used in the process can create very small grooves or ruts in the surface of the roll material. The small grooves remain on the surface of the roll material, even after the periodic surface features are cut or otherwise created on the surface of the roll material. These very small grooves in the roll material create corresponding negative ridges in the film that is created, such as the substantially parallel linear structures 90 shown in optical layer 130 in FIG. 7A. These linear structures 90, as shown in FIG. 7B, are relatively small, and, in some embodiments, the average difference between heights of the peaks 92 and the valleys 93, d4, may be between about 10 nm and about 100 nm, or about 80 nm, or about 60 nm. Comparing this average height difference d4 to the height of a typical elongated structure 140, as shown in FIG. 6B, which is, in some embodiments, around 5 microns, it is seen that the relative height of the linear structures 90 is significantly less than the average height of an elongated structure 140.

FIG. 7C provides an image showing a plan view of an optical layer 130 created using a microreplication process. Faint lines on the image of optical layer 130 are created by differences in illumination created by the alternating peaks 92 and valleys 93 (see FIG. 7B) of the substantially parallel linear structures 90. The surface of optical layer 130, therefore, includes a plurality of elongated structures 140 with substantially parallel linear structures 90 formed in the regions 91 between elongated structures 140. The linear structures 90 extend along the same direction as the elongated structures 140 (e.g., the x-direction as shown in FIG. 7C) and both the linear structures 90 and elongated structures 140 are arranged along an orthogonal second direction (e.g., the y-direction as shown in FIG. 7C).

Figure 8A:
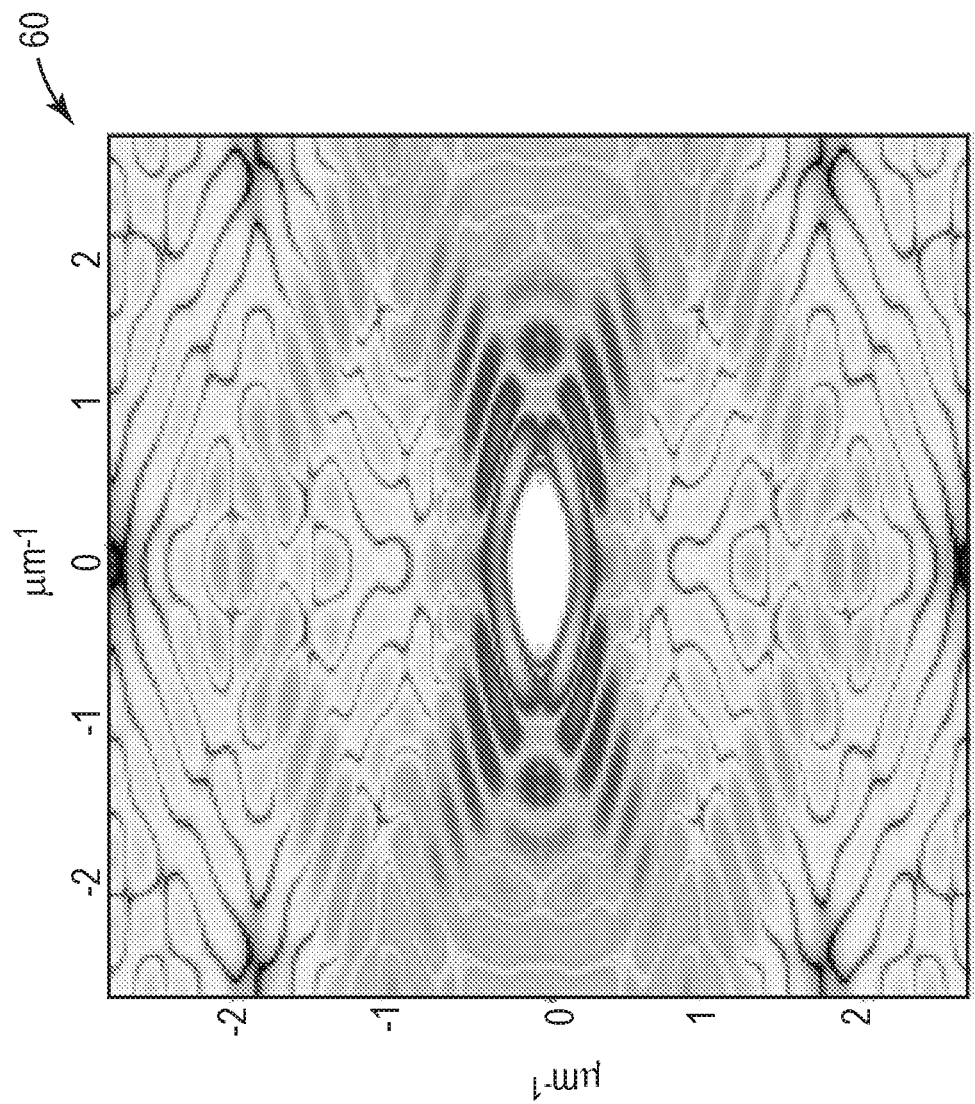
FIGS. 8A-8C are plots of a power spectral density of an illustrative structured surface of an optical layer with elongated structures.
Figure 8C:
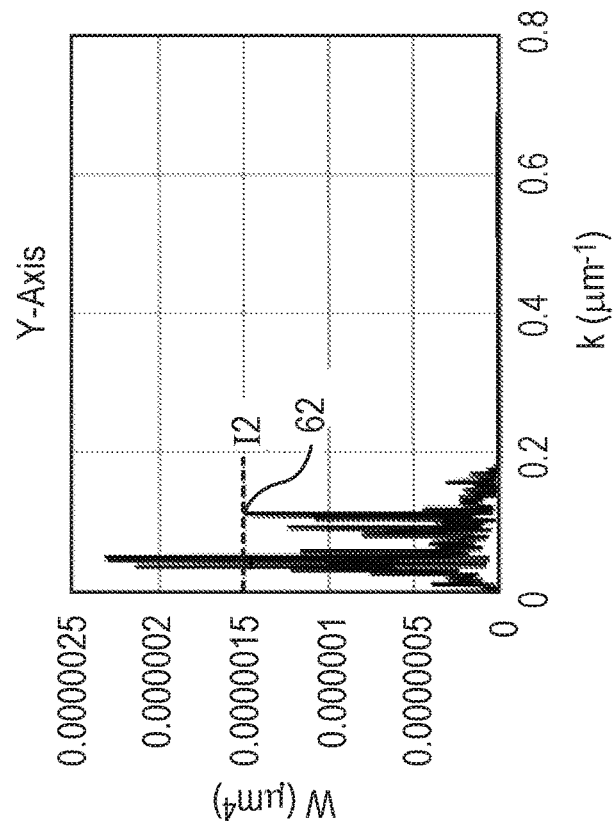
Figure 8B:
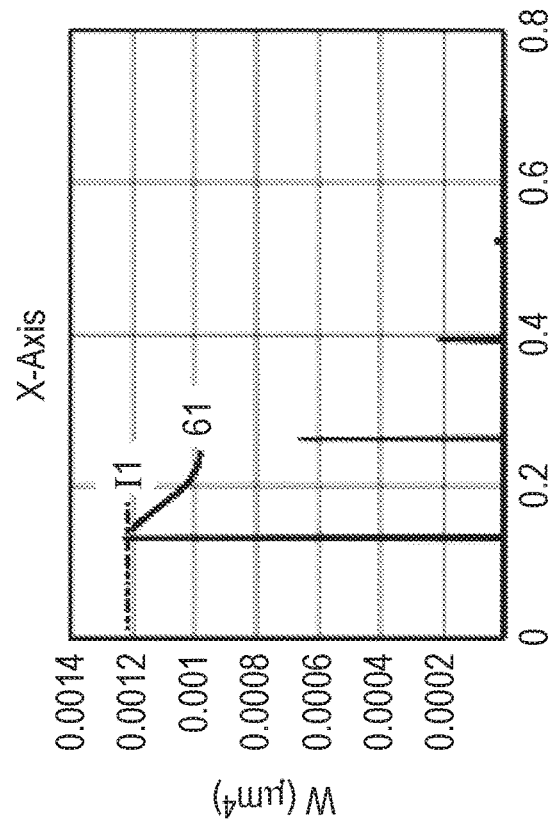
Figure 9A:
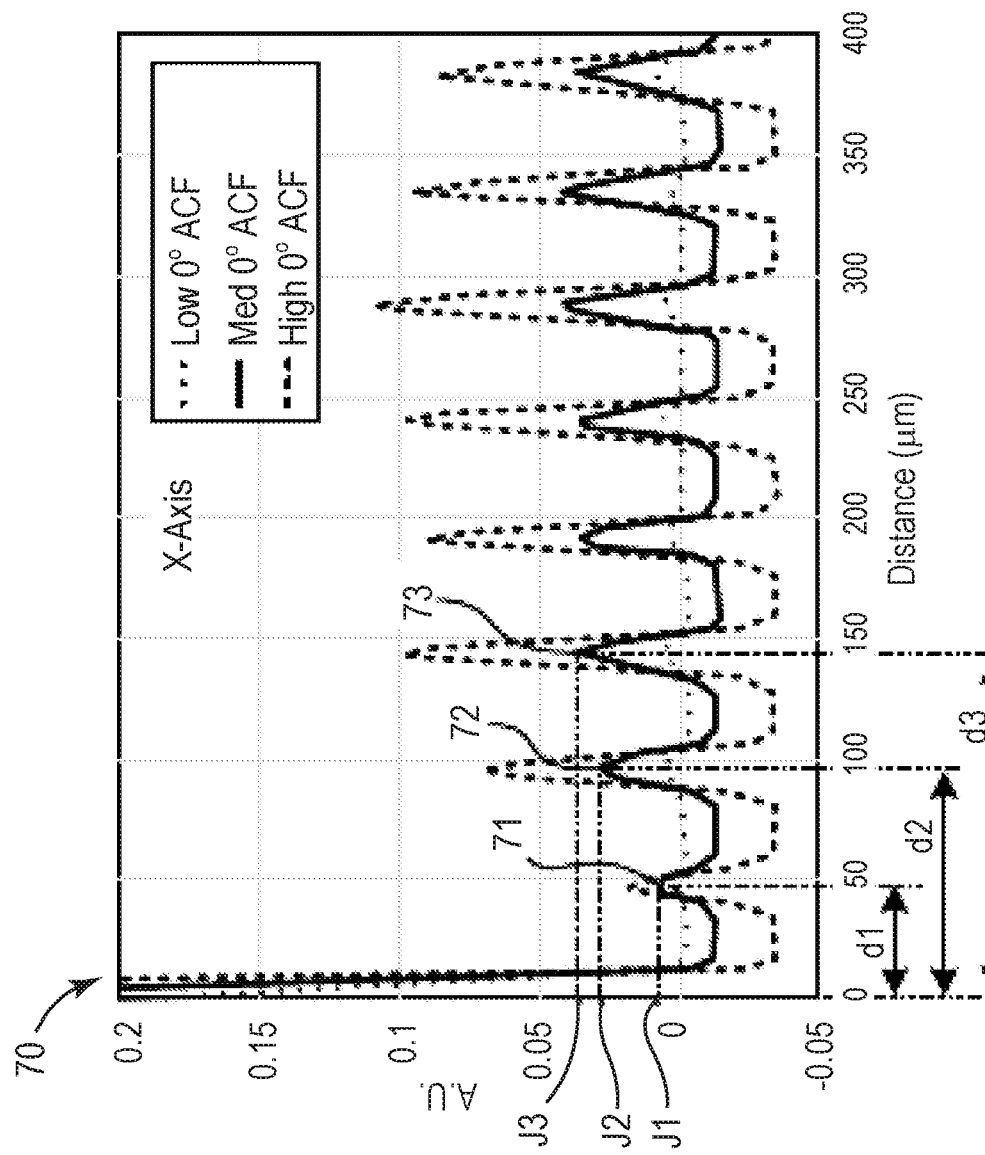
FIGS. 9A-9B are plots of an autocorrelation of an illustrative structured surface of an optical layer with elongated structures.
Figure 9B:
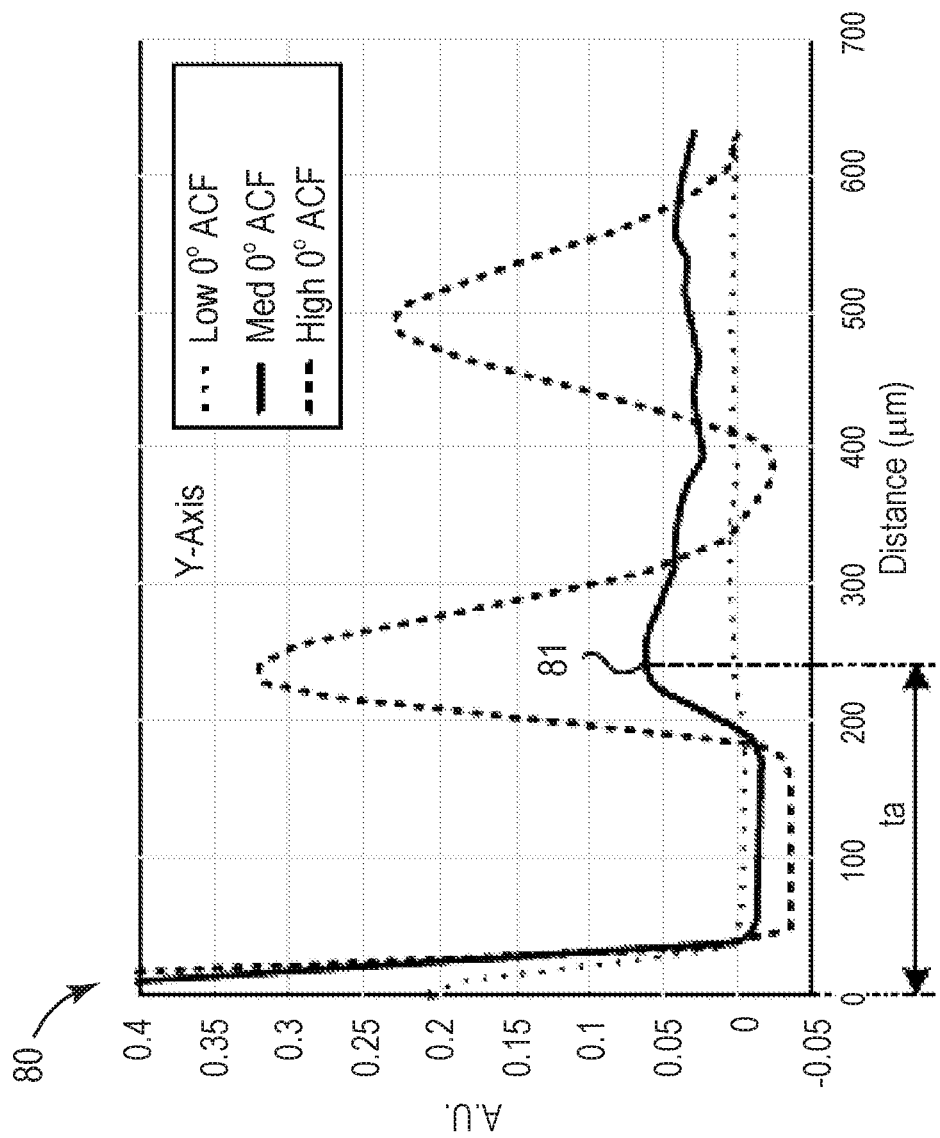

There are mathematical and scientific methods that allow us to measure and characterize the uniformity or regularity of the elongated structures on the optical layer, providing a way to characterize the film's structure and performance. FIGS. 8A-8C provide plots of a power spectral density of a structured surface of an (e.g., unitary) optical layer with elongated structures. FIGS. 9A-9B provide plots of an autocorrelation of a structured surface of an (e.g., unitary) optical layer with elongated features. FIG. 8A shows an image of a power spectral density (PSD) 60 determined for a structured surface 131 of the optical layer 130, according to some embodiments, and FIGS. 8B and 8C show plots of the intensities measured by the PSD on the x-axis and the y-axis, respectively. FIG. 8A shows a first peak 61 along a first direction (e.g., the x-axis) having a first peak intensity I1, and FIG. 8B shows a second peak 62 along a second direction (e.g., the y-axis) having a second peak intensity I2. In some embodiments, the ratio I1/I2 is greater than or equal to about 1 (or greater than or equal to about 10, or greater than or equal to about 100) and less than or equal to about 10,000. In some embodiments, a power spectral density 60 of the structured major surface 131 of the structured optical layer 130 has a first peak 61 along the first direction having a first peak intensity I1 and a second peak 62 along an orthogonal second direction having a second peak intensity I2, where $1 \leq I1/I2 \leq 10{,}000$ or $10 \leq I1/I2 \leq 5000$.

FIGS. 9A and 9B provide the results of an autocorrelation performed on the structured surface of the optical layer. FIG. 9A shows an autocorrelation 70 along the first direction (e.g., the x-axis) showing a first peak 71, a second peak 72, and a third peak 73, located respectively at a first (smallest) distance d1, a second (next smallest) distance d2, and a third (third smallest) distance d3. First peak 71 has a first peak intensity J1, second peak 72 has a second peak intensity J2, and third peak 73 has a third peak intensity I3. In some embodiments, each of the second peak intensity J2 and the third peak intensity J3 is greater than the first peak intensity J1. FIG. 9B shows an autocorrelation 80 along the second direction (e.g., the y-axis) showing either no significant peaks or a peak 81 at a distance ta that is not less than the first distance d1. In some embodiments, an autocorrelation 70 of the structured major surface 131 of the structured optical layer 130 along the first direction has a first peak 71 at a smallest positive first distance d1 having a first peak intensity J1 and a second peak 72 at a next smallest positive second distance d2 having a second peak intensity J2, where $J2 > J1$ or $J2 > 1.1\, J1$.

Figure 10B:
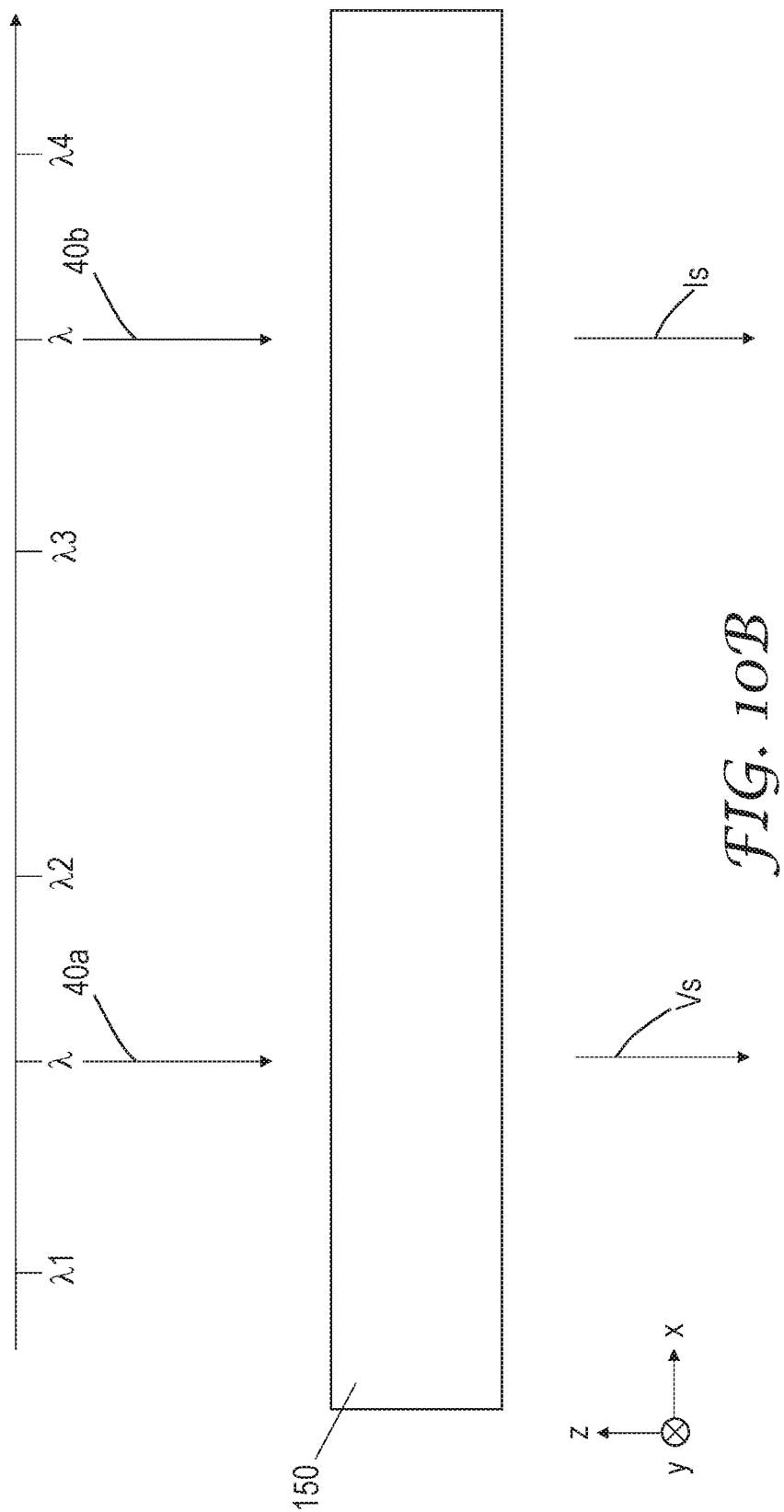

FIGS. 10A-10B are schematic cross-sectional views of layer or film 150 and layer or film 150', respectively, illustrating light 40a and 40b substantially normally incident on the layer or film. The layer or film 150 may correspond to any of the optically diffusive layers or optically diffusive films or reflective polarizers or optical constructions, for example, described herein. The layer or film 150' can correspond to any of the substrate layers or optical layers, for example, described herein. The light 40a has a wavelength in a range of $\lambda 1$ to $\lambda 2$ and the light 40b has a wavelength in a range of $\lambda 3$ to $\lambda 4$. In some embodiments, the range of $\lambda 1$ to $\lambda 2$ is a visible range and the range of $\lambda 3$ to $\lambda 4$ is an infrared range. For example, in some embodiments, $\lambda 1$ is about 450 nm, $\lambda 2$ is about 650 nm, $\lambda 3$ is about 930 nm, and $\lambda 4$ is about 970 nm. For the light 40a in the wavelength range $\lambda 1$ to $\lambda 2$, the layer or film 150 has an average specular transmittance Vs, an average diffuse transmittance Vd and an average total transmittance Vt (Vt=Vs+Vd). For the light 40b in the wavelength range $\lambda 3$ to $\lambda 4$, the layer or film 150 has an average specular transmittance Is, an average diffuse transmittance Id and an average total transmittance It (It=Is+Id). A high diffuse transmittance (e.g., high Vd) corresponds to a high optical haze.

In some embodiments, for substantially normally incident light (40, 40a, 40b) and a visible wavelength range from about 450 nm to about 650 nm and an infrared wavelength range from about 930 nm to about 970 nm, an optically diffusive layer (e.g., 30 or 120 or 150) has an average specular transmittance Vs in the visible wavelength range and an average specular transmittance Is in the infrared wavelength range, where Is/Vs≥2.5. In some embodiments, Is/Vs≥3. In some embodiments, the optically diffusive layer has an average total transmittance It in the infrared wavelength range, where Is/It≥0.6 or Is/It≥0.7. In some embodiments, the optically diffusive layer has an average total transmittance Vt in the visible wavelength range, where It/Vt>1 or It/Vt>2, or It/Vt>3.

In some embodiments, for a substantially normally incident light (40, 40a, 40b) and for each of mutually orthogonal first and second polarization states (171, 172), the optical substrate layer (e.g., 110 or 150') has an average specular transmittance (Vs, Is) of greater than about 70% in each of the visible and infrared wavelength ranges. In some embodiments, the optical substrate layer (e.g., 110 or 150') is or includes a polyester film (e.g., a polyethylene terephthalate [PET] film).

Figure 11:
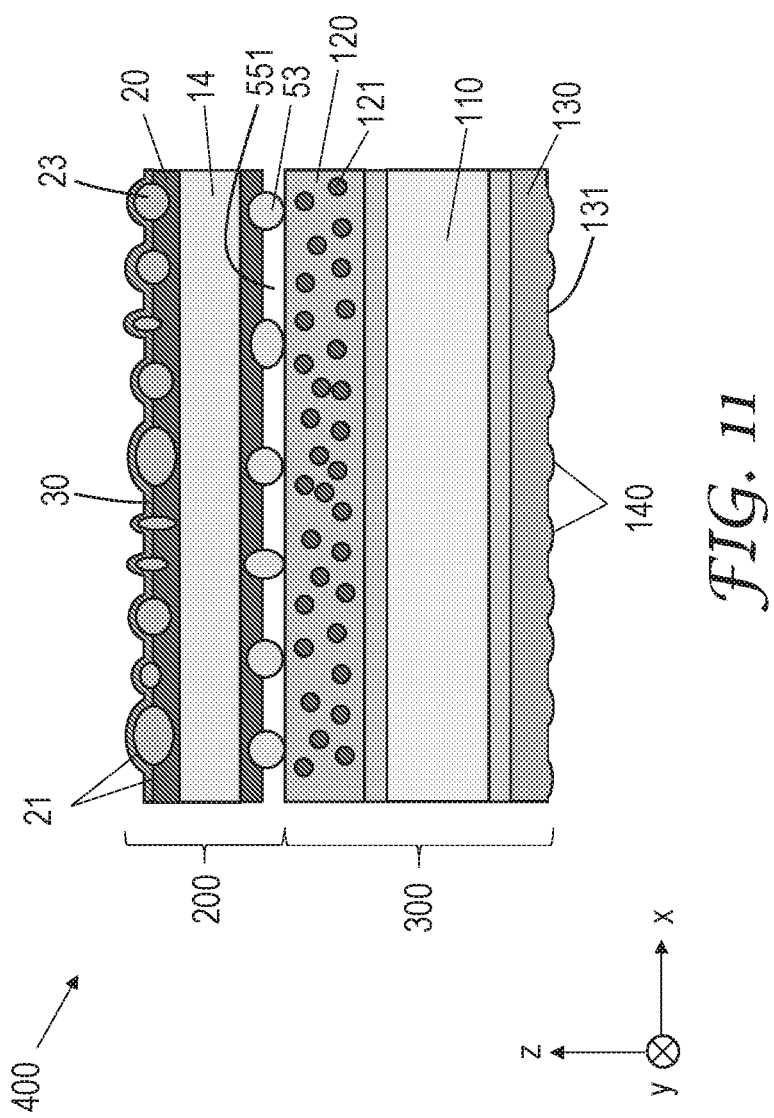
FIG. 11 is a schematic cross-sectional view of an illustrative optical construction.

In some embodiments, an optical construction includes a reflective polarizer (e.g., reflective polarizer 100 or 200) disposed on an optically diffusive film (e.g., optically diffusive film 300). FIG. 11 is a schematic cross-sectional view of an optical construction 400, according to some embodiments. In some embodiments, the optical construction 400 includes a reflective polarizer 200 and an optically diffusive film 300 disposed on the reflective polarizer 200. In some embodiments, the reflective polarizer 200 includes a plurality of polymeric layers 14 (e.g., corresponding to layers 11, 12; individual layers are not shown in the schematic illustration of FIG. 11) co-extruded with a first outer layer 20. The plurality of polymeric layers can number at least 50 in total. The first outer layer 20 includes a plurality of first particles 23 partially protruding from a first major surface thereof to form a first structured major surface 21. The first particles 23 can have an average size of from about 7 to about 9 microns. The reflective polarizer 200 includes a first optically diffusive layer 30 conformably disposed on the first structured major surface 21 so that opposing first and second major surfaces of the first optically diffusive layer 30 substantially conform to the first structured major surface 21. The first optically diffusive layer 30 can include a plurality of nanoparticles 33 dispersed therein where the nanoparticles define a plurality of voids 34 therebetween (see, e.g., FIGS. 4A-4B). The optically diffusive film 300 includes an optical substrate layer 110; a second optically diffusive layer 120 disposed on the optical substrate layer 110 and facing the reflective polarizer 200 and including a plurality of nanoparticles 121 dispersed therein; and a structured optical layer 130 disposed on the optical substrate layer 110 and facing away from the reflective polarizer 200 and including a structured major surface 131 facing away from the optical substrate layer 110 and including a plurality of spaced apart elongated structures 140 elongated along a same first direction (e.g., x-direction) and arranged at a substantially uniform density across the structured major surface 131 of the structured optical layer 130. In some embodiments, for a substantially normally incident light and a visible wavelength range from about 450 nm to about 650 nm and an infrared wavelength range from about 930 nm to about 970 nm, the second optically diffusive layer 120 has an average specular transmittance Vs in the visible wavelength range and an average specular transmittance Is in the infrared wavelength range, where Is/Vs≥2.5 or in any of the ranges described elsewhere herein.

In some embodiments, the optically diffusive film 300 and the reflective polarizer 200 define an air gap 551 therebetween. In the illustrated embodiment, the air gap 551 is provided by the particles 53. In some embodiments, the reflective polarizer 100 may be used in the optical construction 400 in place of the reflective polarizer 200. In such embodiments, the air gap 551 may be absent or rim tape or other spacing methods may be used to provide an air gap. Rim tape or other spacing methods may similarly be used to further space the optically diffusive film 300 and the reflective polarizer 200 apart.

As described further elsewhere herein, a display system that includes the optical construction 400 can also include a structured mirror. The structured mirror can include optical bumps on an optical mirror. The optical bumps can be formed by printing or by microreplication (e.g., casting and curing), for example.

FIGS. 12A and 12B provide alternate embodiments of a structured mirror 700 with spaced-apart optical bumps according to the present description. FIG. 12A shows a structured mirror 700 which includes an optical mirror 710 and discontinuous layer 721 including an array of discrete, spaced apart optical bumps 720. In the embodiment of FIG. 12A, the optical bumps 720 are spaced in an array, which may be a regular (e.g., rectangular, square, or hexagonal) or irregular (e.g., random or pseudorandom) array, and disposed directly on the surface of optical mirror 710. In some embodiments, optical bumps 720 are rounded bumps which cover some percentage of the surface area of optical mirror 710, and which contribute to anti-wet-out performance (as well as the reduction of other unwanted optical effects, such as Newton's rings) while remaining substantially transparent to at least some wavelengths of near infrared light. In some embodiments, the area coverage of the surface of optical mirror 710 may be between about 10% and about 40%.

Suitable material for the optical bumps 720, 720' includes OP1028 Premium Gloss HS Overprint Varnish, OP2018 Imprintable Matte UV Varnish, and 9308 UV Flexo Ink (all manufactured by Nazdar Ink Technologies, Shawnee, KS), for example.

FIG. 12B shows an alternate embodiment of a structured mirror 700', which includes an optical mirror 710 and continuous layer 721' featuring optical bumps 720' separated by substantially planar land portions 722. The embodiment of FIG. 12B differs from the embodiment of FIG. 12A primarily in that continuous layer 721' and optical bumps 720' are formed as a single component which is disposed on optical mirror 710, rather than (as in FIG. 12A) having optical bumps 720 disposed directly on optical mirror 710. As with the embodiment of FIG. 12A, the embodiment of FIG. 12B may, in some embodiments, have an area coverage of optical bumps 720' on optical mirror 710 (including land portions 722 of continuous layer 721') between about 10% and about 40%.

In some embodiments, for a substantially normally incident light, the optical mirror 710 has an average optical reflectance of greater than about 30% (or in any range describe elsewhere herein) in the visible wavelength range for at least a first polarization state, and a specular transmittance of greater than about 20% (or in any range describe elsewhere herein) for at least one wavelength in the infrared wavelength range for each of the first polarization state and an orthogonal second polarization state. In some embodiments, the optical bumps 720, 720' has an average optical transmittance of greater than about 50%, or greater than about 60%, or greater than about 70% for each of the visible and infrared wavelength ranges for each of the first and second polarization states.

Related optical bumps are described in U.S. provisional co-pending application 63/021,773 titled OPTICAL FILM WITH DISCONTINUOUS COATING and filed on May 8, 2020, and hereby incorporated herein by reference to the extent that it does not contradict the present description.

Optical mirror 710 can include a plurality of alternating first and second polymeric layers 11 and 12 (see, e.g., FIGS. 2A-2C), where each first and second polymeric layer is less than about 500 nm thick, or less than about 350 nm thick, or less than about 300 nm thick. The optical mirror can include a single packet or multiple packets separated by thicker middle layers as described further elsewhere herein. In some embodiments, the optical mirror 710 includes alternating first and second dielectric layers, where at least one of the first and second layers is an inorganic layer. For example, the optical mirror 710 can be a dielectric reflector. In some embodiments, the optical mirror 710 is or includes a metal layer.

Figure 13B:
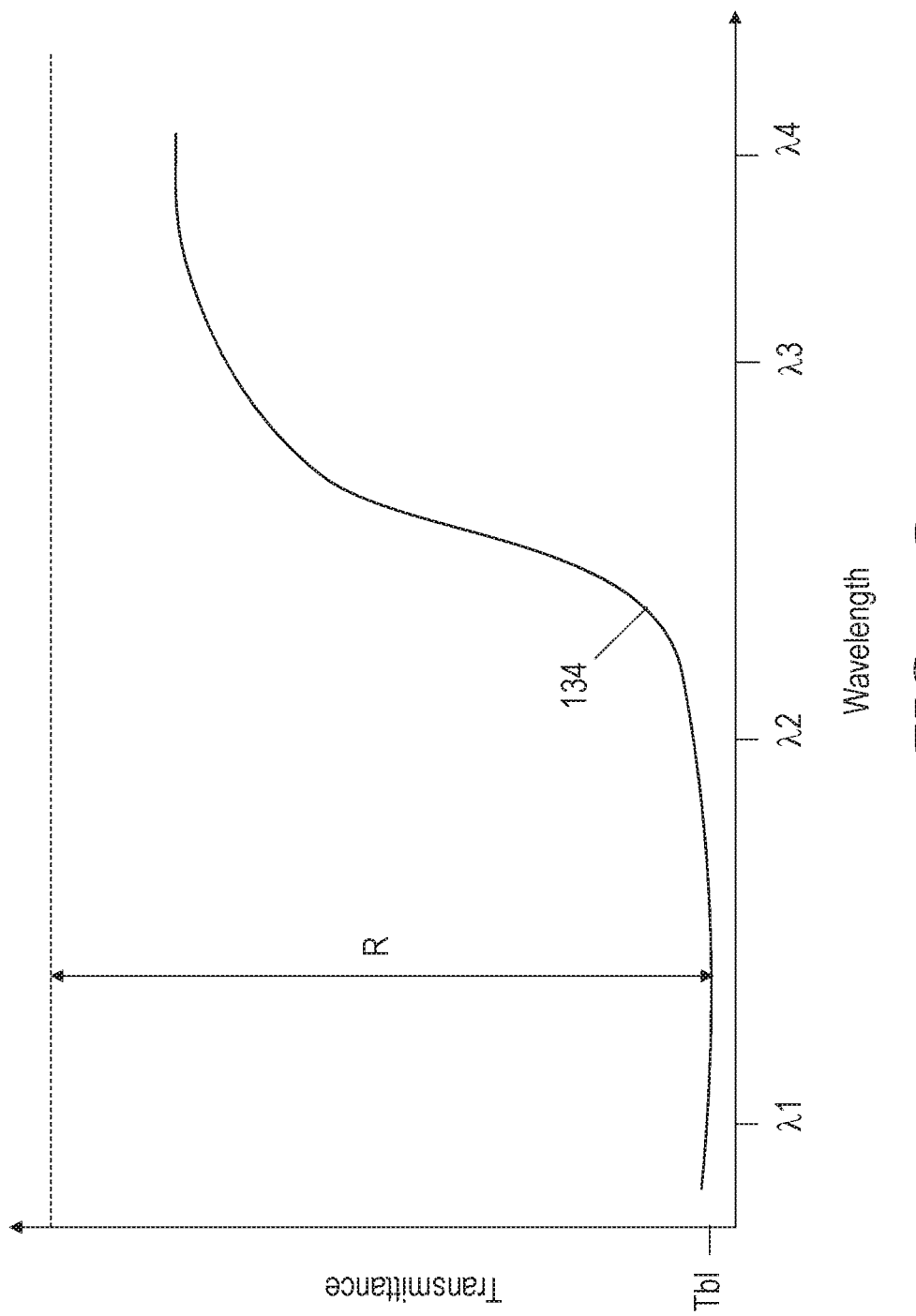

FIGS. 13A-13B are schematic plots of transmittance versus wavelength for a reflective polarizer, or for an optical construction including a reflective polarizer, or for another optical element, for substantially normally incident light 40 for a first polarization state (transmittance 133 in FIG. 13A) and for an orthogonal second polarization state (transmittance 134 in FIG. 13B), respectively, according to some embodiments. In some embodiments, for substantially normally incident light 40 and a predetermined wavelength range (e.g., $\lambda 1$ to $\lambda 2$ and/or 450 nm to 650 nm), the reflective polarizer 100 or 200 has an average optical transmittance Tp of at least about 40% for a first polarization state 171 and an average optical reflectance R of at least about 70% for an orthogonal second polarization state 172. In some embodiments, the average optical transmittance Tp is at least about 50% or at least about 55% or at least about 60%. In some embodiments, the average optical reflectance R is at least about 80% or at least about 85% or at least about 90%. The transmittance 135 versus wavelength for light 170 incident at an incident angle θ is also schematically illustrated in FIG. 13A. In some embodiments, for the first polarization state and a predetermined wavelength range (e.g., a visible range of about 450 nm to about 650 nm, an infrared range of about 930 nm to about 970 nm, or a range of about 400 nm to about 800 nm), the reflective polarizer or optical construction has a greater average optical transmittance for light incident at a smaller incident angle (e.g., transmittance 133) and a smaller average optical transmittance for light incident at a greater incident angle (e.g., transmittance 135). The smaller incident angle can be in a range of zero degrees to about 20 degrees, or can be approximately zero degrees, for example. The greater incident angle can be in a range of about 30 degrees to about 50 degrees, or can be about 45 degrees, for example. In some embodiments, for the predetermined wavelength range, the reflective polarizer or optical construction has a greater average optical transmittance for substantially normally incident light and a smaller average optical transmittance for light incident at an angle of incidence of about 45 degrees for a first (pass) polarization state for any plane of incidence. In some embodiments, a difference between the greater average optical transmittance and the smaller average optical transmittance is at least 10%, or at least 20%, or at least 30%.

In some embodiments, the transmission for substantially normally incident light in the second polarization state is higher for a smaller wavelength in the predetermined wavelength range and lower for a greater second wavelength in the predetermined wavelength range. Such a sloped block state transmittance can provide reduced color shift with viewing angle, for example.

The average transmittance (resp., reflectance) is the mean of the transmittance (resp., reflectance) over the predetermined wavelength range. For a reflective polarizer or optical construction where absorption is negligible, the reflectance R is approximately 100% minus the transmittance. The transmittance 133 is a pass state transmittance for the reflective polarizer or optical construction and the transmittance 134 is a block state transmittance for the reflective polarizer or optical construction. Alternatively, the transmittance 134 can represent the total transmittance or the specular transmittance, for example, of an optical mirror for any polarization state or for unpolarized light. Transmittance and reflectance can be understood to be the total transmittance and total reflectance, respectively, except where indicated otherwise. The average transmittance Tp in the first (pass) polarization state and the average transmittance Tbl in the second (block) polarization state (or in either polarization state for an optical mirror) for substantially normally incident light 40 in the wavelength range from $\lambda 1$ to $\lambda 2$ is indicated in FIGS. 13A-13B. The indicated value of R is approximately the average optical reflectance for substantially normally incident light 40 in the wavelength range from $\lambda 1$ to $\lambda 2$.

In some embodiments, $\lambda 1$ may be about 400 nm or about 450 nm and $\lambda 2$ may be about 650 nm, about 700 nm, or about 800 nm, for example. In some embodiments $\lambda 3$ may be about 930 nm or about 950 nm and $\lambda 4$ may be about 1100 nm or about 970 nm for example.

In some embodiments, the transmittance 134 represents the transmittance of an optical mirror (e.g., optical mirror 710). In some embodiments, for a substantially normally incident light 40, the optical mirror has an average optical reflectance R of greater than about 30% in a visible wavelength range from about 450 nm to about 650 nm for at least a first polarization state (e.g., one or both of polarization states 171, 172). In some embodiments, the average optical reflectance R is greater than about 50%, or greater than about 60%, or greater than about 70%, or greater than about 80% in the visible wavelength range for each of the first and second polarization states. In some embodiments, the transmittance 134 represents the specular transmittance of an optical mirror. In some embodiments, for a substantially normally incident light 40, the optical mirror has a specular transmittance of greater than about 20% for at least one wavelength (e.g., $\lambda 3$ or $\lambda 4$ or a wavelength therebetween) in an infrared wavelength range from about 930 nm to about 970 nm for each of the first polarization state and an orthogonal second polarization state. In some embodiments, the specular transmittance is greater than about 40%, or greater than about 50%, or greater than about 60%, or greater than about 70%, or greater than about 80% for the at least one wavelength in the infrared wavelength range for each of the first and second polarization states.

Figure 14:
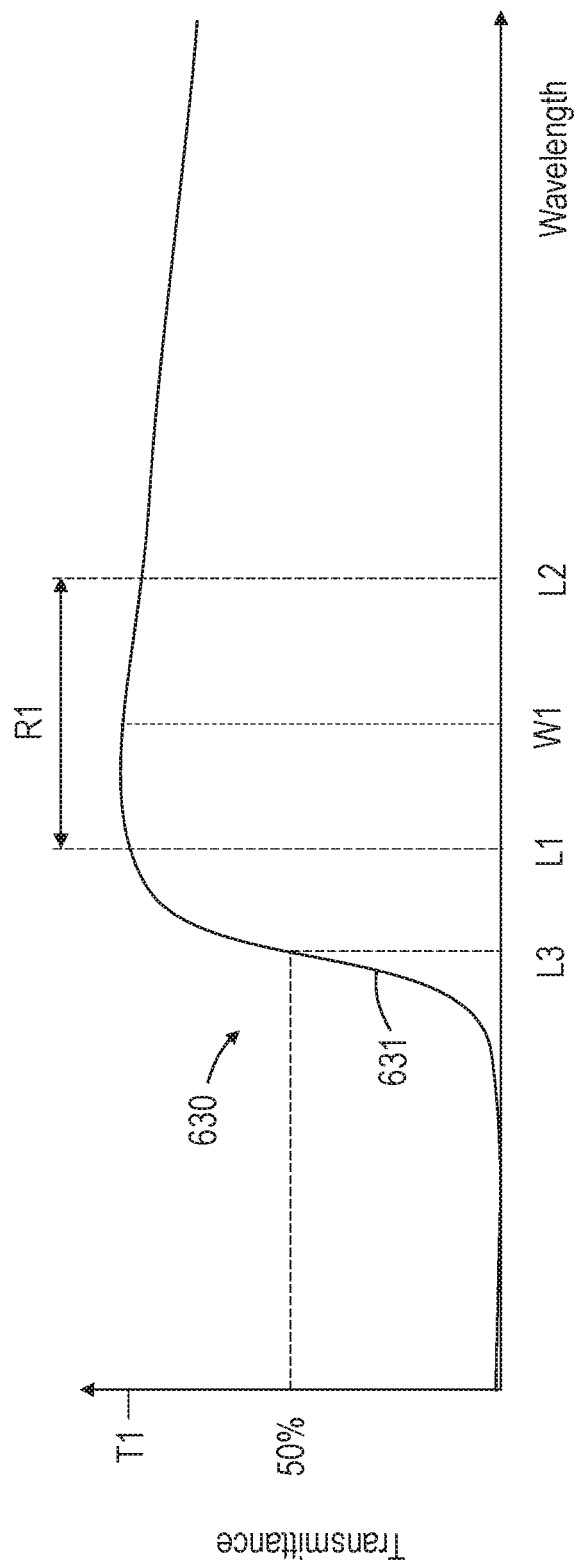

FIG. 14 is a schematic plot of an optical transmittance 630 of a reflective polarizer (e.g., reflective polarizer 100 or 200) versus wavelength for a first (block) polarization state for a substantially normally incident light 40. The optical transmittance 630 has a band edge 631. In some embodiments, a best linear fit to the band edge 631 correlating the optical transmittance to the wavelength at least across a wavelength range where the optical transmittance along the band edge increases from about 10% to at least about 70% (e.g., from about 10% to about 70% or from about 10% to about 80%)

has a slope of greater than about 2.5%/nm, or greater than about 3%/nm, or greater than about 3.5%/nm, or greater than about 4%/nm, or greater than about 4.5%/nm, or greater than about 5%/nm. In some embodiments, for a first wavelength range R1 extending from a smaller wavelength L1 to a greater wavelength L2, where 30 nm≤L2−L1≤50 nm, and L1 is greater than and within about 20 nm of a wavelength L3 corresponding to an optical transmittance of about 50% along the band edge 631, the optical transmittance 630 has an average T1 of greater than about 75%, or greater than about 80%, or greater than about 85%. In some embodiments, the reflective polarizer is used in a display system with an infrared light source configured to emit a light having a first wavelength W1 toward the finger of the user for fingerprint detection. In some embodiments, the first wavelength W1 is in the first wavelength range R1. W1 can be about 850 nm or about 940 nm, for example. In some embodiments, the wavelength L3 is in a range of about 800 nm to about 1100 nm, or about 810 nm to about 840 nm, or about 900 nm to about 930 nm. For example, in some embodiments, the wavelength L3 is in a range of about 810 nm to about 840 nm and the wavelength W1 is about 850 nm, or the wavelength L3 is in a range of about 900 nm to about 930 nm and the wavelength W1 is about 940 nm.

In some embodiments, a high transmittance in the first wavelength range R1 is achieved, at least in part, due to a sharp band edge. For example, the band edge 631 can have a slope in the ranges described elsewhere. Optical films having sharpened band edges are known in the art and are described in U.S. Pat. No. 6,967,778 (Wheatley et al.), for example. In some embodiments, a high transmittance in the first wavelength range R1 is achieved, at least in part, due to the shape of the layer thickness profile (see, e.g., FIG. 15). The thicknesses of the outer layers 20 and 50 may also have an effect on the transmission spectra of the reflective polarizer in the first wavelength range R1 due to light reflected from surfaces of the outer layers which may undergo optical interference with light reflected from other layers. In some embodiments, each of the outer layers 20 and 50 has an average thickness in a range of about 1 micron to about 5 microns, for example.

Figure 15:
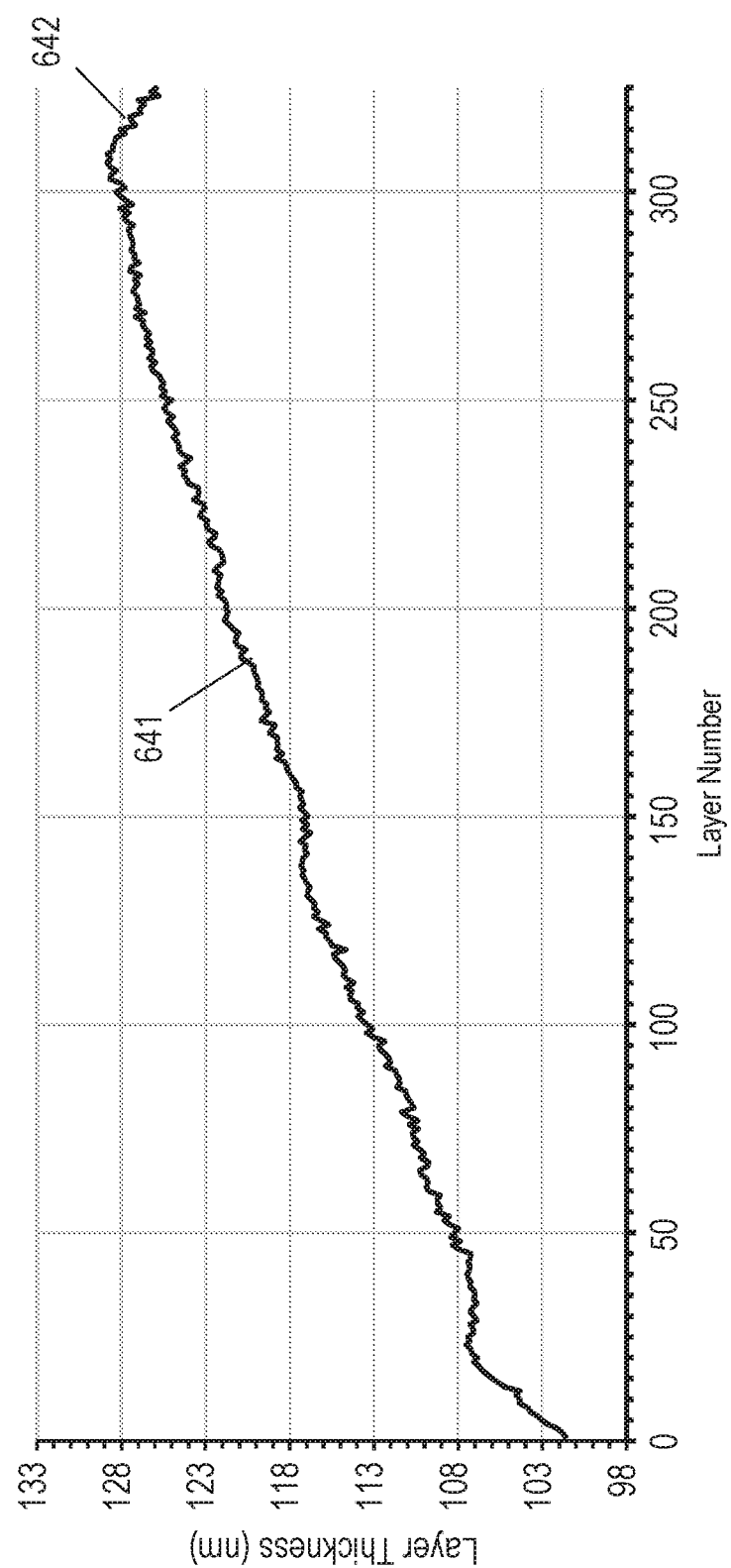
FIG. 15 is a plot of layer thickness versus layer number in an illustrative packet of polymeric layers.

FIG. 15 is a plot of layer thickness versus layer number in an illustrative packet of polymeric layers, according to some embodiments where the layer profile results in a sharpened band edge. In some embodiments, the layer profile includes a first portion 641 with a generally increasing layer thickness profile having a first slope and a second portion 642 adjacent the first portion and having a generally decreasing layer thickness profile having a second slope having a magnitude substantially higher than the first slope. Related optical films are described in U.S. provisional co-pending application 63/021,743 titled OPTICAL FILM and filed on May 8, 2020.

Figure 16A:
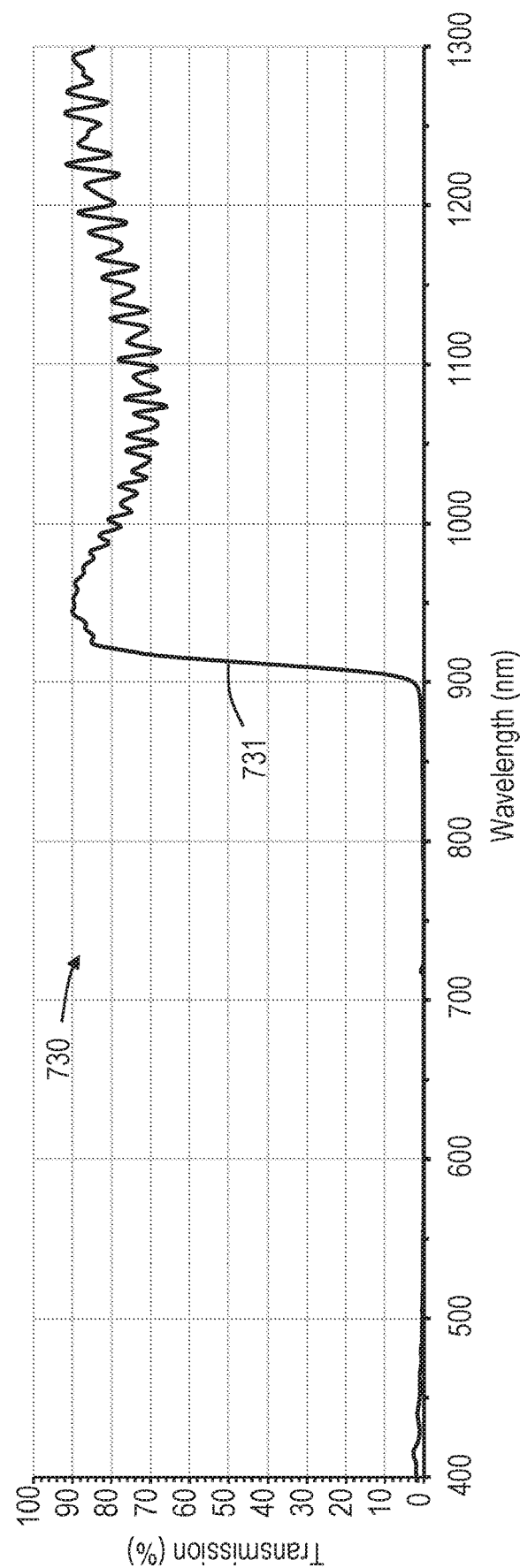
FIG. 16A is a plot of transmittance versus wavelength for an illustrative reflective polarizer.
Figure 16B:
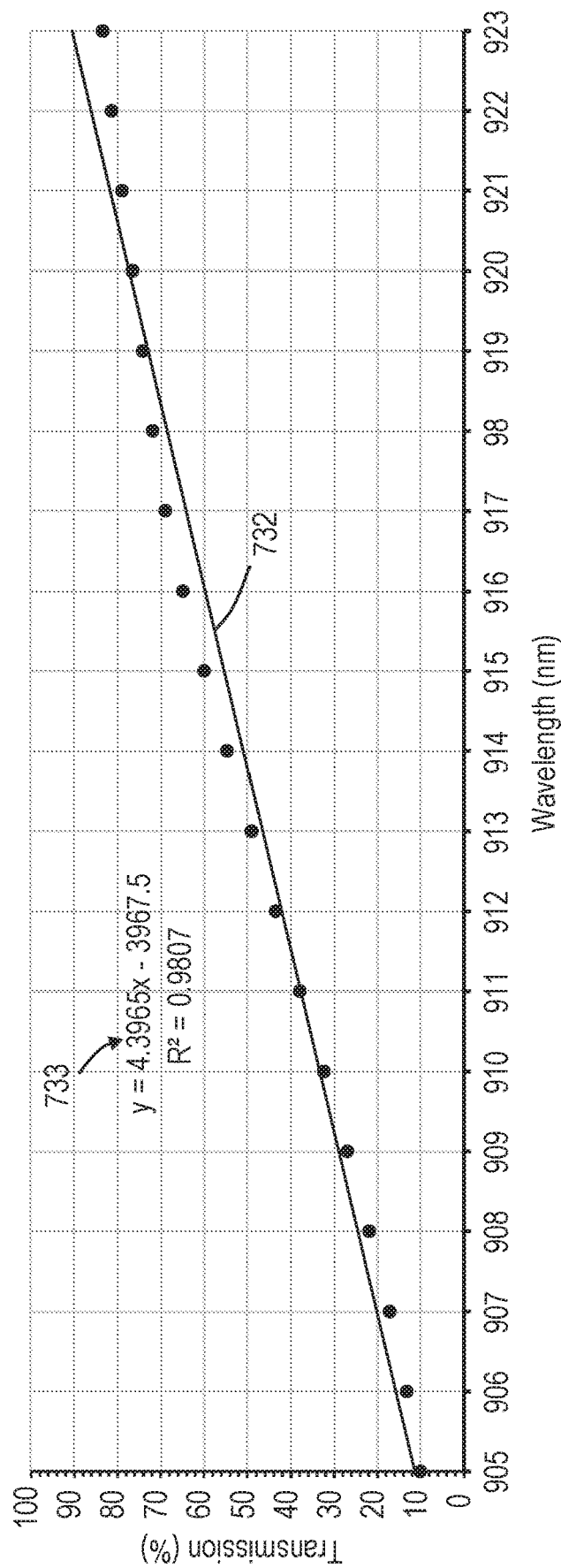
FIGS. 16B-16C are portions of the plot of FIG. 16A.
Figure 16C:
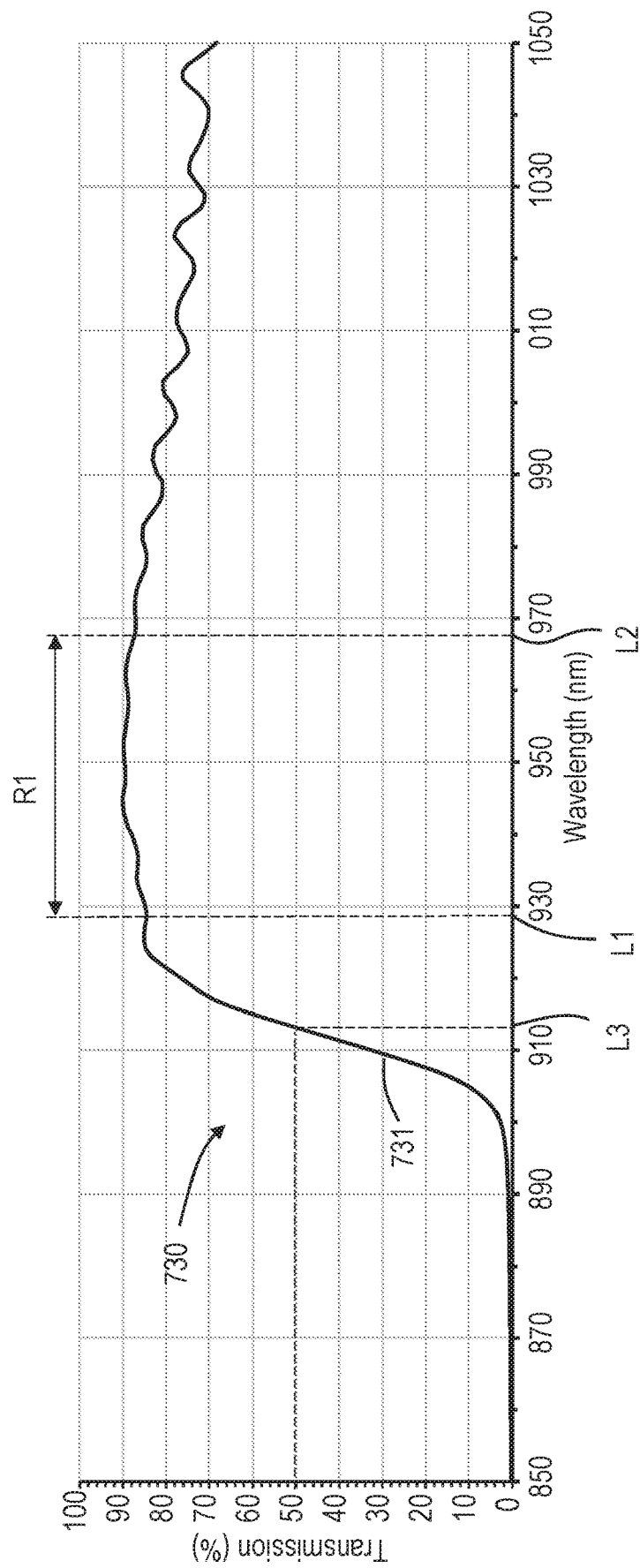

FIG. 16A is a plot of the optical transmittance 730 of a reflective polarizer for substantially normally incident light 40 having a block polarization state, according to some embodiments. FIG. 16B is a portions of the plot of FIG. 16A near the band edge 731. In some embodiments, a best linear fit 132 (see, e.g., FIG. 16B) to the band edge 731 correlating the optical transmittance to the wavelength at least across a wavelength range where the optical transmittance along the band edge increases from about 10% to at least about 70% has a slope 733 of greater than about 2.5%/nm or in any of the ranges described elsewhere for a band edge slope (e.g., greater than about 4%/nm). FIG. 16C is a portion of the plot of FIG. 16A near the band edge 731 and a wavelength range R1 close to the band edge 731. In some embodiments, for a wavelength range R1 extending from a smaller wavelength L1 to a greater wavelength L2, where 30 nm≤L2−L1≤50 nm, and L1 is greater than and within about 20 nm of a wavelength L3 corresponding to an optical transmittance of about 50% along the band edge 731, the optical transmittance 730 has an average of greater than about 75% or in any of the ranges described elsewhere herein. For the plots of FIGS. 16A-16C, the reflective polarizer did not include the optically diffusive layer 30.

Figure 17:
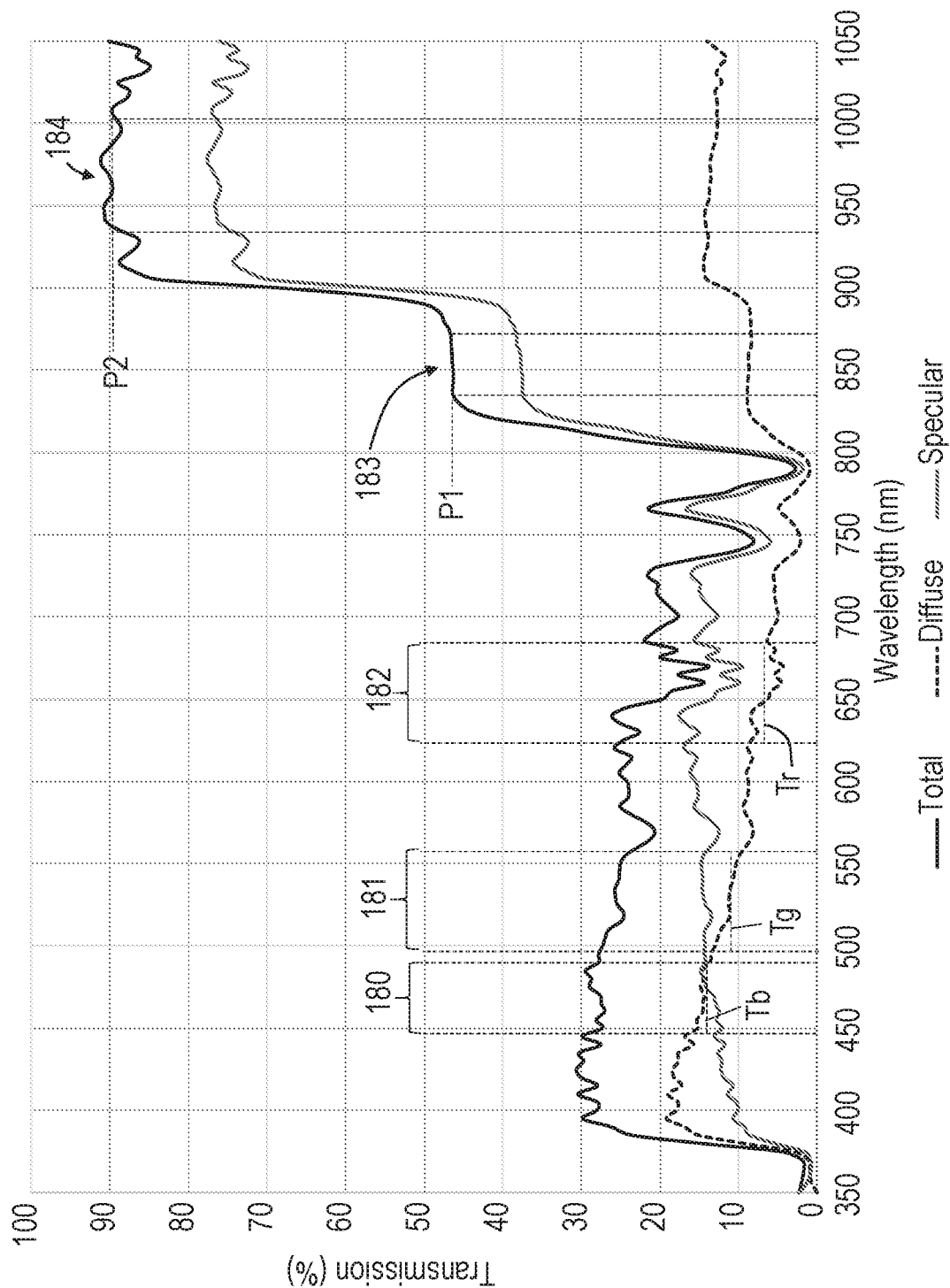
FIG. 17 is a plot of transmission versus wavelength for substantially normally incident light for an illustrative reflective polarizer.

FIG. 17 is a plot of transmission versus wavelength for substantially normally incident light 40 for an exemplary reflective polarizer (e.g., corresponding to reflective polarizer 100 or 200) where the incident light 40 is unpolarized and where the reflective polarizer included an optically diffusive layer. In some embodiments, for substantially normally incident light 40, the reflective polarizer has average diffuse optical transmittances Tb, Tg and Tr in respective wavelength ranges of about 450 to about 485 nm (wavelength range 180), about 500 to about 565 nm (wavelength range 181), and about 625 to about 680 nm (wavelength range 182), where Tb>Tg>Tr. In some embodiments, Tb, Tg and Tr are less than about 30%, or less than about 25%, or less than about 20%. In some embodiments, Tb−Tg and Tg−Tr are each greater than about 1% or greater than about 2%. In some embodiments, Tb−Tr is greater than about 3% or greater than about 5%. In some embodiments, for the substantially normally incident light 40, a total transmittance of the reflective polarizer has spaced apart first and second plateau regions 183 and 184 between about 800 and 1100 nm where each plateau region is at least 20 nm wide. The first and second plateau regions 183 and 184 have respective average total transmittances P1 and P2. In some embodiments, P2 is greater than P1 by greater than about 20%, or greater than 25%, or greater than 30%, or greater than 35%. In some embodiments, the first plateau region 183 is disposed between 800 nm and the second plateau region 184. In some embodiments, the first plateau region 183 includes 860 nm and the second plateau region 184 includes 950 nm.

For the reflective polarizer of FIG. 17, a substantially normally incident unpolarized light 40a, and a visible wavelength range of about 450 nm to about 650 nm, the reflective polarizer has an average total transmittance Vt of about 25.27%, an average diffuse transmittance Vd of about 10.75%, and an average specular transmittance Vs of about 14.52%. For the reflective polarizer of FIG. 17, a substantially normally incident unpolarized light 40b, and an infrared wavelength range of about 930 nm to about 970 nm, the reflective polarizer has an average total transmittance It of about 86.66%, an average diffuse transmittance Id of about 13.89%, and an average specular transmittance Is of about 75.77%.

Figure 18:
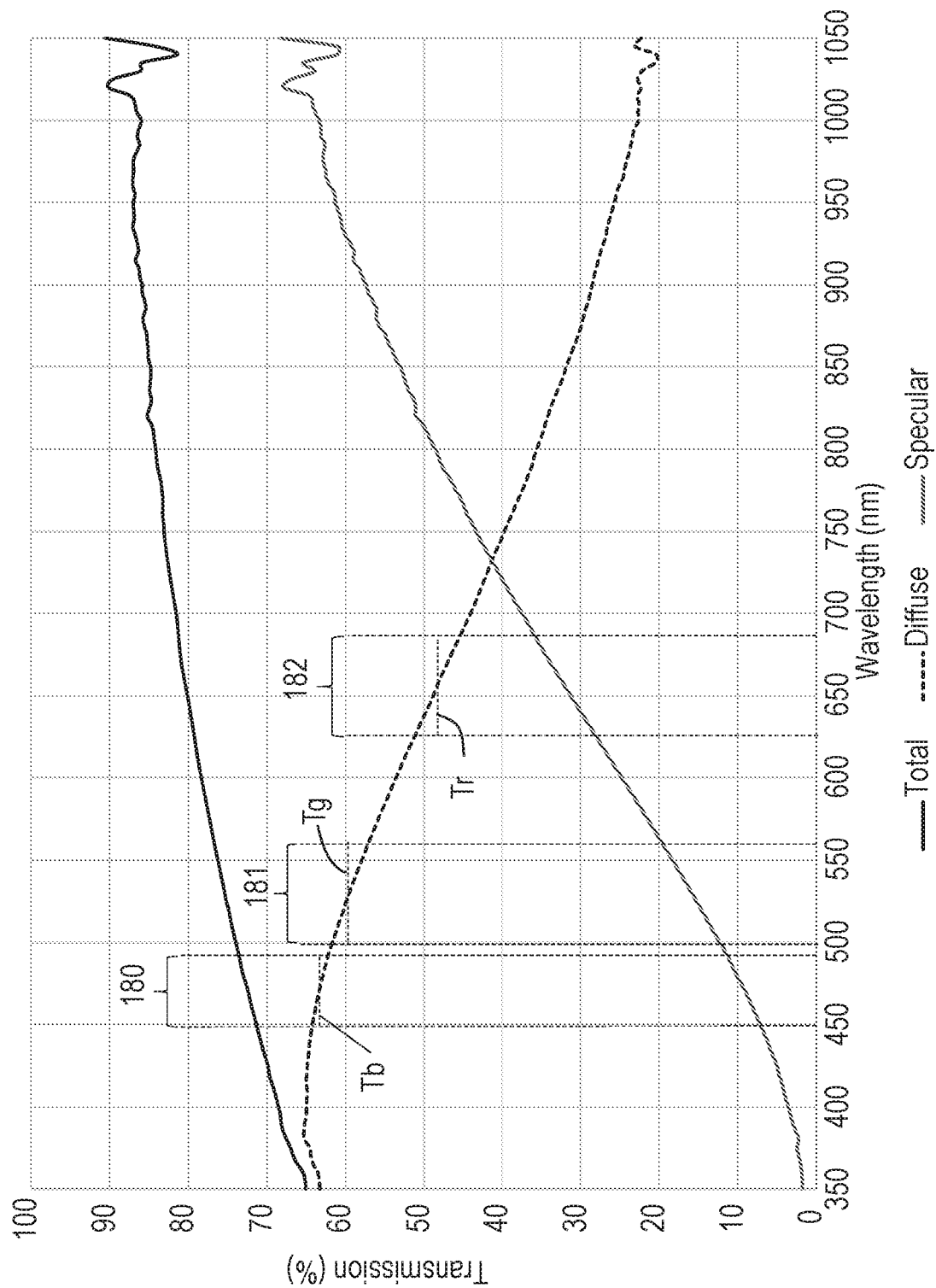
FIG. 18 is a plot of transmission versus wavelength for substantially normally incident light for an illustrative optically diffusive film.

FIG. 18 is a plot of transmission versus wavelength for substantially normally incident light 40 for an exemplary optically diffusive film (e.g., corresponding to optically diffusive film 300), according to some embodiments. In some embodiments, for substantially normally incident light 40, which may be unpolarized light, the optically diffusive film has average diffuse optical transmittances Tb, Tg and Tr in respective wavelength ranges of about 450 to about 485 nm (wavelength range 180), about 500 to about 565 nm (wavelength range 181), and about 625 to about 680 nm (wavelength range 182), where Tb>Tg>Tr. In some embodiments, Tb is less than about 80% or less than about 70%. In some embodiments, Tb is greater than about 40% or greater than about 50%. In some embodiments, Tr is greater than about 35% or greater than about 40%. In some embodiments, Tr is less than about 65% or less than about 60%. In some embodiments, Tb−Tg and Tg−Tr are each greater than about 1% or greater than about 2%. In some embodiments, Tb−Tr is greater than about 5% or greater than about 10%. In some embodiments, the optically diffusive film has a diffuse optical transmittance generally decreasing (e.g., monotonically decreasing or nonincreasing) over a wavelength range of about 450 nm to about 970 nm and a specular optical transmittance generally increasing (e.g., monotonically increasing or nondecreasing) over the wavelength range of about 450 nm to about 970 nm. In some such embodiments, the total optical transmittance generally increases over the wavelength range of about 450 nm to about 970 nm.

For the optically diffusive film of FIG. 18, a substantially normally incident unpolarized light 70a, and a visible wavelength range of about 450 nm to about 650 nm, the optically diffusive film has an average total transmittance Vt of about 76.06%, an average diffuse transmittance Vd of about 57.43%, and an average specular transmittance Vs of about 18.63%. For the optically diffusive film of FIG. 18, a substantially normally incident unpolarized light 40b, and an infrared wavelength range of about 930 nm to about 970 nm, the optically diffusive film has an average total transmittance It of about 86.94%, an average diffuse transmittance Id of about 25.69%, and an average specular transmittance Is of about 61.25%.

Figure 19:
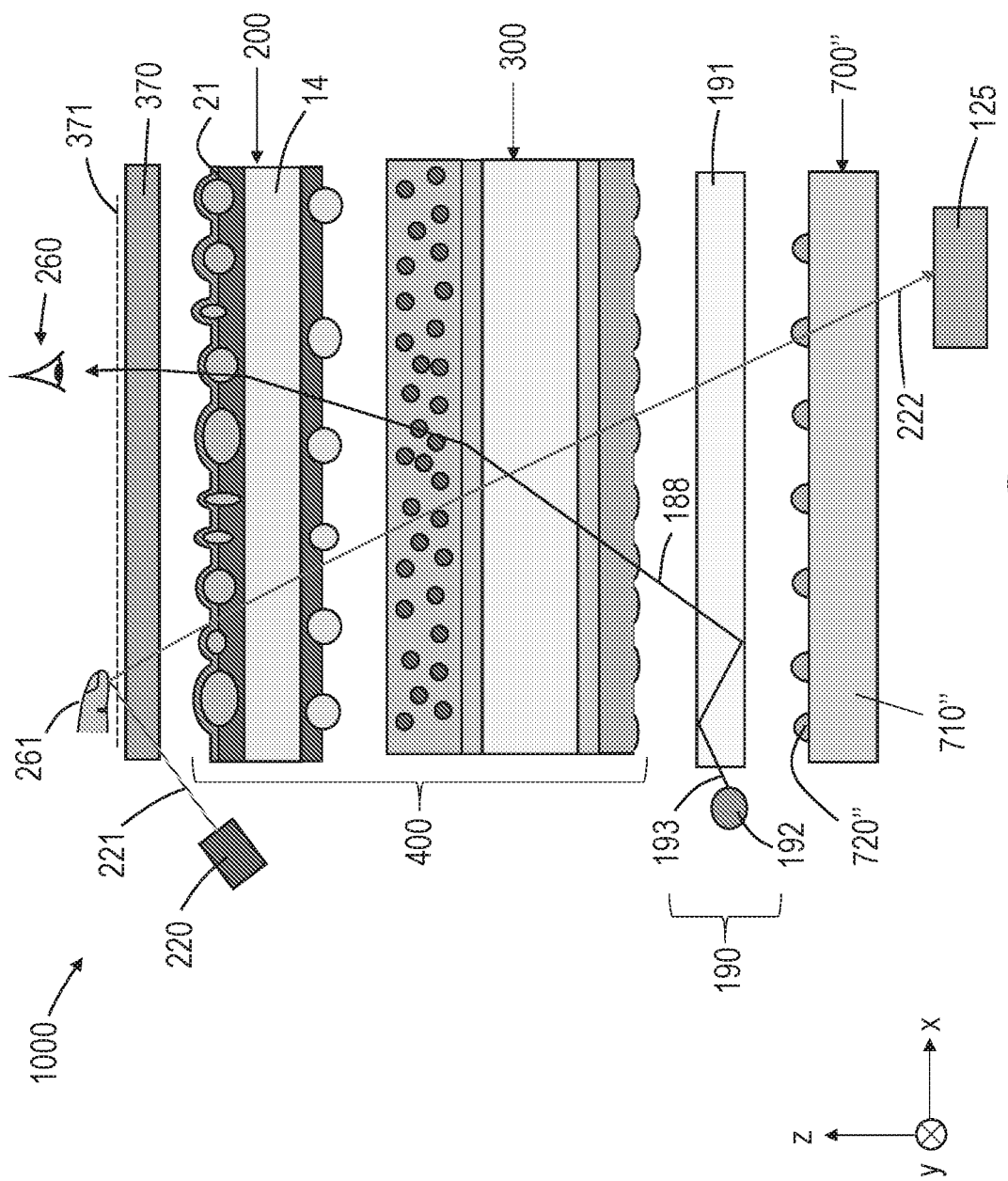
FIGS. 19-21 are schematic exploded cross-sectional views of illustrative display systems.

FIG. 19 is a schematic exploded cross-sectional view of a display system 1000 for sensing a finger 261 of a user 260 applied to the display system 1000, according to some embodiments. The display system 1000 includes a display panel 370 configured to generate an image 371 for viewing by the user 260; a lightguide 190 for providing illumination 188 to the display panel 370; an optical construction 400 disposed between the display panel 370 and the lightguide 190; a sensor 125 for sensing the finger 261 of the user 260 disposed proximate the lightguide 190 opposite the reflective polarizer 200; and an infrared light source 220 configured to emit an infrared light 221 (directly or indirectly) toward the finger 261 of the user 260. The sensor 125 is configured to receive at least a portion of the infrared light 222 reflected by the finger 261. The first structured major surface 21 is disposed between the display panel 370 and the plurality of polymeric layers 14.

In the illustrated embodiment, the display system 1000 further includes a structured mirror 700" disposed between the lightguide 190 and the sensor 125. Structured mirror 700" can correspond to structured mirror 700 or 700' described elsewhere. Structured mirror 700" includes an optical mirror 710" and an array of discrete spaced apart optical bumps 720" formed on the optical mirror 710" and facing the lightguide 190.

In some embodiments, the lightguide 190 includes a lightguide plate 191 and at least one light source 192 configured to inject light 193 into the lightguide plate 191. In some embodiments, the lightguide plate 191 extends in two orthogonal directions defining a plane (e.g., x-y plane) of the lightguide plate 191, and light (e.g., illumination 188) exiting the lightguide plate 191 propagates generally in a direction making an angle in a range of about 70 degrees or about 80 degrees to about 89 degrees with the plane of the lightguide plate 191. The angle can be about 85 degrees, for example.

The infrared light source 220 can have a peak emission wavelength of about 850 nm or about 940 nm, for example. The optical components (e.g., optical construction 400, lightguide plate 191, and structured mirror 700") disposed between the finger 261 and the sensor 125 are preferably at least partially transmissive for the peak emission wavelength.

Figure 20:
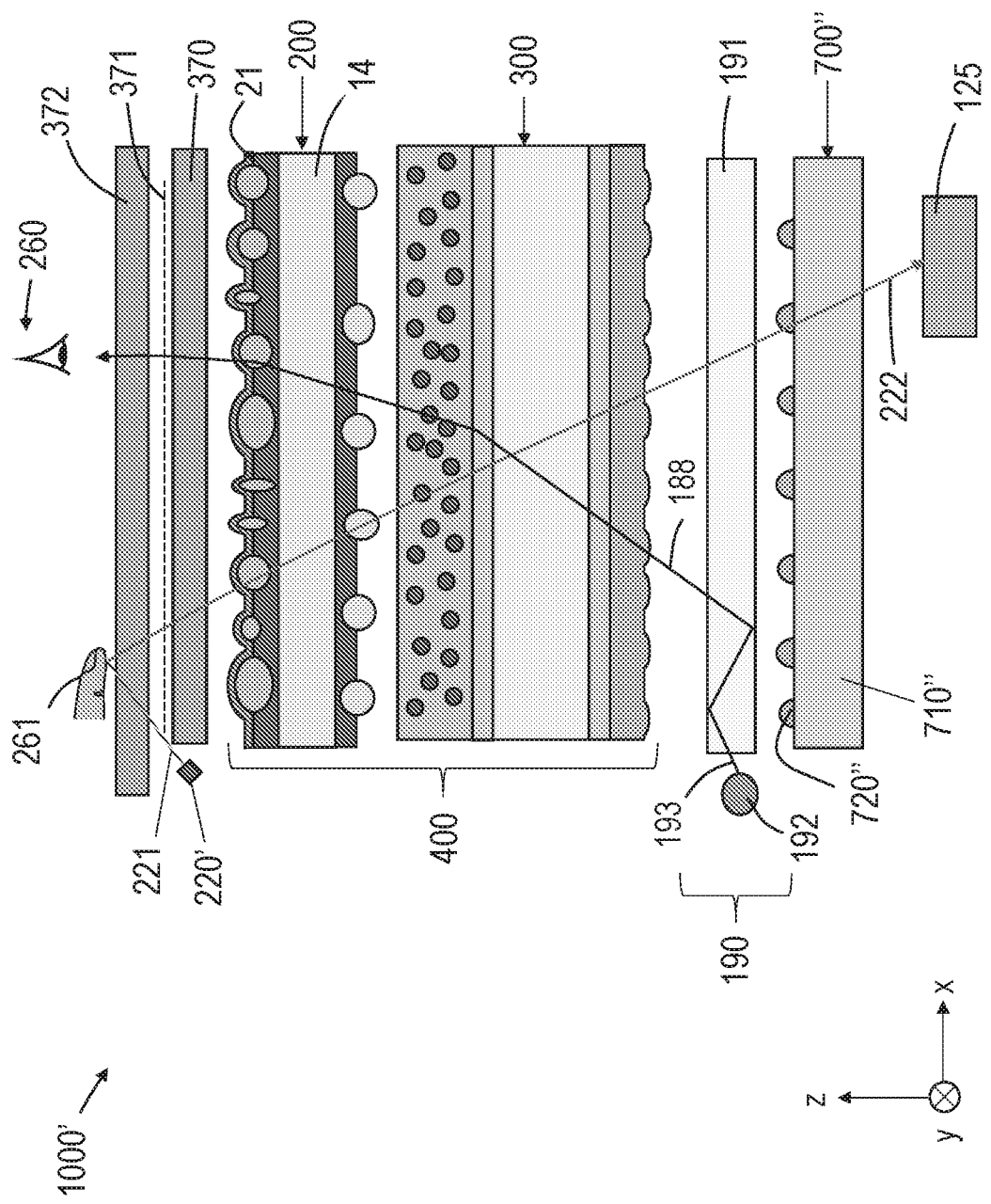
Figure 21:
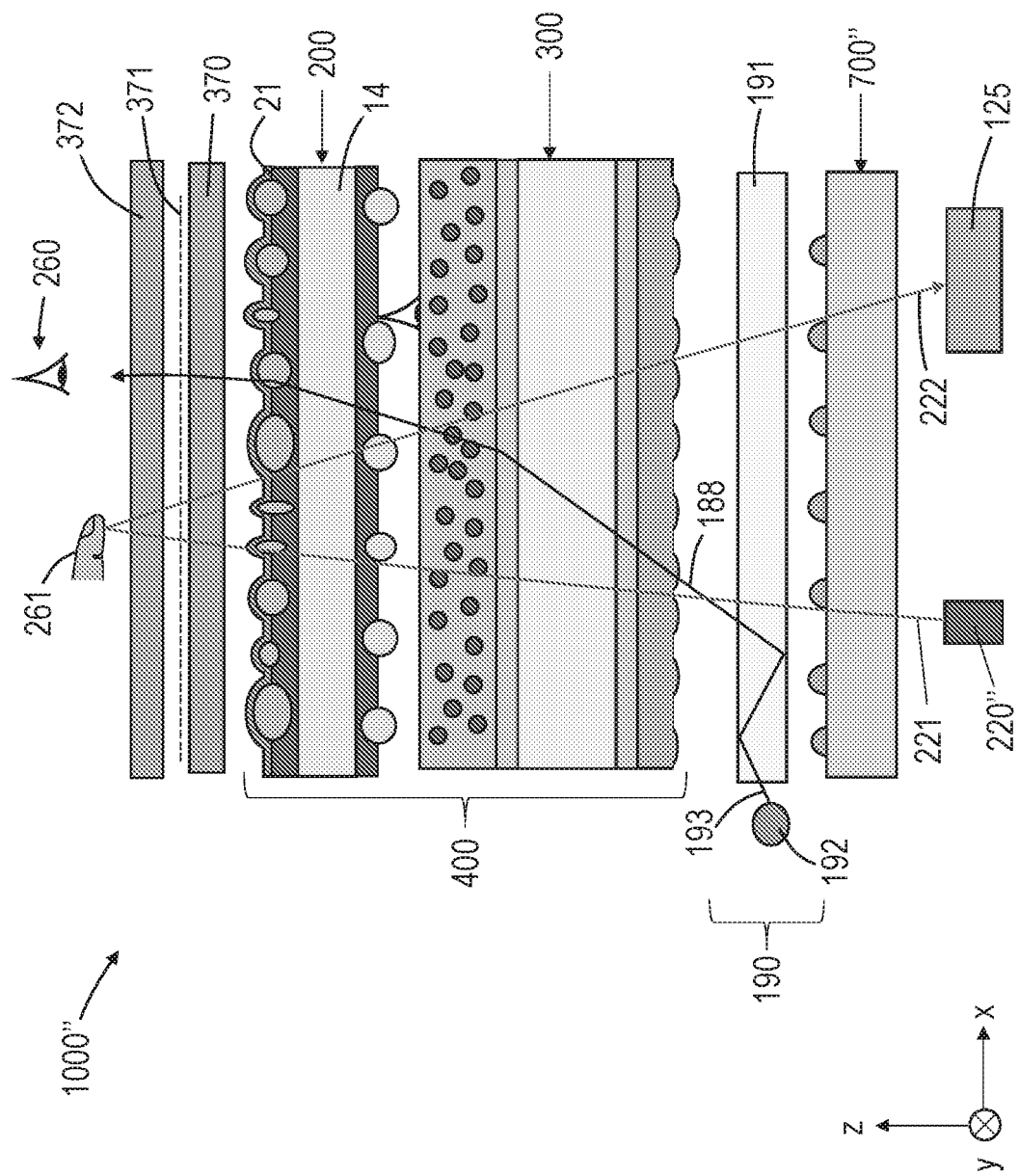

The infrared light source 220 can be disposed at any suitable location in the display system. For example, the infrared light source 220 can be disposed adjacent any the various layers of the display system. FIGS. 19-21 schematically illustrate various possible positions of the infrared light source. The positions of the sensing light source shown in FIGS. 19-21 are intended to be exemplary only and not limiting in any sense.

FIG. 20 is a schematic exploded cross-sectional view of a display system 1000' for sensing a finger 261 of a user 260 applied to the display system 1000', according to some embodiments. Display system 1000' generally corresponds to display system 1000 except for the placement of the infrared light source 220'. Display system 1000' includes a cover glass 372 disposed above the display panel 370 and configured to transmit the image 371 for viewing by the user 260. The infrared light source 220' is disposed below the cover glass 372.

FIG. 21 is a schematic exploded cross-sectional view of a display system 1000" for sensing a finger 261 of a user 260 applied to the display system 1000", according to some embodiments. Display system 1000" generally corresponds to display system 1000 or 1000' except for the placement of the infrared light source 220". The infrared light source 220" is disposed such that the structured mirror 700" is between the infrared light source 220" and the lightguide 190.

As described further elsewhere herein, in some embodiments, the reflective polarizer 200 is a collimating reflective polarizer that has a greater average optical transmittance for visible pass state light (e.g., p-polarized pass state light) incident at a smaller incident angle and a smaller average optical transmittance for the light incident at a greater incident angle. Such polarizers can provide a collimating effect by reflecting light having a greater incident angle back towards the reflector 700" so that the light is recycled. Liquid crystal displays (LCDs) often include brightness enhancing prism films (typically crossed prism films) to increase an on-axis brightness of the display. In some cases, such films can be omitted when a collimating reflective polarizer is included. In some embodiments of the display system 1000, 1000', 1000", there are no brightness enhancing prism films disposed between the display panel 370 and the structured mirror 700".

Related display systems are described in in U.S. provisional co-pending application 63/021,760 titled DISPLAY SYSTEM WITH FINGER SENSING and filed on May 8, 2020, and hereby incorporated herein by reference to the extent that it does not contradict the present description.

Exemplary Reflective Polarizers

Multilayered optical films (MOFs) with specific alternating layers of polymeric materials with different refractive indices were prepared and coated with different acrylic beads during the manufacturing of the MOF films described herein. The bead diameters and distribution were optimized to eliminate the interference fringes that appeared due to multiple reflection between the MOF surface and the reflecting polarizing film used in display devices such as a smart phone.

All parts, percentages, ratios, etc., are by weight, unless noted otherwise.

Materials Used in the Exemplary Reflective Polarizers

| Abbreviation | Description and Source |
|---|---|
| PEN | Polyethylene naphthalate, produced by 3M Company St Paul, MN. |
| PC:PCTG | An amorphous blend of polycarbonate and an amorphous polyester poly-cyclohexylenedimethylene terephthalate glycol, in the ratio 80:20, produced by 3M Company, St Paul MN. |
| PETg | Glycol modified polyethylene terephthalate obtained under the trade designation PETG GN071 from Eastman Chemicals, Knoxville, TN |
| DIW | Deionized Water, produced by 3M Corporation, Saint Paul, MN. |
| WB50 | A sulphonated polyester described, produced by 3M Corporation, St. Paul, MN. |
| 1100D | A polyester polymer, obtained under the trade designation Eastek1100 Polymer Dispersion from Eastman Chemical Company, Kingsport, TN. |
| TOM259 | A non-ionic surfactant, obtained under the trade designation Tomadol 25-9 from Evonik Industries, Essen, Germany. |
| MX500 | A cross-linked polymethyl methacrylate beads with an average diameter of 5 microns obtained under the trade designation MX-500 from, Soken Chemical & Engineering Co., Ltd., Tokyo, Japan. |
| MZ8HN | A cross-linked polymethyl methacrylate beads with an average diameter of 8 microns obtained under the trade designation MZ-8HN from, Soken Chemical & Engineering Co., Ltd., Tokyo, Japan. |
| A-174 | Silane obtained under the trade designation Silquest A-174 from GE Advanced Materials, Wilton Conn. |
| SR444 | Pentaerythritol triacrylate is a low volatile and fast curing monomer available from Startomer Arkema, Exton PA. |
| NALCO 2329 | Silica particles (with an average particle size of 75 nm) obtained under the trade name NALCO 2329 from Nalco Chemical Company, Naperville Ill. |
| IRGACURE 184 | Available from Ciba Specialty Chemicals Company, High Point NC. |
| IRGACURE 819 | Available from Ciba Specialty Chemicals Company, High Point NC. |

Preparation of Bead Coating Solutions:

First, a precursor solution WB50 was prepared as follows. A one-gallon polyester kettle was charged with 111.9 g (5.5 mol %) 5-sodiosulfoisophthalic acid, 592.1 g (47.0 mol %) terephthalic acid, 598.4 g (47.5 mol %) isophthalic acid, 705.8 g ethylene glycol, 599 g neopentyl glycol, 0.7 g antimony oxide, and 2.5 g sodium acetate. The mixture was heated with stirring to 230° C. at 345 kPa (50 psi) under nitrogen for 2 hours, during which time water evolution was observed. The temperature was increased to 250° C. and the pressure was then reduced, vacuum was applied (0.2 torr), and the temperature was increased to 270° C. The viscosity of the material increased over a period of 45 minutes, after which time a high molecular weight, clear, viscous sulfopolyester was drained. This sulfopolyester was found by DSC to have a Tg of 70.3° C. The theoretical sulfonate equivalent weight was 3847 g polymer per mole of sulfonate. 500 g of the polymer was dissolved in a mixture of 2000 g water and 450 g isopropanol at 80° C. The temperature was then raised to 95° C. in order to remove the isopropanol (and a portion of the water). The final dispersion consisted of an aqueous 20 wt. % solids dispersion.

Coating solutions were prepared by mixing the inputs detailed in the table below and agitating until homogeneous.

Solution Inputs

| Material | Solution A Weight Percent | Solution B Weight Percent | Solution C Weight Percent |
|---|---|---|---|
| DIW | 0 | 40.7 | 40.1 |
| WB50 | 82.2 | 48.7 | 48.1 |
| 1100D | 16.5 | 9.8 | 9.7 |
| TOM259 | 0.5 | 0.3 | 0.3 |
| MX500 | 0.8 | 0.5 | — |
| MZ8HN | — | — | 1.8 |

Reflective Polarizer 1

A multilayer optical (MOF) film was manufactured with two sequential (stacked) packets of microlayers, with 325 individual microlayers layers in each packet enclosed by packet bonding layers. The microlayers in each packet were arranged as alternating layers of material A and material B. Material A was a birefringent polyester PEN, and material B was a blend of PC:PCTG and PETg in the ratio of 85:15. The microlayer packet was designed to have a reflection band that spans the regions of visible and near-IR wavelengths. The films were then stretched continuously in a standard tenter with a draw ratio of 6:1 in the transverse direction and constrained in the machine direction (no orientation or relaxation). The oven temperature used for the orientation was 270 degrees Fahrenheit. The process conditions for the manufacture of this film were chosen so that the measured spectra matched the calculated spectra using the wavelength-dependent refractive index values, as shown in the table below. Respective refractive indices of materials $n_x$, $n_y$, and $n_z$ are along the x-direction (transverse direction), the y-direction (machine direction), and the z-direction (thickness direction). $n_{iso}$ is the isotropic refractive index of the PC:PCTG, PETg blend.

| Calculated Spectra Values | | | |
|---|---|---|---|
| | Wavelength nm | | |
| | 450 | 550 | 633 |
| PEN | | | |
| $n_x$ | 1.925 | 1.854 | 1.826 |
| $n_y$ | 1.691 | 1.652 | 1.635 |
| $n_z$ | 1.526 | 1.498 | 1.489 |
| PC:PCTG, PETg blend | | | |
| $n_{iso}$ | 1.596 | 1.578 | 1.570 |

Figure 22A:
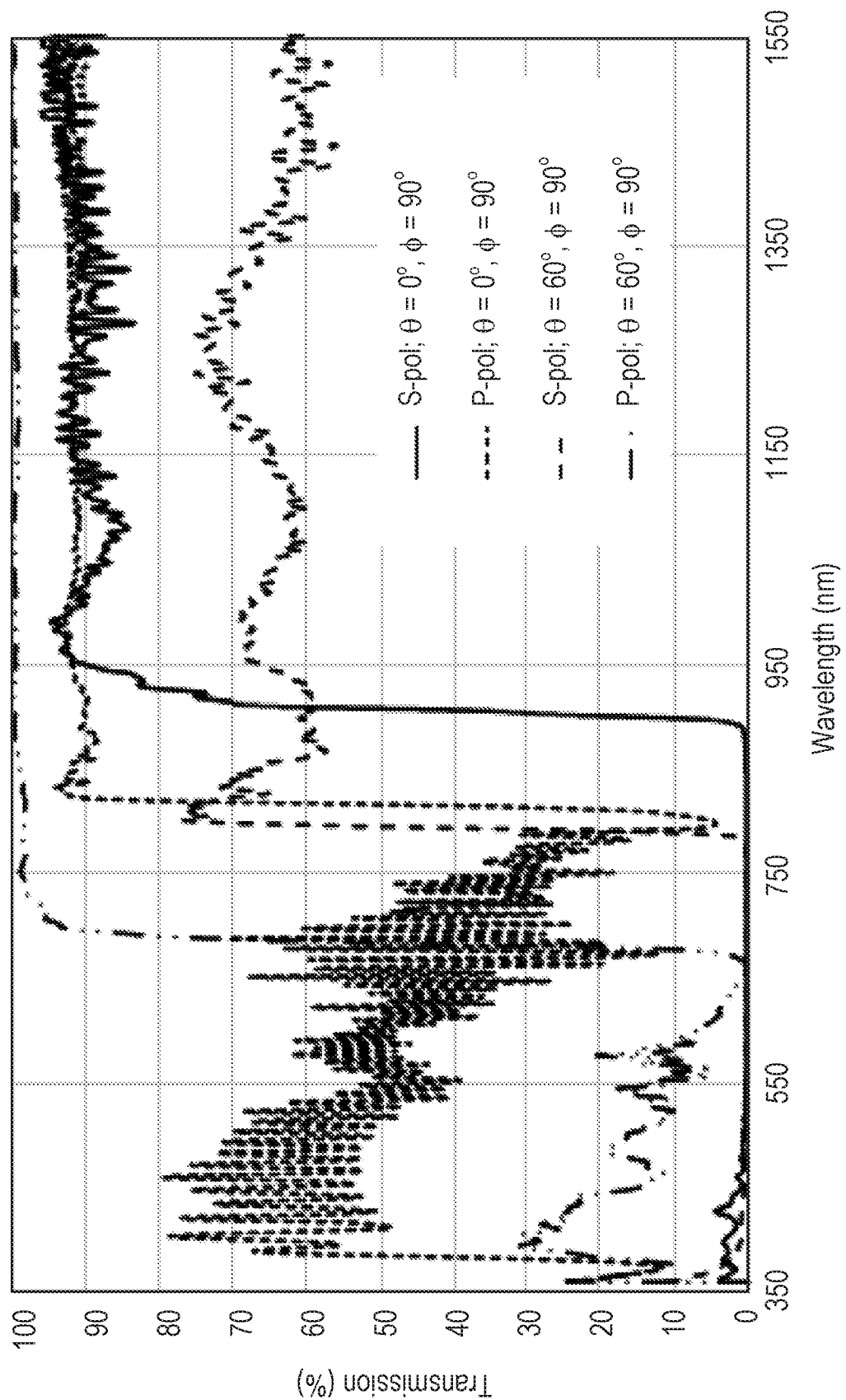
FIG. 22A is a plot of transmission versus wavelength for an illustrative reflective polarizer for s- and p-polarized light.

Representative spectra for Reflective Polarizer 1 were measured and are shown in FIG. 22A for a plane of incidence making an angle φ of 90 degrees to the transverse direction, for angles of incidence θ of zero (normal incidence) and 60 degrees, and for s- and p-polarizations states.

Figure 22B:
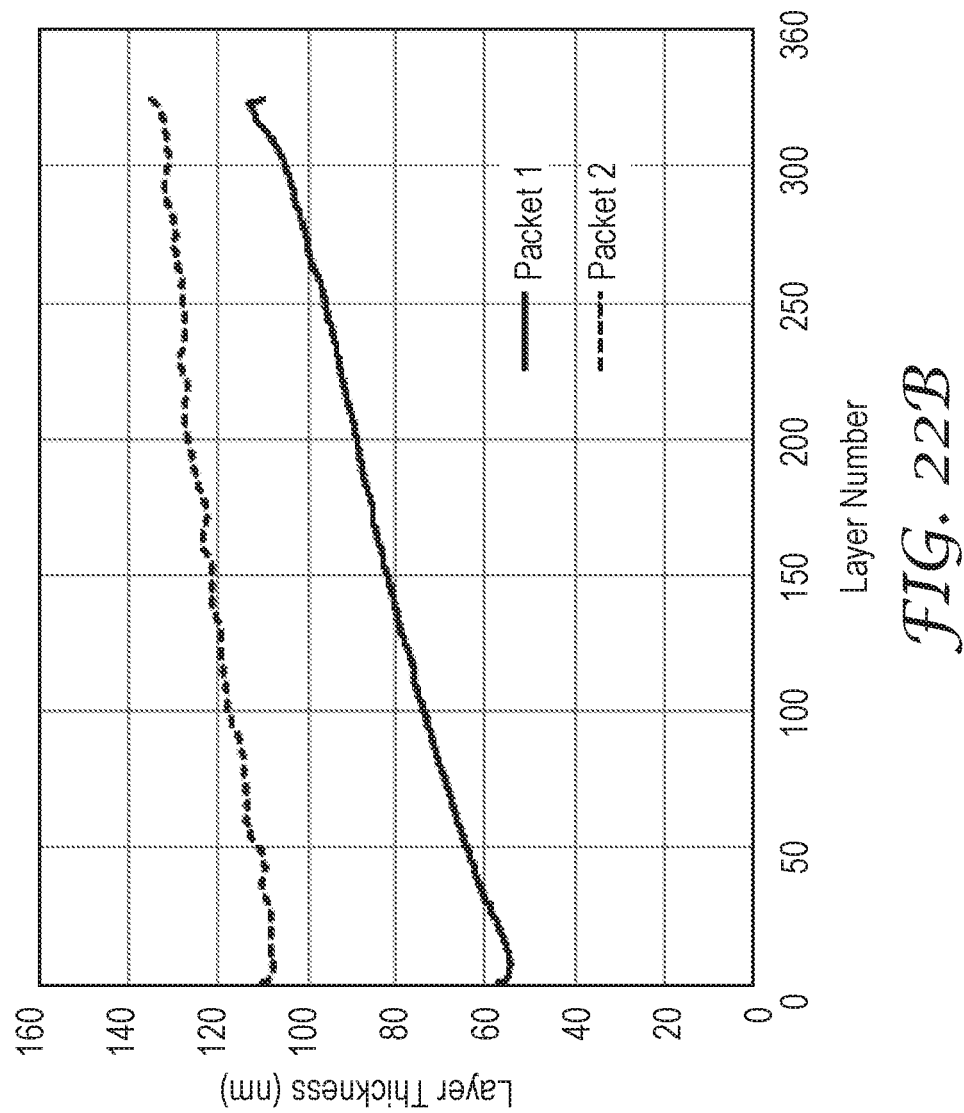
FIG. 22B is a layer thickness profile for the reflective polarizer of FIG. 22A.

The layer thicknesses were measured using an Atomic Force Microscope (Dimension ICON from Bruker Instruments, Billerica, MA) and is shown in FIG. 22B.

Reflective Polarizer 2

The surface of the packet 1 of unoriented cast web was continuously coated with solution A using a gravure roll in a reverse kiss configuration. The coated web then passed through a coating oven for at least 5 seconds with the temperature of the oven maintained above 65° C. The beads were observed under a microscope on the unoriented cast web to be not grouped together and the beads appeared to be delivered to the surface of the web at the same concentration as in the coating solution. This bead coated cast film was stretched and oriented to yield bead coated MOF as described for Reflective Polarizer 1.

Figure 23:
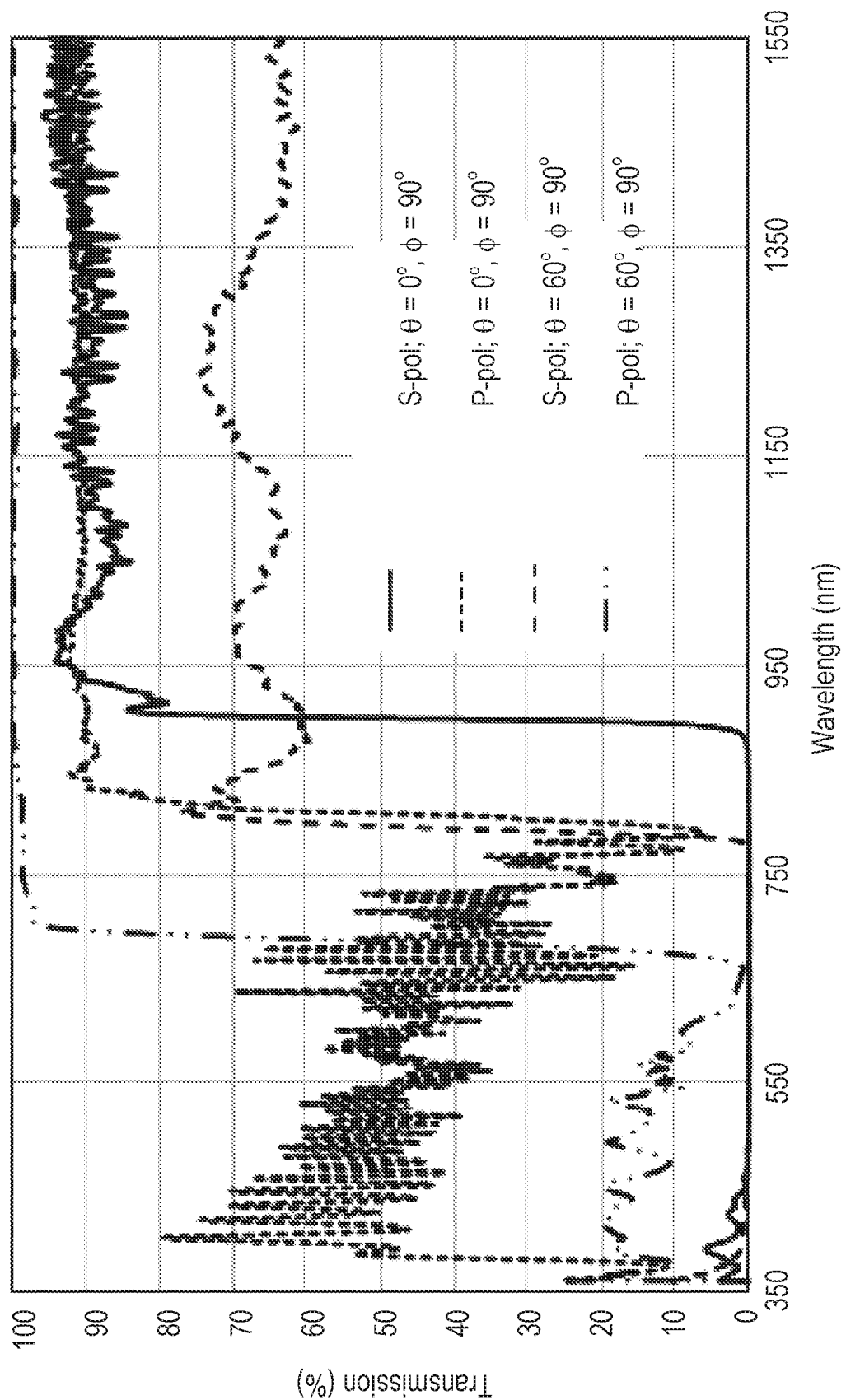
FIGS. 23-25 are plots of transmission versus wavelength for illustrative reflective polarizers for s- and p-polarized light.

A Keyence microscope was used to count the number of beads per unit area and it was found to be ~175 beads/mm$^2$. Representative spectra for Reflective Polarizer 2 were measured and are shown in FIG. 23.

Reflective Polarizer 3

The surface of the packet 1 of unoriented cast web was continuously coated with solution A using a gravure roll in a reverse kiss configuration. The coated web then passed through a coating oven for at least 5 seconds with the temperature of the oven maintained above 65° C. The other side (surface of packet 2) of the cast web coated with solution A was then continuously coated with solution B and dried in the same manner as with solution A. The beads were observed under a microscope on the unoriented cast web to be not grouped together and the beads appeared to be delivered to the surface of the web at the same concentration as in the coating solution. This bead coated cast film was stretched and oriented to yield both side bead coated MOF as described for Reflective Polarizer 1. A Keyence microscope was used to count the number of beads per unit area and it was found to be ~175 beads/mm$^2$.

Reflective Polarizer 4

Figure 24:
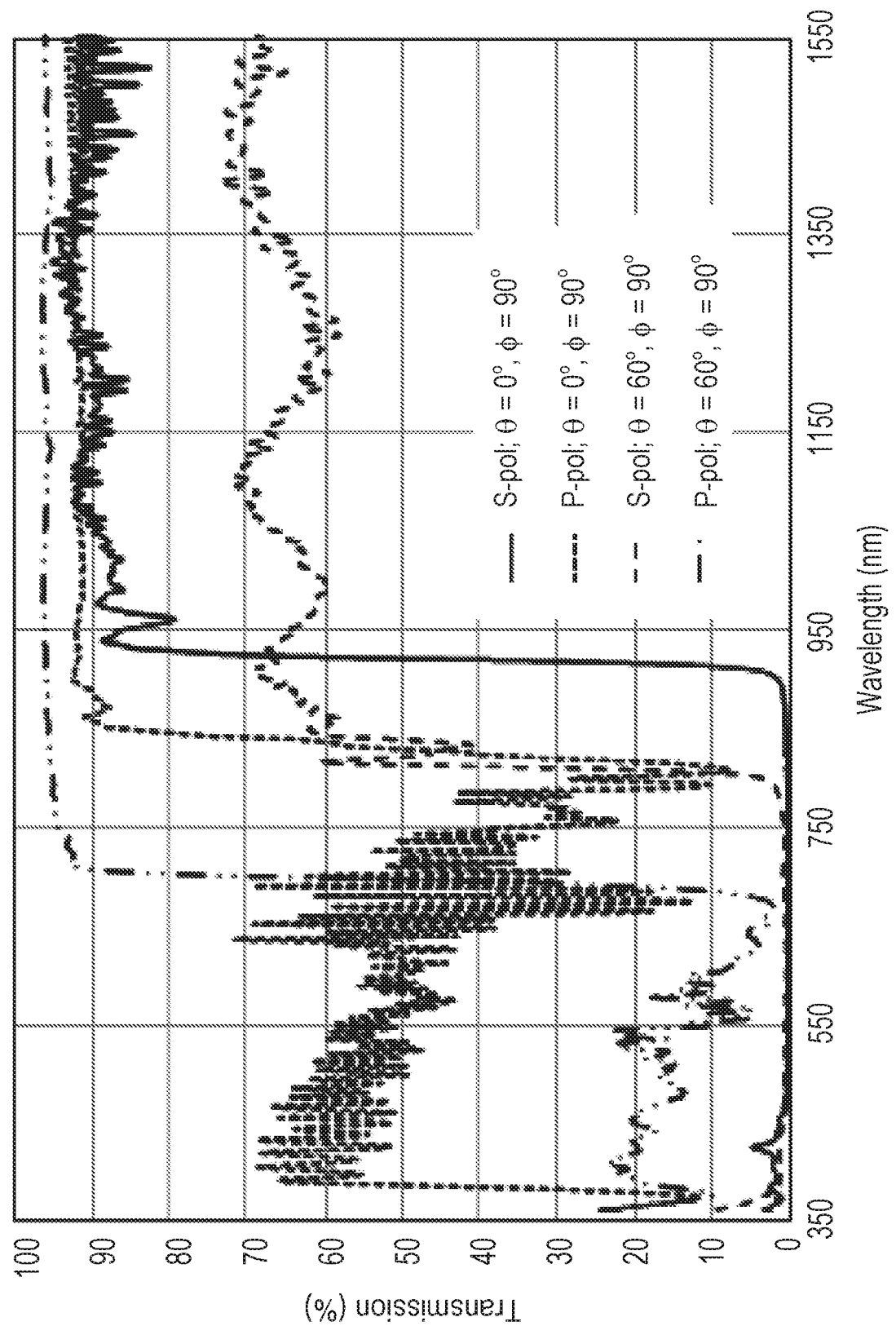

Reflective Polarizer 4 was prepared very similar to Reflective Polarizer 3 except the coating solution B was replaced by coating solution C. A Keyence microscope was used to count the number of beads per unit area and it was found to be ~182 beads/mm2. A cross-section of the Reflective Polarizer 4 was similar to the cross-section shown schematically in FIG. 3A but without the optically diffusive layer 30. Representative spectra for Reflective Polarizer 4 were measured and are shown in FIG. 24.

Reflective Polarizer 5

The surface of the thick packet of the MOF film as described in Reflective Polarizer 4 was coated with a conformal diffuser using a slurry of silica nanoparticles in acrylic monomer dissolved in its solvent as described below.

First, a coating precursor solution was prepared by mixing a 5.95 g of A-174 and 0.5 g of 4-hydroxy-2,2,6,6-tetramethylpiperidine 1-oxyl (5 wt. %; 4H-2,2,6,6-TMP 1-0) were added to the mixture of 400 g NALCO 2329 and 450 g of 1-methoxy-2-propanol in a glass jar with stirring at room temperature for 10 mins. The jar was sealed and placed in an oven at 80° C. for 16 hours. Then, the water was removed from the resultant solution with a rotary evaporator at 60° C. until the solid content of the solution was close to 45 wt %. 200 g of 1-methoxy-2-propanol was charged into the resultant solution, and then remaining water was removed by using the rotary evaporator at 60° C. This latter step was repeated for a second time to further remove water from the solution. Finally, the concentration of total silica nanoparticles was adjusted to 42.5 wt. % by adding 1-methoxy-2-propanol to result in the silica solution containing surface modified silica nanoparticles with an average size of 75 nm.

Next, a coating solution was prepared. The coating solution was composed of 20.96 wt. % of the clear precursor solution described above, 5.94 wt. % of SR444, 71.55 wt. % isopropyl alcohol, 1.48 wt. % IRGACURE 184 and 0.07 wt. % IRGACURE 819. Coating solution was pumped (using a pressure pot) to a slot-type coating die at a rate that produced a wet layer thickness of 7 microns onto the Reflective Polarizer 4.

Next, the coating was polymerized by passing the coated substrate through a UV-LED cure chamber that included a quartz window to allow passage of UV radiation. The UV-LED cure chamber included a rectangular array of 160 UV-LEDs, 4 down-web by 40 cross-web (approximately covering a 42.5 cm×4.5 cm area). The LEDs (available from Nichia Inc., Tokyo Japan) operated at a nominal wavelength of 385 nm and when run at 10 Amps, resulted in a UV-A dose of 0.035 joules per square cm. The UV-LEDs were run at 3 Amps to produce the film described in this example. The water-cooled UV-LED array was powered by a Lambda power supply (available from TDK-Lambda, Neptune NJ). The UV-LEDs were positioned above the quartz window of the cure chamber at a distance of approximately 2.5 cm from the substrate. The UV-LED cure chamber was supplied with a flow of nitrogen at a flow rate of 141.6 liters/mm. Air was introduced into the nitrogen supply to control the total oxygen level in the UV-LED chamber. The oxygen level in the UV-LED cure chamber was monitored using a Series 3000 oxygen analyzer (available from Alpha Omega Instruments, Cumberland RI).

After being polymerized by the UV-LEDs, the solvent in the cured coating was removed and dried at 66° C. for 30 seconds. Next, the dried coating was post-cured using a Fusion System Model 1600 configured with a D-bulb (available from Fusion UV Systems, Gaithersburg, MD). The UV Fusion chamber was supplied with a flow of nitrogen that resulted in an oxygen concentration of approximately 50 ppm in the chamber. This resulted in a diffuser coated film with conformal coating of the beads.

Figure 25:
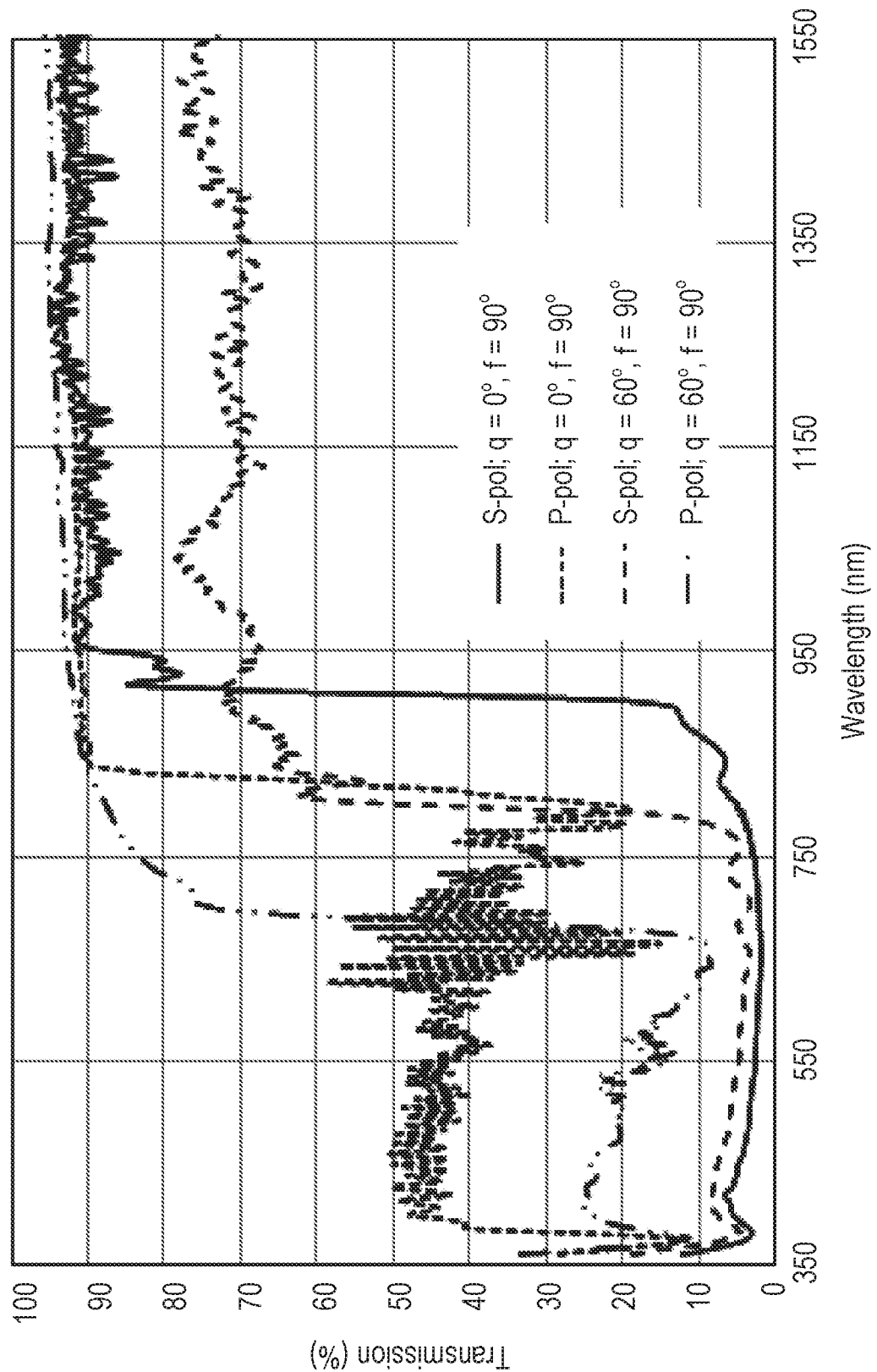

A schematic of the cross-section of the Reflective Polarizer 5 is shown in FIG. 3A. Representative spectra for Reflective Polarizer 5 were measured and are shown in FIG. 25.

Exemplary Optically Diffusive Films

Additional Materials Used in the Exemplary Optically Diffusive Films

| Identification | Description | Source |
| --- | --- | --- |
| 4H-2,2,6,6-TMP 1-O | 4-hydroxy-2,2,6,6-tetramethylpiperidine 1-oxyl | Sigma Aldrich, Milwaukee, WI |
| 1-methoxy-2-propanol | Solvent | Sigma Aldrich, Milwaukee, WI |
| Isopropyl alcohol | Solvent | Sigma Aldrich, Milwaukee, WI |
| HDDA | 1,6 hexanediol diacrylate available under the tradename SR238B | Sartomer Arkema, Exton PA |
| TMPTA | Trimethylolpropane triacrylate available under the tradename SR351 | Sartomer Arkema, Exton PA |
| TPO | Diphenyl (2,4,6-trimethylbenzoyl)-phosphine oxide available under the trade name DAROCUR TPO | BASF, Germany. |

-continued

| Identification | Description | Source |
|---|---|---|
| PHOTOMER 6210 | Aliphatic urethane acrylate oligomer available | IGM Resins USA, St. Charles, IL |

Sample Preparation 1

A coating precursor solution was made. 5.95 grams of 3-methacryloxypropyl-trimethoxysilane (A-174, Momentive, Waterford, NY) and 0.5 gram of 4-hydroxy-2,2,6,6-tetramethylpiperidine 1-oxyl (5 wt. %; 4H-2,2,6,6-TMP 1-0, Sigma Aldrich, Milwaukee, WI) were added to the mixture of 400 grams 75 nm diameter $SiO_2$ sol (NALCO 2329, Nalco Company, Naperville, IL) and 450 grams of 1-methoxy-2-propanol (Sigma Aldrich, Milwaukee, WI) in a glass jar with stirring at room temperature for 10 minutes. The jar was sealed and placed in an oven at 80° C. for 16 hours. Then, the water was removed from the resultant solution with a rotary evaporator at 60° C. until the solid content of the solution was close to 45 wt. %. 200 grams of 1-methoxy-2-propanol was charged into the resultant solution, and then remaining water was removed by using the rotary evaporator at 60° C. This latter step was repeated for a second time to further remove water from the solution. Finally, the concentration of total $SiO_2$ nanoparticles was adjusted to 42.5 wt. % by adding 1-methoxy-2-propanol to result in the $SiO_2$ sol containing surface modified $SiO_2$ nanoparticles with an average size of 75 nm.

A coating solution "A" was made. The coating solution "A" was composed of 27.98 wt. % of the clear precursor solution described above, 7.9 wt. % of pentaerythritol triacrylate monomer (SR444, Sartomer), 63.3 wt. % isopropyl alcohol, 0.8 wt. % IRGACURE 184 (BASF, Vandalia, IL) and 0.02 wt. % IRGACURE 819 (BASF, Vandalia, IL). Coating solution "A" was pumped with a Viking CMD (Viking Pump, Cedar Falls, IA) pump to a slot-type coating die at a rate that produced a wet layer thickness of 15 microns onto a primed polyester substrate.

Next, the coating was polymerized by passing the coated substrate through a UV-LED cure chamber that included a quartz window to allow passage of UV radiation. The UV-LED cure chamber included a rectangular array of UV-LEDs. The LEDs (available from Nichia Inc., Tokyo Japan) operated at a nominal wavelength of 385 nm and when run at 10 Amps, resulted in a UV-A dose of 0.035 joules per square cm. The UV-LEDs were run at the current indicated in the tables below. The water-cooled UV-LED array was powered by a Genesys 150-22 power supply (available from TDK-Lambda, Neptune N.J.). The UV-LEDs were positioned above the quartz window of the cure chamber at approximately 2.5 cm from the substrate. The UV-LED cure chamber was supplied with a flow of nitrogen at a flow rate of 22 cubic feet per minute in order to keep the oxygen level below 50 parts ppm. The oxygen level in the UV-LED cure chamber was monitored using a Series 3000 oxygen analyzer (available from Alpha Omega Instruments, Cumberland RI).

After being polymerized by the UV-LEDs, the solvent in the cured coating was removed by transporting the coated substrate to a drying oven at 150° F. (66 C) for 30 seconds. Next, the dried coating was post cured using a Fusion System Model 1600 configured with an H-bulb (available from Fusion UV Systems, Gaithersburg, MD.). The UV Fusion chamber was supplied with a flow of nitrogen that resulted in an oxygen concentration of approximately 50 ppm in the chamber. This resulted in the porous coated polyester film. Diffusers 1-6 were prepared using sample preparation 1.

Sample Preparation 2

A coating solution "B" was made. The coating solution "B" was composed of 42.22 wt. % of the clear precursor solution described in sample preparation 1, 11.96 wt. % of pentaerythritol triacrylate monomer (SR444, Sartomer), 45.50 wt. % isopropyl alcohol, 0.3 wt. % IRGACURE 184 and 0.01 wt. % IRGACURE 819. Coating solution B was pumped with a Viking CMD (Viking Pump, Cedar Falls IA) pump to a slot-type coating die at a rate that produced a wet layer thickness of 20 microns onto a primed polyester substrate using the same process described previously in sample preparation 1. Diffusers 7-14 were prepared using sample preparation 2.

Sample Preparation 3

Coating solution "B" from sample preparation 2 was pumped with a Viking CMD (Viking Pump, Cedar Falls IA) pump to a slot-type coating die at a rate that produced a wet layer thickness of 7.75 microns onto a primed polyester substrate. The coating was processed as described in sample preparation 1. Diffusers 15-25 were prepared using sample preparation 3.

Sample Preparation 4

Coating solution "B" from sample preparation 2 was pumped with a Viking CMD (Viking Pump, Cedar Falls IA) pump to a slot-type coating die at a rate that produced a wet layer thickness of 7 microns onto a primed collimating multilayer optical film substrate. The coating was processed as described in sample preparation 1. Diffusers 26-31 were prepared using sample preparation 4.

Sample Preparation 5

The coating solution "C" was composed of 20.96 wt. % of the clear of the clear precursor solution described in sample preparation 1, 5.94 wt. % ofpentaerythritol triacrylate monomer (SR444, Sartomer), 71.55 wt. % isopropyl alcohol, 1.48 wt. % IRGACURE 184 and 0.07 wt. % IRGACURE 819. Coating solution "C" was pumped with a Viking CMD (Viking Pump, Cedar Falls IA) pump to a slot-type coating die at a rate that produced a wet layer thickness of 6 microns onto a primed collimating multilayer optical film substrate. The coating was processed as described in sample preparation 1. Diffusers 32-36 were prepared using sample preparation 5.

Test Methods and Results

The total near-infrared transmission and diffuse near-infrared transmission were measured for each diffuser using a spectrometer (ULTRASCAN PRO, Hunterlab, Reston, VA). The near-infrared scattering ratio was calculated from these measurements by dividing the diffuse near-infrared transmission by the total near-infrared transmission. Results are provided in the following table.

| Diffuser | Sample preparation | UV LED Current (Amps) | 940 nm Total % T | 940 nm Diffuse % T | 940 nm Scatter Ratio (%) |
|---|---|---|---|---|---|
| 1 | 1 | 0 | 94.35 | 0.55 | 1 |
| 2 | 1 | 8 | 90.82 | 35.2 | 39 |
| 3 | 1 | 9 | 89.01 | 36.1 | 41 |
| 4 | 1 | 10 | 89.29 | 34.5 | 39 |
| 5 | 1 | 11 | 89 | 32.7 | 37 |
| 6 | 1 | 12 | 88.82 | 30.5 | 34 |
| 7 | 2 | 0 | 93.3 | 1.22 | 1 |
| 8 | 2 | 1 | 89.4 | 39.5 | 44 |
| 9 | 2 | 2 | 79.8 | 46.7 | 59 |

| Diffuser | Sample preparation | UV LED Current (Amps) | 940 nm Total % T | 940 nm Diffuse % T | 940 nm Scatter Ratio (%) |
|---|---|---|---|---|---|
| 10 | 2 | 4 | 79.6 | 28.3 | 36 |
| 11 | 2 | 8 | 84.1 | 19.6 | 23 |
| 12 | 2 | 10 | 84.3 | 18.3 | 22 |
| 13 | 2 | 12 | 85.2 | 17.6 | 21 |
| 14 | 2 | 15 | 85.4 | 15.6 | 18 |
| 15 | 3 | 0 | 93.1 | 0.8 | 1 |
| 16 | 3 | 1 | 85.8 | 18.8 | 22 |
| 17 | 3 | 2 | 85.9 | 30.9 | 36 |
| 18 | 3 | 4 | 85.8 | 18.3 | 21 |
| 19 | 3 | 8 | 88.6 | 11.5 | 13 |
| 20 | 3 | 10 | 89.1 | 9.49 | 11 |
| 21 | 3 | 12 | 90.4 | 7.41 | 8 |
| 22 | 3 | 15 | 91.8 | 6.53 | 7 |
| 23 | 3 | 1 | 92.7 | 19.6 | 21 |
| 24 | 3 | 3 | 85 | 22.4 | 26 |
| 25 | 3 | 3.5 | 85.4 | 19.8 | 23 |
| 26 | 4 | 2 | 88.1 | 2.74 | 3 |
| 27 | 4 | 4 | 88.9 | 4.2 | 5 |
| 28 | 4 | 6 | 90.1 | 5.42 | 6 |
| 29 | 4 | 8 | 88.2 | 7.42 | 8 |
| 30 | 4 | 10 | 88.3 | 8.94 | 10 |
| 31 | 4 | 12 | 86.6 | 10.4 | 12 |
| 32 | 5 | 3 | 87.21 | 11.5 | 13 |
| 33 | 5 | 4 | 85.97 | 13.7 | 16 |
| 34 | 5 | 5 | 89.49 | 14.65 | 17 |
| 35 | 5 | 6 | 88.73 | 14.81 | 17 |
| 36 | 5 | 7 | 90.18 | 14.29 | 16 |

The visible transmission (% T), haze (% H) and clarity (% C) were measured for each diffuser using a haze meter (Haze-gard Plus, BYK-Gardner, Columbia, MD). Results are provided in the following table.

| Diffuser | Sample preparation | UV LED Current (Amps) | % T | % H | % C |
|---|---|---|---|---|---|
| 1 | 1 | 0 | 94.4 | 0.4 | 98.8 |
| 2 | 1 | 8 | 87.5 | 80.4 | 97.8 |
| 3 | 1 | 9 | 85.9 | 83.9 | 97.6 |
| 4 | 1 | 10 | 84.4 | 84.4 | 98.1 |
| 5 | 1 | 11 | 83.5 | 84.2 | 98.1 |
| 6 | 1 | 12 | 82 | 84 | 98.5 |
| 7 | 2 | 0 | 94 | 0.95 | 99 |
| 8 | 2 | 1 | 90 | 78.3 | 91 |
| 9 | 2 | 2 | 69 | 98.7 | 93 |
| 10 | 2 | 4 | 59 | 94.6 | 98 |
| 11 | 2 | 8 | 59 | 88.2 | 98 |
| 12 | 2 | 10 | 60 | 85.7 | 98 |
| 13 | 2 | 12 | 60 | 83.8 | 98 |
| 14 | 2 | 15 | 61 | 81.4 | 99 |
| 15 | 3 | 0 | 1.02 | 94 | 99 |
| 16 | 3 | 1 | 52.7 | 93 | 99 |
| 17 | 3 | 2 | 79.1 | 78 | 99 |
| 18 | 3 | 4 | 80.2 | 70 | 99 |
| 19 | 3 | 8 | 66.7 | 71 | 99 |
| 20 | 3 | 10 | 57.6 | 73 | 99 |
| 21 | 3 | 12 | 55.2 | 74 | 99 |
| 22 | 3 | 15 | 47.5 | 76 | 100 |
| 23 | 3 | 1 | 52.6 | 60 | 100 |
| 24 | 3 | 3 | 83.9 | 72 | 99 |
| 25 | 3 | 3.5 | 82 | 71 | 99 |
| 26 | 4 | 2 | 27 | 8.83 | 96 |
| 27 | 4 | 4 | 29 | 14 | 96 |
| 28 | 4 | 6 | 29 | 18.8 | 97 |
| 29 | 4 | 8 | 29 | 24.8 | 97 |
| 30 | 4 | 10 | 27 | 34.1 | 97 |
| 31 | 4 | 12 | 30 | 39.9 | 96 |
| 32 | 5 | 3 | 32 | 32.7 | 93.7 |
| 33 | 5 | 4 | 31.8 | 47.1 | 93.6 |
| 34 | 5 | 5 | 31.9 | 51.6 | 93.5 |
| 35 | 5 | 6 | 31.5 | 53.3 | 93.7 |
| 36 | 5 | 7 | 31.3 | 53.9 | 93.8 |

Cross-sectional images of various diffuser samples were acquired by cutting the diffuser films using micro-tome. SEM cross-section images were first converted into 8-bit using National Institute of Health ImageJ software. ImageJ software was used to select the area of interest. The software was used to adjust the threshold until the area of the image below threshold was approximately same as the area below the front plane of the image. The software automatically calculated the area below threshold. The ratio of the area below threshold and the total area of the image was used as void fraction. Results are provided in the following table.

| Diffuser | Total Area | Area Below Threshold | % Area | Min Thr. | Max Thr. |
|---|---|---|---|---|---|
| 21 | 301644 | 106656 | 35.4 | 0 | 103 |
| 23 | 419739 | 148224 | 35.3 | 0 | 105 |
| 24 | 296172 | 90740 | 30.6 | 0 | 104 |
| 25 | 311606 | 83479 | 26.8 | 0 | 109 |

Optically diffusive films were made by forming a structured optical layer on the substrate of Diffuser 2 (any of the above Diffusers could have been used) opposite the optically diffusive layer. The structured optical layer appeared generally as structured optical layer 130 schematically illustrated in FIGS. 5A-51B and shown in FIG. 7C.

The geometry of the structured surface was characterized by the following parameters:
1. X1: Tip radius of the features of the structured surface (e.g., corresponding to elongated structures 140).
2. X2: Feature density (the numbers of features per square mm).
3. Feature height, which was 5 microns Rolls for microreplicating structures described by the parameters in the following table were made.

| | X2 = 20 feat./mm$^2$ | X2 = 50 feat./mm$^2$ | X2 = 80 feat./mm$^2$ |
|---|---|---|---|
| Actual density (features/mm) | 21.13 | 50.31 | 81.58 |
| Surface Coverage % at X1 = 1 micron | 0.67 | 1.59 | 2.58 |
| Surface Coverage % at X1 = 5 microns | 0.95 | 3.86 | 6.26 |
| Total # features in design | 7,181,700 | 35,908,494 | 58,227,616 |

For each roll, a structured optical layer was formed on the substrate of diffuser opposite the optically diffusive layer by microreplicating from the roll in a continuous process using a 100% solid UV curable resin with cured refractive index of about 1.5067, and formulated as shown in the table below.

| Formulation | Wt % |
|---|---|
| HDDA | 20% |
| TMPTA | 20% |
| TPO | 0.5% |
| PHOTOMER 6210 | 59.5% |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical construction comprising:
    a reflective polarizer comprising:
        a plurality of polymeric layers numbering at least 50 in total and co-extruded with a first outer layer, the first outer layer comprising a plurality of first particles having an average size of from about 7 to about 9 microns and partially protruding from a first major surface thereof to form a first structured major surface; and
        a first optically diffusive layer conformably disposed on the first structured major surface so that opposing first and second major surfaces of the first optically diffusive layer substantially conform to the first structured major surface, the first optically diffusive layer comprising a plurality of nanoparticles dispersed therein, the nanoparticles defining a plurality of voids therebetween; and
    an optically diffusive film disposed on the reflective polarizer and comprising:
        an optical substrate layer;
        a second optically diffusive layer disposed on the optical substrate layer and facing the reflective polarizer and comprising a plurality of nanoparticles dispersed therein, wherein for a substantially normally incident light and a visible wavelength range from about 450 nm to about 650 nm and an infrared wavelength range from about 930 nm to about 970 nm, the second optically diffusive layer has an average specular transmittance Vs in the visible wavelength range and an average specular transmittance Is in the infrared wavelength range, Is/Vs≥2.5; and
        a structured optical layer disposed on the optical substrate layer and facing away from the reflective polarizer and comprising a structured major surface facing away from the optical substrate layer and comprising a plurality of spaced apart elongated structures elongated along a same first direction and arranged at a substantially uniform density across the structured major surface of the structured optical layer.

2. The optical construction of claim 1, wherein for a substantially normally incident light and for each of mutually orthogonal first and second polarization states, the optical substrate layer has an average specular transmittance of greater than about 70% in each of the visible and infrared wavelength ranges.

3. The optical construction of claim 1, wherein the reflective polarizer further comprises a second outer layer opposite the first outer layer, the second outer layer co-extruded with the plurality of polymeric layers and the first outer layer, the second outer layer comprising a plurality of second particles partially protruding from a second major surface thereof to form a second structured major surface.

4. The optical construction of claim 1,
    wherein in a plane of a cross-section of the first optically diffusive layer in a thickness direction of the first optically diffusive layer:
    the nanoparticles of the first optically diffusive layer have an average size between about 20 nm and about 150 nm; and
    the voids occupy from about 5% to about 50% of an area of the plane of the cross-section.

5. The optical construction of claim 1, wherein the second optically diffusive layer further comprises a polymeric material bonding the nanoparticles of the second optically diffusive layer to each other to form a plurality of nanoparticle aggregates defining a plurality of voids therebetween.

6. The optical construction of claim 1, wherein each elongated structure comprises a peak such that in a plane of a cross-section of the elongated structure that is parallel to the first direction and comprises the peak, the elongated structure has a length La and a height variation of less than about 5% across a substantially flat top region having a length d, d/La≥0.05.

7. The optical construction of claim 1, wherein the elongated structures have an average length along the first direction and an average width along an orthogonal second direction, the average length being at least about 2 times the average width.

8. The optical construction of claim 1, wherein for substantially normally incident light and a predetermined wavelength range, the reflective polarizer has an average optical transmittance of at least about 40% for a first polarization state and an average optical reflectance of at least about 70% for an orthogonal second polarization state.

9. The optical construction of claim 8, wherein for the first polarization state and the predetermined wavelength range, the reflective polarizer has a greater average optical transmittance for light incident at a smaller incident angle and a smaller average optical transmittance for light incident at a greater incident angle.

10. The optical construction of claim 1, wherein the reflective polarizer further comprises a second outer layer opposite the first outer layer and co-extruded with the plurality of polymeric layers and the first outer layer, the plurality of polymeric layers disposed between the first and second outer layers and comprising a plurality of first polymeric layers spaced apart along a thickness direction of the reflective polarizer from a plurality of second polymeric layers by one or more middle layers, each of the pluralities of first and second polymeric layers numbering at least 100 in total, each of the first and second polymeric layers having an average thickness of less than about 350 nm, each of the one or more middle layers having an average thickness of greater than about 500 nm.

11. The optical construction of claim 10, wherein a smallest separation between the first outer layer and the one or more middle layers is S1, a smallest separation between the second outer layer and the one or more middle layers is S2, S1>S2.

12. The optical construction of claim 1, wherein the reflective polarizer further comprises a second outer layer opposite the first outer layer and co-extruded with the plurality of polymeric layers and the first outer layer, the reflective polarizer comprising a single packet of the polymeric layers disposed between the first and second outer layers such that each layer between the first and second outer layers has an average thickness of less than about 350 nm.

13. The optical construction of claim 1, wherein for a substantially normally incident light, an optical transmittance of the reflective polarizer versus wavelength for a first polarization state comprises a band edge, wherein:
a best linear fit to the band edge correlating the optical transmittance to the wavelength at least across a wavelength range where the optical transmittance along the band edge increases from about 10% to at least about 70% has a slope of greater than about 2.5%/nm; and
for a first wavelength range extending from a smaller wavelength L1 to a greater wavelength L2, 30 nm≤L2−L1≤50 nm, L1 greater than and within about 20 nm of a wavelength L3 corresponding to an optical transmittance of about 50% along the band edge, the optical transmittance has an average of greater than about 75%.

14. A display system for sensing a finger of a user applied to the display system, the display system comprising:
a display panel configured to generate an image for viewing by the user;
a lightguide for providing illumination to the display panel;
the optical construction of claim 1 disposed between the display panel and the lightguide, the first structured major surface disposed between the display panel and the plurality of polymeric layers;
a sensor for sensing the finger of the user disposed proximate the lightguide opposite the reflective polarizer; and
an infrared light source configured to emit an infrared light toward the finger of the user, the sensor configured to receive at least a portion of the infrared light reflected by the finger.

15. The display system of claim 14 further comprising a structured mirror disposed between the lightguide and the sensor and comprising an optical mirror, and an array of discrete spaced apart optical bumps formed on the optical mirror and facing the lightguide, such that for a substantially normally incident light, the optical mirror has an average optical reflectance of greater than about 30% in the visible wavelength range for at least a first polarization state, and a specular transmittance of greater than about 20% for at least one wavelength in the infrared wavelength range for each of the first polarization state and an orthogonal second polarization state.

* * * * *